US012572798B1

(12) United States Patent
Sather et al.

(10) Patent No.: US 12,572,798 B1
(45) Date of Patent: Mar. 10, 2026

(54) ACCOUNTING FOR COMPUTE TIME IN TRAINING OF NETWORK

(71) Applicant: Amazon Technologies, Inc., Seattle, WA (US)

(72) Inventors: Eric A. Sather, Palo Alto, CA (US); Steven L. Teig, Menlo Park, CA (US)

(73) Assignee: Amazon Technologies, Inc., Seattle, WA (US)

( * ) Notice: Subject to any disclaimer, the term of this patent is extended or adjusted under 35 U.S.C. 154(b) by 1030 days.

(21) Appl. No.: 17/696,819

(22) Filed: Mar. 16, 2022

Related U.S. Application Data

(63) Continuation-in-part of application No. 17/089,653, filed on Nov. 4, 2020, now Pat. No. 12,061,988.

(60) Provisional application No. 63/189,516, filed on May 17, 2021, provisional application No. 63/178,889, filed on Apr. 23, 2021, provisional application No. 63/065,472, filed on Aug. 13, 2020.

(51) Int. Cl.
*G06N 3/08* (2023.01)
*G06N 3/048* (2023.01)

(52) U.S. Cl.
CPC .............. *G06N 3/08* (2013.01); *G06N 3/048* (2023.01)

(58) Field of Classification Search
CPC ........ G06N 3/084; G06N 3/04; G06N 3/0985; G06N 3/047; G06N 3/08; G06N 3/048; G06N 3/063; G06N 5/04
See application file for complete search history.

(56) References Cited

U.S. PATENT DOCUMENTS

| | | | |
|---|---|---|---|
| 9,904,874 B2 | 2/2018 | Shoaib et al. | |
| 2013/0138589 A1* | 5/2013 | Yu ............................ | G06N 3/08 706/15 |
| 2016/0086078 A1 | 3/2016 | Ji et al. | |
| 2016/0174902 A1 | 6/2016 | Georgescu et al. | |
| 2017/0286830 A1 | 10/2017 | El-Yaniv et al. | |
| 2018/0107925 A1 | 4/2018 | Choi et al. | |
| 2018/0197049 A1 | 7/2018 | Tran et al. | |
| 2019/0012594 A1* | 1/2019 | Fukuda ..................... | G06N 3/04 |
| 2019/0042948 A1 | 2/2019 | Lee et al. | |
| 2019/0065896 A1* | 2/2019 | Lee ......................... | G06N 3/045 |
| 2019/0138882 A1 | 5/2019 | Choi et al. | |
| 2019/0138896 A1 | 5/2019 | Deng | |

(Continued)

OTHER PUBLICATIONS

Wang, "Fixed-point Factorized Networks", 2017 IEEE Conference on Computer Vision and Pattern Recognition. (Previously supplied). (Year: 2017).*

(Continued)

*Primary Examiner* — Dave Misir
(74) *Attorney, Agent, or Firm* — K&L Gates LLP

(57) ABSTRACT

Some embodiments provide a method for training a machine-trained (MT) network. The method receives a network having multiple layers. Each layer of a set of the layers includes multiple weight values. The method trains the network by alternately (1) propagating inputs through the network to generate outputs and adjusting the weight values based on differences between the generated outputs and expected outputs and (2) identifying sets of the weight values for removal according to a set of constraints that accounts for (i) a total number of weight values and (ii) an amount of time required to execute the network on a particular type of integrated circuit.

20 Claims, 21 Drawing Sheets

(56) References Cited

U.S. PATENT DOCUMENTS

| | | | | |
|---|---|---|---|---|
| 2019/0147323 | A1* | 5/2019 | Li | G06N 3/048 |
| | | | | 706/15 |
| 2019/0171927 | A1 | 6/2019 | Diril et al. | |
| 2019/0180184 | A1* | 6/2019 | Deng | G06N 3/045 |
| 2019/0188557 | A1 | 6/2019 | Lowell et al. | |
| 2019/0228274 | A1 | 7/2019 | Georgiadis et al. | |
| 2019/0286970 | A1* | 9/2019 | Karaletsos | G06N 3/045 |
| 2019/0340492 | A1 | 11/2019 | Burger et al. | |
| 2019/0354842 | A1 | 11/2019 | Louizos et al. | |
| 2019/0362235 | A1* | 11/2019 | Xu | G06N 3/04 |
| 2020/0005143 | A1* | 1/2020 | Zamora Esquivel | G06N 3/08 |
| 2020/0104692 | A1* | 4/2020 | Hill | G06F 5/06 |
| 2020/0134461 | A1 | 4/2020 | Chai et al. | |
| 2020/0202213 | A1 | 6/2020 | Rouhani et al. | |
| 2020/0202218 | A1 | 6/2020 | Csefalvay | |
| 2020/0210838 | A1 | 7/2020 | Lo et al. | |
| 2020/0264876 | A1 | 8/2020 | Lo et al. | |
| 2020/0302269 | A1 | 9/2020 | Ovtcharov et al. | |
| 2021/0019630 | A1* | 1/2021 | Yao | G06N 3/045 |
| 2021/0042626 | A1* | 2/2021 | Krishnamoorthy | G06N 3/086 |
| 2021/0073644 | A1* | 3/2021 | Lin | G06N 3/082 |
| 2021/0224642 | A1* | 7/2021 | Moriya | G06N 3/04 |
| 2021/0248459 | A1* | 8/2021 | Li | G06N 3/045 |
| 2021/0264271 | A1* | 8/2021 | Gebre | G06N 3/045 |
| 2021/0406672 | A1 | 12/2021 | Hoang et al. | |

OTHER PUBLICATIONS

Sze, "Efficient Processing of Deep Neural Networks: A Tutorial and Survey", IEEE, 2017. (Previously supplied). (Year: 2017).*

Zhang, "A Systematic DNN Weight Pruning Framework using Alternating Direction Method of Multipliers", 2018. (Year: 2018).*

Bhattacharya, Sourav, et al., "Sparsification and Separation of Deep Learning Layers for Constrained Resource Inference on Wearables," SenSys '16, Nov. 14-16, 2016, 15 pages, ACM, Stanford, CA, USA.

Han, Song, et al., "Learning Both Weights and Connections for Efficient Neural Networks," Oct. 30, 2015, 9 pages, retrieved from https://arxiv.org/abs/1506.02626.

Hu, Hengyuan, et al., "Network Trimming: A Data-Driven Neuron Pruning Approach towards Efficient Deep Architectures," Jul. 12, 2016, 9 pages, retrieved from https://arxiv.org/abs/1607.03250v1.

Neklyudov, Kirill, et al., "Structured Bayesian Pruning via Log-Normal Multiplicative Noise," Proceedings of the 31st Conference on Neural Information Processing Systems (NIPS 2017), Dec. 4-9, 2017, 10 pages, ACM, Long Beach, CA, USA.

Wang, Peiqi, et al., "SNrram: An Efficient Sparse Neural Network Computation Architecture Based on Resistive Random-Access Memory," DAC '18, Jun. 24-29, 2018, 7 pages, ACM, San Francisco, CA, USA.

Agostinelli, Forest, et al., "Learning Activation Functions to Improve Deep Neural Networks," Apr. 21, 2015, 9 pages, retrieved from https://arxiv.org/abs/1412.6830.

Aizenberg, Igor, "Periodic Activation Function and a Modified Learning Algorithm for the Multivalued Neuron," IEEE Transactions on Neural Networks, Dec. 2010, 11 pages, vol. 21, No. 12, IEEE.

Martens, James, "New Insights and Perspectives on the Natural Gradient Method," Nov. 21, 2017, 59 pages, retrieved from https://arxiv.org/abs/1412.1193v9.

Withagen, Heini, "Reducing the Effect of Quantization by Weight Scaling," Proceedings of 1994 IEEE International Conference on Neural Networks (ICNN '94), Jun. 28-Jul. 2, 1994, 3 pages, IEEE, Orlando, Florida, USA.

Achterhold, Jan, et al., "Variational Network Quantization," Proceedings of 6th International Conference on Learning Representations (ICLR 2018), Apr. 30-May 3, 2018, 18 pages, ICLR, Vancouver, BC, Canada.

Andri, Renzo, et al., "YodaNN: An Architecture for Ultra-Low Power Binary-Weight CNN Acceleration," IEEE Transactions on Computer-Aided Design of Integrated Circuits and Systems, Mar. 14, 2017, 14 pages, IEEE, New York, NY, USA.

Bagherinezhad, Hessam, et al., "LCNN: Look-up Based Convolutional Neural Network," Proceedings of 2017 IEEE Conference on Computer Vision and Pattern Recognition (CVPR 2017), Jul. 21-26, 2017, 10 pages, IEEE, Honolulu, HI, USA.

Bong, Kyeongryeol, et al., "A 0.62mW Ultra-Low-Power Convolutional-Neural-Network Face-Recognition Processor and a CIS Integrated with Always-On Haar-Like Face Detector," Proceedings of 2017 IEEE International Solid-State Circuits Conference (ISSCC 2017), Feb. 5-7, 2017, 3 pages, IEEE, San Francisco, CA, USA.

Boo, Yoonho, et al., "Structured Sparse Ternary Weight Coding of Deep Neural Networks for Efficient Hardware Implementations," 2017 IEEE Workshop on Signal Processing Systems (SiPS), Oct. 3-5, 2017, 6 pages, IEEE, Lorient, France.

Chen, Yu-Hsin, et al., "Eyeriss: A Spatial Architecture for Energy-Efficient Dataflow for Convolutional Neural Networks," Proceedings of 2016 ACM/IEEE 43rd Annual International Symposium on Computer Architecture (ISCA 2016), Jun. 18-22, 2016, 13 pages, IEEE, Seoul, South Korea.

Chen, Yu-Hsin, et al., "Using Dataflow to Optimize Energy Efficiency of Deep Neural Network Accelerators," IEEE Micro, Jun. 14, 2017, 10 pages, vol. 37, Issue 3, IEEE, New York, NY, USA.

Courbariaux, Matthieu, et al., "Binarized Neural Networks: Training Neural Networks with Weights and Activations Constrained to +1 or -1," Mar. 17, 2016, 11 pages, arXiv: 1602.02830v3, Computing Research Repository (CoRR)—Cornell University, Ithaca, NY, USA.

Courbariaux, Matthieu, et al., "BinaryConnect: Training Deep Neural Networks with Binary Weights during Propagations," Proceedings of the 28th International Conference on Neural Information Processing Systems (NIPS 15), Dec. 7-12, 2015, 9 pages, MIT Press, Montreal, Canada.

Emer, Joel, et al., "Hardware Architectures for Deep Neural Networks," CICS/MTL Tutorial, Mar. 27, 2017, 258 pages, Massachusetts Institute of Technology, Cambridge, MA, USA, retrieved from http://www.rle.mit.edu/eems/wp-content/uploads/2017/03/Tutorial-on-DNN-CICS-MTL.pdf.

Guo, Yiwen, et al., "Network Sketching: Exploring Binary Structure in Deep CNNs," 2017 IEEE Conference on Computer Vision and Pattern Recognition (CVPR 2017), Jul. 21-26, 2017, 9 pages, IEEE, Honolulu, HI.

He, Zhezhi, et al., "Optimize Deep Convolutional Neural Network with Ternarized Weights and High Accuracy," Jul. 20, 2018, 8 pages, arXiv:1807.07948v1, Computing Research Repository (CoRR)—Cornell University, Ithaca, NY, USA.

Hegde, Kartik, et al., "UCNN: Exploiting Computational Reuse in Deep Neural Networks via Weight Repetition," Proceedings of the 45th Annual International Symposium on Computer Architecture (ISCA '18), Jun. 2-6, 2018, 14 pages, IEEE Press, Los Angeles, CA, USA.

Huan, Yuxiang, et al., "A Low-Power Accelerator for Deep Neural Networks with Enlarged Near-Zero Sparsity," May 22, 2017, 5 pages, arXiv:1705.08009v1, Computer Research Repository (CoRR)—Cornell University, Ithaca, NY, USA.

Jain, Anil K., et al., "Artificial Neural Networks: A Tutorial," Computer, Mar. 1996, 14 pages, vol. 29, Issue 3, IEEE.

Jouppi, Norman, P., et al., "In-Datacenter Performance Analysis of a Tensor Processing Unit," Proceedings of the 44th Annual International Symposium on Computer Architecture (ISCA '17), Jun. 24-28, 2017, 17 pages, ACM, Toronto, ON, Canada.

Judd, Patrick, et al., "Cnvlutin2: Ineffectual-Activation-and-Weight-Free Deep Neural Network Computing," Apr. 29, 2017, 6 pages, arXiv:1705.00125v1, Computer Research Repository (CoRR)—Cornell University, Ithaca, NY, USA.

Kingma, Diederik P., et al., "Auto-Encoding Variational Bayes," May 1, 2014, 14 pages, arXiv:1312.6114v10, Computing Research Repository (CoRR)—Cornell University, Ithaca, NY, USA.

Kong, Chen, et al., "Take it in your stride: Do we need striding in CNNs?," Dec. 7, 2017, 9 pages, arXiv:1712.02502v1, Computer Research Repository (CoRR)—Cornell University, Ithaca, NY, USA.

Leng, Cong, et al., "Extremely Low Bit Neural Network: Squeeze the Last Bit Out with ADMM," Proceedings of 32nd AAAI Con-

(56)  References Cited

OTHER PUBLICATIONS ference on Artificial Intelligence (AAAI-18), Feb. 2-7, 2018, 16 pages, Association for the Advancement of Artificial Intelligence, New Orleans, LA, USA.

Li, Fengfu, et al., "Ternary Weight Networks," May 16, 2016, 9 pages, arXiv:1605.04711v1, Computing Research Repository (CoRR)—Cornell University, Ithaca, NY, USA.

Merolla, Paul, et al., "Deep Neural Networks are Robust to Weight Binarization and Other Non-linear Distortions," Jun. 7, 2016, 10 pages, arXiv:1606.01981v1, Computing Research Repository (CoRR)—Cornell University, Ithaca, NY, USA.

Moshovos, Andreas, et al., "Exploiting Typical Values to Accelerate Deep Learning," Computer, May 24, 2018, 13 pages, vol. 51-Issue 5, IEEE Computer Society, Washington, D.C.

Non-Published Commonly Owned U.S. Appl. No. 17/089,648, filed Nov. 4, 2020, 118 pages, Perceive Corporation.

Non-Published Commonly Owned U.S. Appl. No. 17/089,653, filed Nov. 4, 2020, 118 pages, Perceive Corporation.

Non-Published Commonly Owned U.S. Appl. No. 17/089,660, filed Nov. 4, 2020, 118 pages, Perceive Corporation.

Non-Published Commonly Owned Related U.S. Appl. No. 17/696,809 with similar specification, filed Mar. 16, 2022, 109 pages, Perceive Corporation.

Non-Published Commonly Owned Related U.S. Appl. No. 17/696,810 with similar specification, filed Mar. 16, 2022, 110 pages, Perceive Corporation.

Non-Published Commonly Owned Related U.S. Appl. No. 17/696,812 with similar specification, filed Mar. 16, 2022, 110 pages, Perceive Corporation.

Park, Jongsoo, et al., "Faster CNNs with Direct Sparse Convolutions and Guided Pruning," Jul. 28, 2017, 12 pages, arXiv:1608.01409v5, Computer Research Repository (CoRR)—Cornell University, Ithaca, NY, USA.

Rastegari, Mohammad, et al., "XNOR-Net: ImageNet Classification Using Binary Convolutional Neural Networks," Proceedings of 2016 European Conference on Computer Vision (ECCV '16), Oct. 8-16, 2016, 17 pages, Lecture Notes in Computer Science, vol. 9908, Springer, Cham, Amsterdam, Netherlands.

Shayer, Oran, et al., "Learning Discrete Weights Using the Local Reparameterization Trick," Proceedings of 6th International Conference on Learning Representations (ICLR 2018), Apr. 30-May 3, 2018, 12 pages, ICLR, Vancouver, BC, Canada.

Sze, Vivienne, et al., "Efficient Processing of Deep Neural Networks: A Tutorial and Survey," Aug. 13, 2017, 32 pages, arXiv:1703.09039v2, Computer Research Repository (CoRR)—Cornell University, Ithaca, NY, USA.

Vaswani, Sharan, "Exploiting Sparsity in Supervised Learning," Month Unknown 2014, 9 pages, retrieved from https://vaswanis.github.io > optimization_report.

Wang, Min, et al., "Factorized Convolutional Neural Networks," 2017 IEEE International Conference on Computer Vision Workshops (ICCVW '17), Oct. 22-29, 2017, 9 pages, IEEE, Venice, Italy.

Wen, Wei, et al., "Learning Structured Sparsity in Deep Neural Networks," Oct. 18, 2016, 10 pages, arXiv:1608.03665v4, Computer Research Repository (CoRR)—Cornell University, Ithaca, NY, USA.

Yan, Shi, "L1 Norm Regularization and Sparsity Explained for Dummies," Aug. 27, 2016, 13 pages, retrieved from https://blog.mlreview.com/11-norm-regularization-and-sparsity-explained-for-dummies-5b0e4be3938a.

Yang, Tien-Ju, et al., "Designing Energy-Efficient Convolutional Neural Networks using Energy-Aware Pruning," Apr. 18, 2017, 9 pages, arXiv:1611.05128v4, Computer Research Repository (CoRR)—Cornell University, Ithaca, NY, USA.

Yang, Xuan, et al., "DNN Dataflow Choice Is Overrated," Sep. 10, 2018, 13 pages, arXiv:1809.04070v1, Computer Research Repository (CoRR)—Cornell University, Ithaca, NY, USA.

Zhang, Dongqing, et al., "LQ-Nets: Learned Quantization for Highly Accurate and Compact Deep Neural Networks," Jul. 26, 2018, 21 pages, arXiv:1807.10029v1, Computer Research Repository (CoRR)—Cornell University, Ithaca, NY, USA.

Zhou, Shuchang, et al., "DoReFa-Net: Training Low Bitwidth Convolutional Neural Networks with Low Bitwidth Gradients," Jul. 17, 2016, 14 pages, arXiv:1606.06160v2, Computer Research Repository (CoRR)—Cornell University, Ithaca, NY, USA.

Zhu, Chenzhuo, et al., "Trained Ternary Quantization," Dec. 4, 2016, 9 pages, arXiv:1612.01064v1, Computing Research Repository (CoRR)—Cornell University, Ithaca, NY, USA.

Chen, Shangyu, et al., "Deep Neural Network Quantization via Layer-Wise Optimization Using Limited Training Data," Proceeding of the 33rd AAAI Conference on Artificial Intelligence (AAAI-19), Jul. 2019, 8 pages, AAAI.

He, Yang, et al., "Soft Filter Pruning for Accelerating Deep Convolutional Neural Networks," Aug. 21, 2018, 8 pages, retrieved from https://arxiv.org/abs/1808.06866.

Hu, Yiming, et al., "A Novel Channel Pruning Method for Deep Neural Network Compression," May 29, 2018, 10 pages, retrieved from https://arxiv.org/abs/1805.11394.

Jaderberg, Max, et al., "Speeding Up Convolutional Neural Networks with Low Rank Expansions," May 15, 2014, 12 pages, retrieved from https://arxiv.org/abs/1405.3866.

Kozyrskiy, Nikolay, et al., "CNN Acceleration by Low-Rank Approximation with Quantized Factors," Jun. 16, 2020, 14 pages, retrieved from https://arxiv.org/abs/2006.08878.

Molchanov, Pavlo, et al., "Pruning Convention Neural Networks for Resource Efficient Inference," Jun. 8, 2017, 17 pages, retrieved from https://arxiv.org/abs/1611.06440.

Yang, Huanrui, et al., "Learning Low-rank Deep Neural Networks via Singular Vector Orthogonality Regularization and Singular Value Sparsification," Apr. 20, 2020, 14 pages, retrieved from https://arxiv.org/abs/2004.09031.

Zhang, Xiangyu, et al., "Accelerating Very Deep Convolutional Networks for Classification and Detection," Nov. 18, 2015, 14 pages, retrieved from https://arxiv.org/abs/1505.06798.

Jin, Canran,, et al., "Sparse Ternary Connect: Convolutional Neural Networks Using Ternarized Weights with Enhanced Sparsity," 2018 23rd Asia and South Pacific Design Automation Conference (ASP-DAC), Jan. 22-25, 2018, 6 pages, IEEE, Jeju, South Korea.

Li, Yawei, et al., "Group Sparsity: The Hinge Between Filter Pruning and Decomposition for Network Compression," Mar. 20, 2020, 14 pages, arXiv:2003.08935, Computer Research Repository (CoRR)—Cornell University, Ithaca, NY, USA.

Wang, Peisong, et al., "Fixed-Point Factorized Networks", 2017 IEEE Conference on Computer Vision and Pattern Recognition (CVPR), Jul. 21-26, 2017, 9 pages, IEEE, Honolulu, Hawaii, USA.

* cited by examiner

Figure 2:
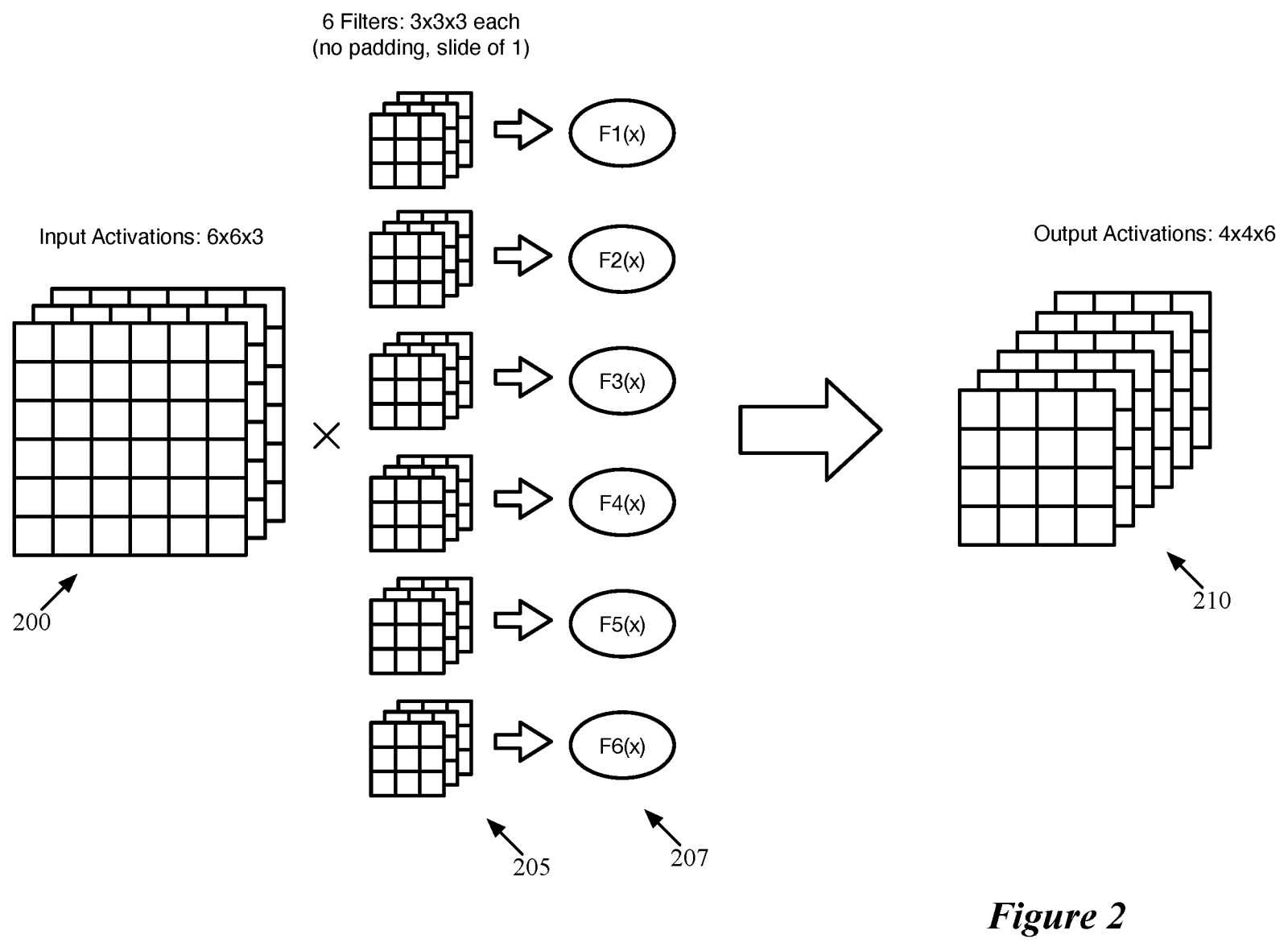

Output Activations: 4x4x6

210

F1(x)  F2(x)  F3(x)  F4(x)  F5(x)  F6(x)

207

205

6 Filters: 3x3x3 each
(no padding, slide of 1)

×

Input Activations: 6x6x3

ACCOUNTING FOR COMPUTE TIME IN TRAINING OF NETWORK

CLAIM OF BENEFIT TO PRIOR APPLICATIONS

This application claims the benefit of U.S. Provisional Patent Applications 63/178,889, filed Apr. 23, 2021, and 63/189,516, filed May 17, 2021. This application is also a continuation-in-part of U.S. patent application Ser. No. 17/089,653. U.S. patent application Ser. No. 17/089,653 claims the benefit of U.S. Provisional Patent Application 63/065,472. U.S. patent application Ser. No. 17/089,653 and U.S. Provisional Patent Applications 63/178,889; 63/189,516; and 63/065,472 are herein incorporated by reference.

BACKGROUND

Machine learning automates the creation, based on historical data, of models that can then be used to make predictions. A class of models called deep neural networks (or DNNs) has become popular over the last few years, and there is now a menagerie of types of DNNs. Some examples of DNN's include feed-forward, convolutional, recurrent, long-short term memory (LSTM), and Neural Turing Machines (NTM).

Neural networks typically involve many (e.g., thousands, millions, or even potentially billions) of weights that are calculated during training and then used when the neural network is embedded into a device. For instance, layers in a ResNet50 network (a known network architecture for image analysis) may have up to 512 3×3 kernels (which may have a depth up to 512) in a single layer, which would include over 2 million weights in a single layer. Recently, techniques have been introduced to solve this issue in part by creating very sparse networks (i.e., with most weight values set to zero). However, other techniques for reducing the number of weights, especially in these larger layers, would be useful.

BRIEF SUMMARY

Some embodiments of the invention improve structural sparsity of a machine-trained network by decomposing one or more initial layers of the network (e.g., convolutional and/or fully-connected layers) into two successive layers and using various techniques to remove sets of weight values from the first of the two successive layers. Each of the initial layers includes a set of filters of weight values for training, and the decomposition replaces these filters with (i) a first set of filters of weight values, (ii) a set of scale values corresponding to the first set of filters, and (iii) a second set of filters. The training applies constraints that push at least some of these scale values to zero (or at least below a low threshold so that the scale can be treated as equal to zero). Because the scale values scale the weight values in the corresponding filter, all of the weight values of a filter that corresponds to a zero scale value can also be set to zero (and the filter effectively removed). In addition, some embodiments insert an additional set of activation functions into the first of the two successive layers.

The decomposition, even without applying the constraints for structural sparsity, reduces the number of weight values in the decomposed layers. In some embodiments, the first set of filters for a decomposed pair of layers has fewer filters than the original layer, with these filters being the same size (i.e., having the same number of weights) and being implemented in the same manner as the original filters. The second set of filters then has the same number of filters as the original layer, but with smaller filters (e.g., 1×1 convolutions, which have fewer weights). In other embodiments, the filters of the first and second sets of filters both have fewer weights per filter than the first layer, though the first set of filters still has fewer filters than the original layer and the second set of filters has the same number of filters as the original layer. The result is that the output feature maps of the second layer (i.e., the second set of filters) have the same structure as the output feature maps of the original layer, while requiring fewer weights to be trained (and thus fewer weights to be stored by a circuit that implements the network).

In some embodiments, at the end of the training of the network, each of the weights is restricted to a set of allowed quantized weight values (e.g., the set $\{0,1,-1\}$ or $\{0,\alpha_k,-\alpha_k\}$, where $\alpha_k$ is a scale value that varies for different layers or filters). In addition, in some embodiments, the training is further complicated in that the output values of each layer are quantized (e.g., to a particular number of bits). The combination of (i) weight quantization (e.g., ternarization), (ii) weight sparsity (ensuring that a threshold of the weight values are equal to zero), and (iii) output value quantization allows for the network to be implemented by a specialized neural network inference circuit of some embodiments that puts restrictions on the weight and intermediate layer output value sizes in the interest of power and memory savings. However, these features (weight and output value quantization) also make training the network more complicated. Whereas a layer of a network with floating-point weight and output values could be decomposed as described after training with minimal loss of accuracy, a result of the weight and value quantization is that the decomposition is better handled during training (and the decomposition itself may be learned).

The training process for the weights of the MT network (with or without decomposition of one or more layers) involves (i) initially training the layers without restricting the weights to allowed sets of values (e.g., training the weights as floating-point values using a standard stochastic gradient descent (SGD) operation), (ii) gradually accounting for the quantization of intermediate layer output values (activation values), and then (iii) using these initially-trained values for the weights to determine the sets of allowed values for each layer and train the weights as restricted to their respective sets of allowed values. After training, each weight value for each node in a given layer will have an assigned weight value that is one of the allowed values for the layer. In some such embodiments, the set of allowed values has two allowed values of $\{0, \alpha\}$ or three allowed values of $\{0, \alpha, -\alpha\}$. The value a can vary between layers or even filters (ax may be used to indicate the allowed scale value for the layer k, or between filters within a layer).

During training, various techniques are used (e.g., as factors in a loss function that measures network output accuracy and is used to adjust the weight values and other parameters) to constrain the weights to their respective allowed values and, in some embodiments, to ensure that at least a threshold percentage of the values are set to 0. For instance, some embodiments use the alternating direction method of multipliers (ADMM) technique to apply the weight values for each quantized layer (including the decomposed layers) to their respective sets of allowed values. Specifically, for ADMM training, some embodiments project the floating-point weight values onto the allowed quantized weight values using a loss function that measures error based on the difference between the projected weight values and the quantized weight values as well as the relative importance of the weights. This projection operation also imposes a sparsity constraint, in some embodiments, requiring that at least a particular percentage of the quantized weight values be set to zero (e.g., by pushing to zero those weights for which the penalty to the loss function for doing so is smallest). After the projection operation, some embodiments perform a "dual-update" operation that updates Lagrange multipliers used in the loss function, then performs additional training by converting the quantized weight values back to floating-point values and performing SGD training. The loss function used for this SGD training, in some embodiments, includes a loss-aware ADMM penalty term that pushes the weights towards the quantized weight values.

Some embodiments introduce decomposition during (or at the start of) the initial floating-point training and use ADMM during this training to enforce structural sparsity. Whereas the later training to quantize the weights mandates a certain level of global sparsity (i.e., that a particular percentage of the overall weight values is set to zero), structural sparsity relates to the elimination of entire filters by setting all of the weights of those filters to zero. Therefore, if a first layer of a decomposition is defined by a set of filters and a corresponding set of scales, the scales provide a source for enforcing structural sparsity. If a scale is set to the value zero, then all of the weight values of the corresponding filter can be set to zero as well (because the values of these weights do not matter if they are all multiplied by zero). This structural sparsity provides an advantage in that any output values of the filter will be zero (i.e., all activations in the corresponding output channel will be zero, assuming that there is not shift/bias added or subtracted and the activation function for the filter does not map the value zero to a non-zero value) so that the weights of the next layer that are multiplied by these zero-activations can also be automatically set to zero. In some embodiments, the filter can be completely removed.

The ADMM training used during this portion of training does not project the weight values onto quantized values (i.e., binary or ternary values). Rather, a portion of the scale values of decomposed pairs of layers (or, in some such embodiments, non-decomposed layers in which the scales for each filter are factored out) are projected to zero based on a set of constraints. In this technique, the SGD training optimizes the weight values (and the scale values) according to a loss function that includes both a standard error loss term as well as a Lagrangian penalty term that pushes scale values toward very small numbers (i.e., below a threshold value such that the scale value can be effectively considered zero and the weights of the corresponding filter can also be set to zero). The Lagrangian penalty term, in some embodiments, is a sum over a function of each scale value, a Lagrange multiplier for each scale value, and a projection variable for each scale variable.

The projection operation of ADMM then imposes structural sparsity constraints in some embodiments. These structural sparsity constraints can include factors such as the overall number of weights in the network, restrictions on the estimated compute time when executing the network on a particular type of integrated circuit (IC), or other such constraints. Whereas ADMM for weight ternarization projects each of the weight values onto one of three values (e.g., $\{0, \alpha_k, -\alpha_k\}$), in this case the operation projects the scale values to either the threshold value (in which case the weight values of the corresponding filter can be set to zero or removed) or infinity (in which case the weight values of the corresponding filter should not be set to zero or removed). The Lagrange multiplier update operation of some embodiments allows the Lagrange multipliers to decrease in such a way that the constraint force on the scale (that pushes the scale towards zero) for a filter nears zero (or decreases all the way to zero) when that scale is large enough that it will not be pushed below the threshold for removal.

However, performing ADMM in this manner for the scales can present certain problems, which some embodiments solve by using a probabilistic projection operation (rather than the standard projection operation). As noted, the dual update operation pushes the Lagrange multipliers for some of the scales to zero, such that these scales are not biased towards zero at all during the next iteration of SGD training. However, the subsequent projection might select a different set of scale values to push below the removal threshold, so that the optimization process would end up being very noisy.

As such, some embodiments use the previously-mentioned probabilistic projection operation. Rather than projecting each scale value to either below threshold (removed) or infinity (not removed), the operation instead identifies a probability for each scale value being removed. Thus, all of the Lagrange multipliers are updated using these probabilities, and in the subsequent SGD training each scale will be pushed on with a force proportional to the probability assigned to that scale. The probability assignment uses a statistical mechanics (maximum entropy) formulation in some embodiments. It should also be noted that some embodiments apply this probabilistic projection to the later weight ternarization training. In this case, rather than projecting each weight to one of the set $\{0, 1, -1\}$ or $\{0, \alpha_k, -\alpha_k\}$, the training system computes a probability projection for each weight across its possible values, and SGD training then targets this expectation value (i.e., a weighted average of the three values based on the probabilities).

As mentioned, the projection (whether probabilistic or not) when training floating-point values (including the scales) to improve structural sparsity imposes various requirements on the structural sparsity. These requirements, in some embodiments, include a total number of weights (after removal of the zeroed-out filters) and an estimated compute time. The total number of weights requirement provides a benefit to pushing scales to zero when that scale corresponds to a filter with a larger number of weights. If the kernel size of a filter is constant (e.g., 3×3), removal of filters in layers with more input channels (i.e., filters having a larger depth) will therefore be preferred. The compute time constraint, in some embodiments, is a function of the type of neural network inference circuit on which the network will be executed. For example, certain types of circuits can compute dot products for a particular number of filters in parallel. As such, dropping the number of filters in a layer below a multiple of this particular number will provide a large savings in computation time. In addition, different layers will require a different amount of time per pass (i.e., each set of computations involving the particular number of filters), which depends on factors such as the kernel size and stride of the filters in the layer as well as the number of computations being performed by each filter.

As is commonly understood, a convolutional layer include a linear function (including the dot product of the layer input activation values and the weights) followed by a non-linear activation function. When a layer is decomposed, the activation functions associated with the original layer are applied to the outputs of the linear functions of the second of the successive layers, in order to mimic the original activation functions. The second layer has the same number of filters as the original layer, and each such filter is associated with the same activation function as its corresponding original-layer filter. To increase the expressiveness of the network, some embodiments also insert activation functions into the first layer. In some embodiments, an activation function is associated with each of the first-layer filters. It can be shown that computational expressiveness increases exponentially with an increase in the depth of computations while only increasing linearly with an increase in the width of computations. The decomposition of a layer and insertion of additional activation functions increases the depth of the network, as activation functions are the computational non-linearities of the network.

The preceding Summary is intended to serve as a brief introduction to some embodiments of the invention. It is not meant to be an introduction or overview of all inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawings, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purpose of explanation, several embodiments of the invention are set forth in the following figures.

FIG. 2 conceptually illustrates a representation of a convolutional layer of a convolutional neural network.

DETAILED DESCRIPTION

Some embodiments of the invention improve structural sparsity of a machine-trained network by decomposing one or more initial layers of the network (e.g., convolutional and/or fully-connected layers) into two successive layers and using various techniques to remove sets of weight values from the first of the two successive layers. Each of the initial layers includes a set of filters of weight values for training, and the decomposition replaces these filters with (i) a first set of filters of weight values, (ii) a set of scale values corresponding to the first set of filters, and (iii) a second set of filters. The training applies constraints that push at least some of these scale values to zero (or at least below a low threshold so that the scale can be treated as equal to zero). Because the scale values scale the weight values in the corresponding filter, all of the weight values of a filter that corresponds to a zero scale value can also be set to zero (and the filter effectively removed). In addition, some embodiments insert an additional set of activation functions into the first of the two successive layers.

The decomposition, even without applying the constraints for structural sparsity, reduces the number of weight values in the decomposed layers. In some embodiments, the first set of filters for a decomposed pair of layers has fewer filters than the original layer, with these filters being the same size (i.e., having the same number of weights) and being implemented in the same manner as the original filters. The second set of filters then has the same number of filters as the original layer, but with smaller filters (e.g., 1×1 convolutions, which have fewer weights). In other embodiments, the filters of the first and second sets of filters both have fewer weights per filter than the first layer, though the first set of filters still has fewer filters than the original layer and the second set of filters has the same number of filters as the original layer. The result is that the output feature maps of the second layer (i.e., the second set of filters) have the same structure as the output feature maps of the original layer, while requiring fewer weights to be trained (and thus fewer weights to be stored by a circuit that implements the network).

Figure 1:
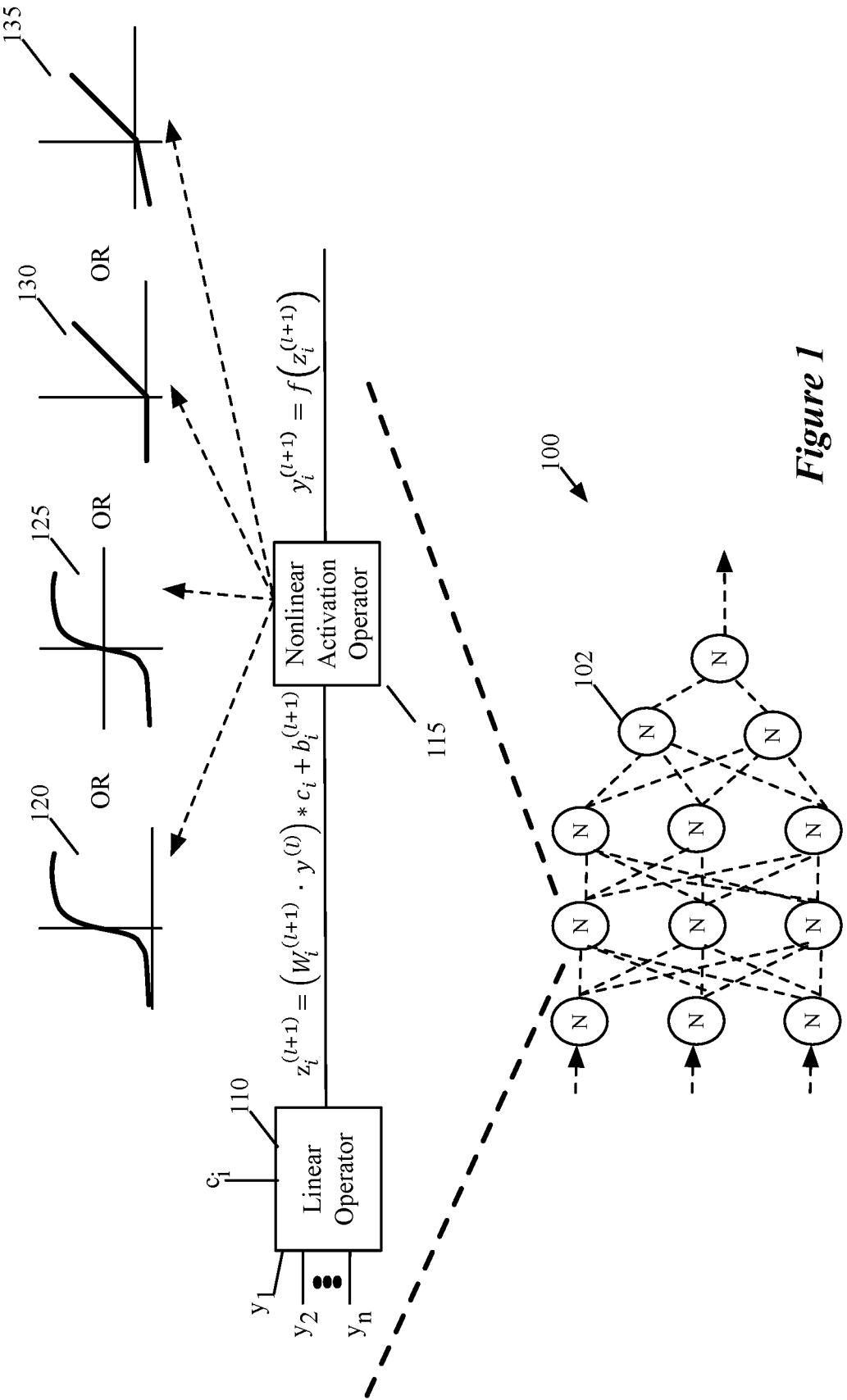
FIG. 1 illustrates an example of a multi-layer machine-trained network of some embodiments.

FIG. 1 illustrates an example of a multi-layer machine-trained network of some embodiments. This figure illustrates a feed-forward neural network 100 that has multiple layers of processing nodes 102 (also called neurons). In all but the first (input) and last (output) layer, each node 102 receives two or more outputs of nodes from earlier processing node layers and provides its output to one or more nodes in subsequent layers. The output of the node (or nodes) in the last layer represents the output of the network 100. In different embodiments, the output of the network 100 is a number in a range of values (e.g., 0 to 1), a vector representing a point in an N-dimensional space (e.g., a 128-dimensional vector), or a value representing one of a predefined set of categories (e.g., for a network that classifies each input into one of eight possible outputs, the output could be a three-bit value).

In this example, the neural network 100 only has one output node. Other neural networks of other embodiments have several output nodes that provide more than one output value. Furthermore, while the network 100 includes only a few nodes 102 per layer, a typical neural network may include a varying number of nodes per layer (with some layers having several thousand nodes) and significantly more layers than shown (e.g., several dozen layers). In addition, the neural networks of other embodiments may be types of networks other than feed forward networks (e.g., recurrent networks, regulatory feedback networks, radial basis function networks, etc.).

The illustrated network 100 is a fully-connected network in which each node in a particular layer receives as inputs all of the outputs from the previous layer. However, as mentioned, the neural networks of some embodiments are convolutional feed-forward neural networks. In this case, the intermediate layers (referred to as "hidden" layers) may include convolutional layers, pooling layers, element-wise operation layers, fully-connected layers, and/or normalization layers. The convolutional layers of some embodiments use a small kernel (e.g., 2×2, 3×3, 5×5, etc.) to process blocks of input values (output values from a previous layer) in a set of two-dimensional grids (e.g., channels of pixels of an image, input feature maps) with the same set of parameters. The kernels (also referred to as filters) are three-dimensional, and multiple kernels are used to process each group of input values in a layer (resulting in a set of three-dimensional output grids, also referred to as output feature maps). Pooling layers combine clusters of outputs from one layer into a single node at the next layer, as part of the process of reducing an image (which may have a large number of pixels) or other input item down to a smaller size (e.g., a vector output). In some embodiments, pooling layers can use max pooling (in which the maximum value among the clusters of node outputs is selected) or average pooling (in which the clusters of node outputs are averaged).

FIG. 2 conceptually illustrates a representation of a convolutional layer of a convolutional neural network. The convolutional layer receives a set of input activation values 200 organized as a three-dimensional array. This three-dimensional array is typically either (i) a set of input values for the network, if the convolutional layer is the first layer of the network, or (ii) a set of output values of a previous layer of the network (e.g., a previous convolutional layer, a pooling layer, etc.). The array can be conceptualized as a set of two-dimensional grids, also referred to as input feature maps or input channels for the layer, as shown in the figure. In this example, the dimensions of the input values are 6×6×3 (i.e., three 6×6 input channels).

Each computation node of the convolutional layer involves a linear component (e.g., a dot product followed by scaling and bias functions) as well as a non-linear component, as further described below. The input to each computation node is a subset of the input activation values, and the dot product for the computation node involves multiplying those input activation values by the weights that make up one of the filters of the layer. As shown, in this example the layer includes six filters 205, each of which is 3×3×3. Each value in one of the filters is a weight value that is trained using the techniques described herein. Thus, in the example shown in this figure, each filter includes 27 trainable weight values.

The size of the filters in the x and y directions can vary (3×3 and 5×5 are common sizes), but in some embodiments the depth is required to match the depth of the input activations (in this case there are three input feature maps, or channels, so the depth of the filters is three). The number of filters in a given layer can also vary; in general, each filter is attempting to identify the presence or extent of a particular feature in the input values. For instance, in image analysis, a filter in an early layer might test for the presence of an edge in a particular direction while a filter in a later layer tests for the presence of a more specific object type in the image (e.g., a nose).

To generate the output activations, each of the filters 205 is applied to numerous subsets of the input activation values 200. Specifically, in a typical convolution layer, each 3×3×3 filter is moved across the three-dimensional array of activation values, and the dot product between the 27 activations in the current subset and the 27 weight values in the filter is computed. This process starts in the top left corner (e.g., x=0-2, y=0-2) of the grid, and includes the full depth of the array. The filter moves across the rows, in this case using a slide of 1 (i.e., moving one column per computation node, such that the second dot product uses activations at x=1-3, y=0-2). When the end of a row is reached, the filter is moved back to the first columns (i.e., x=0-2) and down one row (i.e., y=1-3), and so on until the bottom right corner of the array is reached. Though not the case in this example, some embodiments use zero-padding at the edges of the grids (e.g., to allow for better detection of features at the edges of images).

Each computation node, in some embodiments, involves this dot product as well as the subsequent operations to generate the output activation values. The linear component includes any scale and/or bias calculations, and the non-linear component involves applying an activation function to the output of the linear component. As shown in the figure, each filter 205 has an associated activation function 207. In some embodiments, the activation function associated with a particular filter is the function applied to the output of the linear component of each computation node that uses that particular filter. Different embodiments may use the same activation function for all filters of a layer (and therefore all nodes in the layer) or have different activation functions associated with different filters (e.g., different types of activation functions or activation functions of the same type but with different parameters). The parameters of these activation functions 207 are also trained like the weight parameters in some embodiments.

The output activation values 210 are arranged in a 4×4×6 array in this example. The outputs from a single filter are arranged in a single grid (also referred to as an output feature map or output channel), and because the example has six filters 205, the output activations have six output feature maps. Using a slide value of 1 with no zero-padding results in a 4×4 output feature map for each filter. These output activation values 210 are then the input activation values for the next layer of the neural network.

As shown in FIG. 1, each node in the neural network 100 has a linear component 110 and a nonlinear component 115. The linear component 110 of each hidden or output node in this example computes a dot product of a vector of weight coefficients and a vector of output values of prior nodes (i.e., as described above for convolutional layers), multiplies this by a scaling value (which may be set to 1), and adds an offset. In other words, in a convolutional or fully-connected layer, a node's linear operator computes a scaled weighted sum of its inputs (which are outputs of the previous layer of nodes) plus an offset (also referred to as a bias). Similarly, the linear component 110 of each input node of some embodiments computes a dot product of a vector of weight coefficients and a vector of input values, scales this dot product, and adds an offset. In other embodiments, each input node receives a single input and passes that input as its output. Each node's nonlinear component 115 computes a function based on the output of the node's linear component 110. This function is commonly referred to as the activation function, and the outputs of the node (which are then used as inputs to the next layer of nodes) are referred to as activations.

The notation of FIG. 1 can be described as follows. Consider a neural network with L hidden layers (i.e., L layers that are not the input layer or the output layer). The variable/can be any of the hidden layers (i.e., l∈{1, . . . , L−1} index the hidden layers of the network, with (l+1) l=0 representing the input layer and l=L representing the output layer). The variable $z_i$ represents the output of the linear component 110 of a hidden node i in layer l+1. As indicated by the following Equation (1), the variable $z_i^{(l+1)}$ is computed as the dot product of a vector of weight values $W_i^{(l+1)}$ and a vector of outputs $y^{(l)}$ from layer/multiplied by a scaling value $c_i$, and offset by a bias value $b_i$:

$$z_i^{(l+1)} = \left(W_i^{(l+1)} \cdot y^{(l)}\right) * c_i + b_i^{(l+1)} = \sum_{k=1}^{n} \left(w_{ik}^{(l+1)} * y_k^{(l)}\right) * c_i + b_i^{(l+1)}. \qquad (1)$$

The scaling value $c_i$ is a value to which all the weight values for the node are normalized. In some embodiments, the scaling value $c_i$ is 1. The symbol*is an element-wise product, while the symbol · is the dot product. The weight coefficients $W^{(l)}$ are parameters that are adjusted during the network's training in order to configure the network to solve a particular problem (e.g., object or face recognition in images, voice analysis in audio, depth analysis in images, etc.). In some embodiments, the training algorithm imposes certain constraints on the weight values. Specifically, some embodiments impose a ternary constraint that requires all of the weight values for any given layer to be either zero, a positive value, or a negation of the positive value (e.g., 0, 1, and −1). In addition, some embodiments require that at least a threshold percentage of the weight values (for a given layer or for the entire network) are equal to zero (e.g., 75%, 80%, etc.).

The output $y_i^{(l+1)}$ of the nonlinear component 115 of a node in layer l+1 is a function of the node's linear component, and can be expressed as by Equation (2) below:

$$y_i^{(l+1)} = f\left(z_i^{(l+1)}\right). \qquad (2)$$

In this equation, f is the nonlinear activation function for node i. Examples of such activation functions include a sigmoid function 120 ($f(x)=1/(1+e^{-x})$), a tanh function 125, a ReLU (rectified linear unit) function 130 or a leaky ReLU function 135, as shown.

Traditionally, the sigmoid function and the tanh function have been the activation functions of choice. More recently, the ReLU function ($f(x)=max(0, x)$) has been proposed for the activation function in order to make it easier to compute the activation function. See Nair, Vinod and Hinton, Geoffrey E., "Rectified linear units improve restricted Boltzmann machines," ICML, pp. 807-814, 2010. Even more recently, the leaky ReLU has been proposed in order to simplify the training of the processing nodes by replacing the flat section (i.e., x<0) of the ReLU function with a section that has a slight slope. See He, Kaiming, Zhang, Xiangyu, Ren, Shaoqing, and Sun, Jian, "Delving deep into rectifiers: Surpassing human-level performance on imagenet classification," arXiv preprint arXiv: 1502.01852, 2015. In some embodiments, the activation functions can be other types of functions, like cup functions, periodic functions, piecewise linear functions, etc.

Equation (2) can be expressed in the following expanded format of Equation (3):

$$y_i^{(l+1)} = f\left(z_i^{(l+1)}\right) = f\left[\left(\sum_{k=1}^{n} w_{ik} * y_k\right) * c_i + b_i^{(l+1)}\right]. \qquad (3)$$

In this equation, $w_{ik}$ are weight values associated with the inputs $y_k$ of the node i in layer l+1.

Before a multi-layer network (e.g., a convolutional neural network) can be used to solve a particular problem, the network is put through a supervised training process that adjusts the network's configurable parameters (e.g., the weight values, biases, etc.). The training process iteratively selects different input value sets with known output value sets. For each selected input value set, the training process typically (1) forward propagates the input value set through the network's nodes to produce a computed output value set and then (2) backpropagates a gradient (rate of change) of a loss function (output error) that quantifies in a particular way the difference between the input set's known output value set and the input set's computed output value set, in order to adjust the network's configurable parameters (e.g., the weight values). In addition, as described further below, some embodiments decompose certain layers of the network into what are effectively two layers that use fewer combined weight values than the original layer and quantize the network (constraining the weight values to sets of allowed values and/or accounting for quantization of output values to a certain number of bits). Some such embodiments use the alternating direction method of multipliers (ADMM) to handle this decomposition and/or quantization of the weight values (which includes performing forward and backward propagation) and to ensure that at least a threshold percentage of the weight values are set to zero.

In some embodiments, at the end of the training of the network, each of the weights is restricted to a set of allowed quantized weight values (e.g., the set $\{0,1,-1\}$ or $\{0,\alpha_k,-\alpha_k\}$, where $\alpha_k$ is a scale value that varies for different layers or filters). In addition, in some embodiments, the training is further complicated in that the output values of each layer are quantized (e.g., to a particular number of bits). The combination of (i) weight quantization (e.g., ternarization), (ii) weight sparsity (ensuring that a threshold of the weight values are equal to zero), and (iii) output value quantization allows for the network to be implemented by a specialized neural network inference circuit of some embodiments that puts restrictions on the weight and intermediate layer output value sizes in the interest of power and memory savings. However, these features (weight and output value quantization) also make training the network more complicated. Whereas a layer of a network with floating-point weight and output values could be decomposed as described after training with minimal loss of accuracy, a result of the weight and value quantization is that the decomposition is better handled during training (and the decomposition itself may be learned).

The training process for the weights of the MT network (with or without decomposition of one or more layers) involves (i) initially training the layers without restricting the weights to allowed sets of values (e.g., training the weights as floating-point values using a standard stochastic gradient descent (SGD) operation), (ii) gradually accounting for the quantization of intermediate layer output values (activation values), and then (iii) using these initially-trained values for the weights to determine the sets of allowed values for each layer and train the weights as restricted to their respective sets of allowed values. After training, each weight value for each node in a given layer will have an assigned weight value that is one of the allowed values for the layer. In some such embodiments, the set of allowed values has two allowed values of $\{0, \alpha\}$ or three allowed values of $\{0, \alpha,-\alpha\}$. The value a can vary between layers or even filters (ax may be used to indicate the allowed scale value for the layer k, or between filters within a layer).

During training, various techniques are used (e.g., as factors in a loss function that measures network output accuracy and is used to adjust the weight values and other parameters) to constrain the weights to their respective allowed values and, in some embodiments, to ensure that at least a threshold percentage of the values are set to 0. For instance, some embodiments use the alternating direction method of multipliers (ADMM) technique to apply the weight values for each quantized layer (including the decomposed layers) to their respective sets of allowed values. Specifically, for ADMM training, some embodiments project the floating-point weight values onto the allowed quantized weight values using a loss function that measures error based on the difference between the projected weight values and the quantized weight values as well as the relative importance of the weights. This projection operation also imposes a sparsity constraint, in some embodiments, requiring that at least a particular percentage of the quantized weight values be set to zero (e.g., by pushing to zero those weights for which the penalty to the loss function for doing so is smallest). After the projection operation, some embodiments perform a "dual-update" operation that updates Lagrange multipliers used in the loss function, then performs additional training by converting the quantized weight values back to floating-point values and performing SGD training. The loss function used for this SGD training, in some embodiments, includes a loss-aware ADMM penalty term that pushes the weights towards the quantized weight values. The ADMM technique is described in the paper "Extremely Low Bit Neural Network: Squeeze the Last Bit Out with ADMM" by Leng, Cong, et al., 32nd AAAI Conference on Artificial Intelligence, pp. 3466-3473 (2018), which is incorporated herein by reference.

Before describing the training operations in greater detail, the concept of decomposing a neural network layer into multiple smaller layers is introduced. Certain network architectures may have layers with millions of weights, which can result in weights and/or filters that are effectively redundant. That is, certain larger layers may have more weights than are needed to extract the information required at that layer. Low-rank decomposition of a layer allows for a reduction in the number of weights used in that layer, while maintaining the same (or nearly the same) level of expressiveness for the layer. Specifically, some embodiments transform a k×k, stride s convolution that produces Nout feature maps into a back-to-back pair of convolutions. In some such embodiments, the first convolution in the decomposition is a k×k, stride s convolution that outputs a reduced number r of feature maps, where $r<N_{out}$. The second convolution in the decomposition is a 1×1, stride 1 convolution that decompresses the r feature maps into the original $N_{out}$ feature maps. More generally, some embodiments decompose a $k_x×k_y$, stride $S_x×S_y$ convolution that produces $N_{out}$ feature maps into a $k_x×1$, stride $s_x×1$ convolution that outputs a reduced number r of feature maps, where $r<N_{out}$, followed by a 1×$k_y$, stride 1×$S_y$ convolution that takes the r feature maps as input and outputs the original $N_{out}$ feature maps.

To illustrate the notion of decomposition of a convolutional layer, the layer can be represented by matrix multiplication operations. As an example, a k×k convolution with stride 1 will be considered. Such a convolution can be represented by (i) an input tensor/with Nin input feature maps, each of which has a spatial area $A_{in}$, for a total of $N1=N_{in}A_{in}$ inputs, (ii) an output tensor Y with $N_{out}$ output feature maps, each of which has a spatial area $A_{out}$, for a total of $N_y=N_{out} A_{out}$ ouputs, and (iii) a weight tensor W with dimensions $N_{out}×N_{in}×k×k$, for a total of $N_w=N_{out}N_{in}k^2$ weights. The output values of such a convolution are represented as:

$$(4)$$

$$Y(c_{out}, x, y) = \sum_{c_{in}=0}^{N_{in}-1}\sum_{i=0}^{k-1}\sum_{j=0}^{k-1} I\left(c_{in}, x-\left\lfloor\frac{k}{2}\right\rfloor+i, y-\left\lfloor\frac{k}{2}\right\rfloor+j\right)W(c_{out}, c_{in}, i, j),$$

where $c_{out}$ is the index of the output channel (i.e., $C_{out}$ ranges from 0 to $N_{out}-1$), and (x, y) are the spatial coordinates of the output feature maps.

Each output value Y ($c_{out}$, x, y) is a linear combination of entries in a k×k×$N_{in}$ patch of the input tensor with volume $V_p=k^2 N_{in}$, and there are $A_{out}$ of these patches. Thus, the convolution can be represented as a matrix multiplication using a strategy for rearranging image blocks into columns. This process takes each k×k×$N_{in}$ patch, represents the patch as a column vector, and then arranges these columns as an input matrix Î, which is thus a $V_p$ X $A_{out}$ matrix. It should be noted that each entry in the input tensor/is copied into $k^2$ different columns in Î, ignoring boundary/padding issues (each input value is used in the calculation of $k^2$ different output values for each filter). In some embodiments, the structure of the input matrix Î is analogous to a Toeplitz matrix. The weight tensor is represented as a matrix with $N_{out}$ rows and $V_p$ columns, for a total of $N_{out}V_p=N_{out} N_{in}k^2=N_w$ weights. That is, each row corresponds to a particular filter of the convolutional layer, with all of the weights in that filter part of the row.

The output $\hat{Y}$ is the product of $\hat{W}$ (an $N_{out} \times V_p$ matrix) with $\hat{I}$ (a $V_p \times A_{out}$ matrix) and is thus an $N_{out} \times A_{out}$ matrix, with the expected number $N_{out}A_{out}=N_y$ outputs. The convolution can be computed as $$\hat{Y}(c_{out},\, p) = \sum_{a=0}^{V_p-1} \hat{W}(c_{out},\, a)\hat{I}(a,\, p), \qquad (5)$$

where p is the index of the patch, with $0 \leq p < A_{out}$. In this document, the input is represented as a column vector, and therefore the convolution is computed by applying the weight matrix on the left of the input. As a note, the ^'s that decorate W, I and Y in the above discussion are dropped in subsequent discussion within this document, which is a trivial transformation in some embodiments.

As noted, the weight matrices for a convolution can be approximated using a low-rank decomposition:

$$W(c_{out},\, a) \approx X(c_{out},\, a) = \sum_{m=0}^{r-1} B(c_{out},\, m)A(m,\, a). \qquad (6)$$

Here, r is the rank of the decomposition, B is an $N_{out} \times r$ matrix, A is an $r \times V_p$ matrix, and their product, X=BA, is the low-rank approximation for the weight matrix W. The matrix A operates on the "Toeplitz" input matrix, and thus has the form of a convolution (in that the same matrix is applied to each patch of the input matrix). A has the same spatial dimensions as the original weight matrix W (i.e., represents a k×k, stride-1 convolution), but has a smaller number of rows (i.e., $r<N_{out}$) and thus generates a smaller number of feature maps. The matrix B transforms the r values at each output-map (x, y) into $N_{out}>r$ values. Thus, B represents a 1×1 convolution that decompresses the compressed representation produced by A.

As noted, in some embodiments, each of the weights in the matrices A and B is restricted to a set of allowed quantized weight values (e.g., the set $\{0,1,-1\}$ or $\{0,\alpha_k,-\alpha_k\}$). In addition, in some embodiments, the training is further complicated in that the output values of each layer are quantized (e.g., to a particular number of bits). The combination of (i) weight quantization (e.g., ternarization), (ii) weight sparsity (ensuring that a threshold of the weight values are equal to zero), and (iii) output value quantization allows for the network to be implemented by a specialized neural network inference circuit of some embodiments that restricts the types of allowable networks in the interest of power and memory savings. However, these features (especially weight and output value quantization) also make training the network more complicated. Whereas a layer of a network with floating-point weight and output values could be decomposed as described after training with minimal loss of accuracy, a result of the weight and value quantization is that the decomposition is better handled during or prior to the course of training the network.

Figure 3:
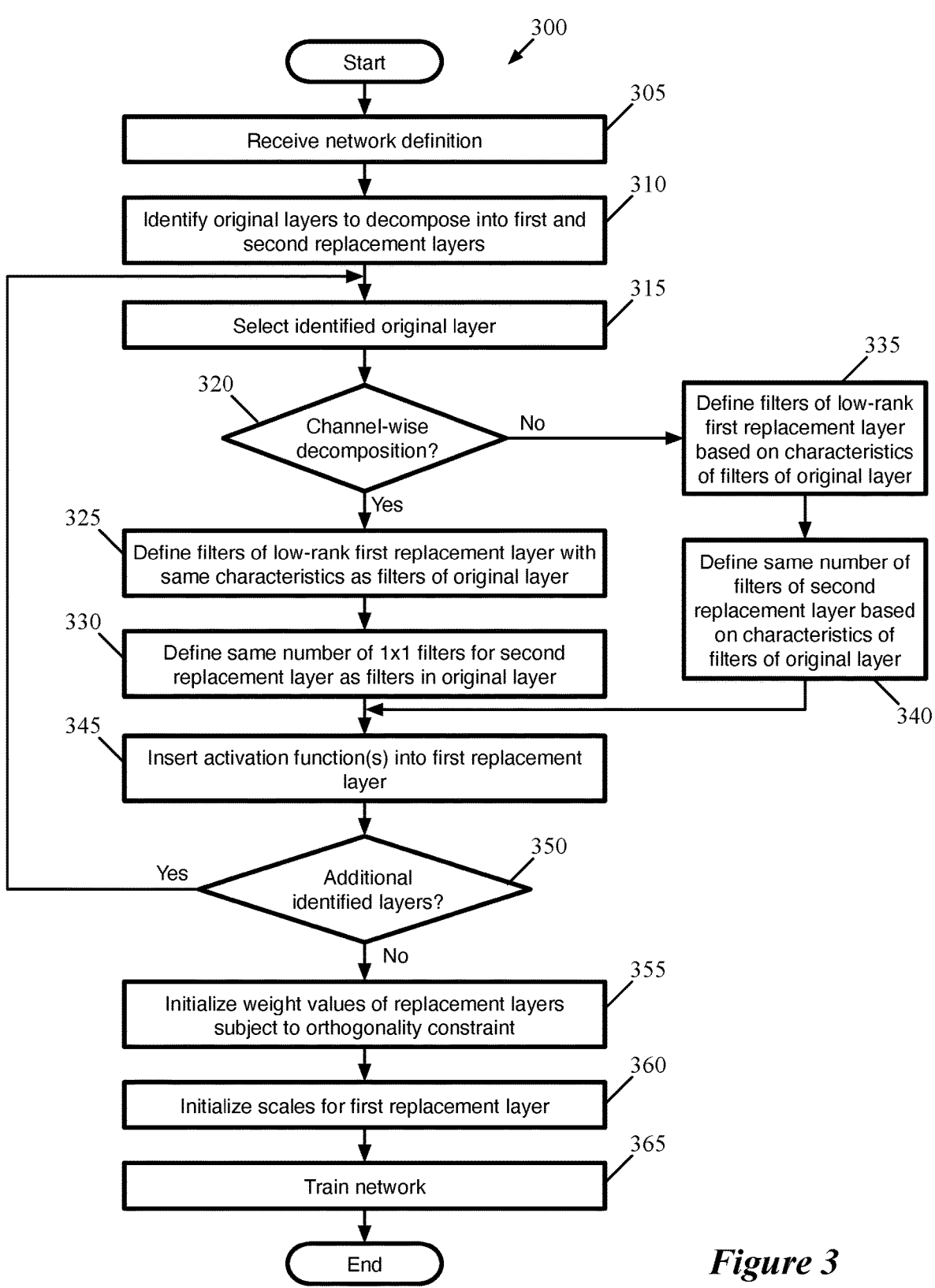
FIG. 3 conceptually illustrates a process of some embodiments for modifying a network to decrease the number of weights in at least some of the layers of the network prior to training the network.

FIG. 3 conceptually illustrates a process 300 of some embodiments for modifying a network to decrease the number of weights in at least some of the layers of the network prior to training the network. The process 300 reduces the complexity of these layers while maintaining the expressiveness of the decomposed layers (i.e., the accuracy of the network should not be meaningfully decreased) and better enabling structural sparsity in the network (i.e., identifying filters that can have all weights set to zero). In some embodiments, the process 300 is performed by a neural network training system that trains the parameters (e.g., weights, bias values, etc.) of a neural network. The process 300 will be described in part by reference to FIGS. 4 and 5, which illustrate different techniques for decomposing a simple convolutional layer.

As shown, the process 300 begins by receiving (at 305) a network definition. In some embodiments, the network definition specifies the structure of the network. This network structure includes the type of each layer (e.g., convolutional, element-wise addition or multiplication, pooling, etc.), as well as the structure of the input and output of the layer. For convolutional layers, the input structure is typically defined by the output of the previous layer, while the output structure (for a given input structure) is defined based on the number of filters, the kernel size of those filter, and how that filter is applied (padding, x/y stride). In some embodiments, the network is initially trained with floating-point weight values (i.e., prior to decomposition, though additional training is still required after decomposition), while in other embodiments decomposition is performed prior to any training.

Next, the process 300 identifies (at 310) original layers (i.e., layers of the received network definition) to decompose into first and second replacement layers. Some embodiments may decompose layers into more than two replacement layers, but the technique primarily described herein uses two layers—the more layers into which a single layer is decomposed, the more complexity involved in the training process to ensure that the network retains the same features and accuracy. In some embodiments, the original layers to decompose are manually identified (i.e., by a user of the network training system) or are identified according to manually-specified characteristics (e.g., layers of at least a particular size). For instance, very large layers (e.g., layers with hundreds of filters producing hundreds of output feature maps) might have a lot or redundancy that can be eliminated via layer decomposition (and subsequent filter pruning, described below). In this case, reducing the number of filters via decomposition could actually help standard training techniques (e.g., stochastic gradient descent) better explore the parameter space, leading to more accurate networks. Other embodiments decompose all of the layers of the network.

To reduce the complexity of some of the layers of the network, some embodiments decompose a layer into two successive layers: a first low-rank replacement layer with a reduced number of filters and a second replacement layer with the same number of filters as the original layer, but using 1×1 convolutions. This effectively reduces the number of weights for the layer as a whole, while still resulting in the same number of output feature maps (and with those output feature maps having the same size) as the original single layer.

Thus, the process 300 selects (at 315) one of the identified original network layers for decomposition. Different embodiments may select the identified layers in different orders (e.g., from the start of the network to the end, in a random order, etc.). In addition, it should be understood that the process 300 is a conceptual process, and the decomposition operations might be performed for multiple layers in parallel in some embodiments.

For the selected layer, the process 300 determines (at 320) whether the decomposition will be channel-wise decomposition or spatial decomposition. As described above, different embodiments can decompose a $k_x \times k_y \times N_{out}$, stride $s_x \times Sy$ convolution into either (i) a $k_x \times k_y \times r$, stride $s_x \times Sy$ convolution (where r, the number of filters, is smaller than $N_{out}$) followed by a $1 \times 1 \times N_{out}$, stride 1 convolution or (ii) a $k_x \times 1$ x r, stride $s_x \times 1$ convolution followed by a $1 \times k_y \times N_{out}$, stride 1 x Sy convolution. The former is referred to herein as channel-wise decomposition, while the latter is referred to as spatial-wise decomposition.

If performing channel-wise decomposition, the process 300 defines (at 325) filters of the low-rank first replacement layer with the same characteristics as the filters of the original layer. That is, if the original layer includes a first number of k×k filters with a defined padding and stride, then the first replacement layer includes a second number (that is smaller than the first number) of k×k filters with the same defined padding and stride. The process 300 also defines (at 330) the same number of 1×1 filters for the second replacement layer as there are filters in the original layer. That is, if the original layer includes a first number of k×k filters, then the second layer includes that same first number of 1×1 filters.

Figure 4:
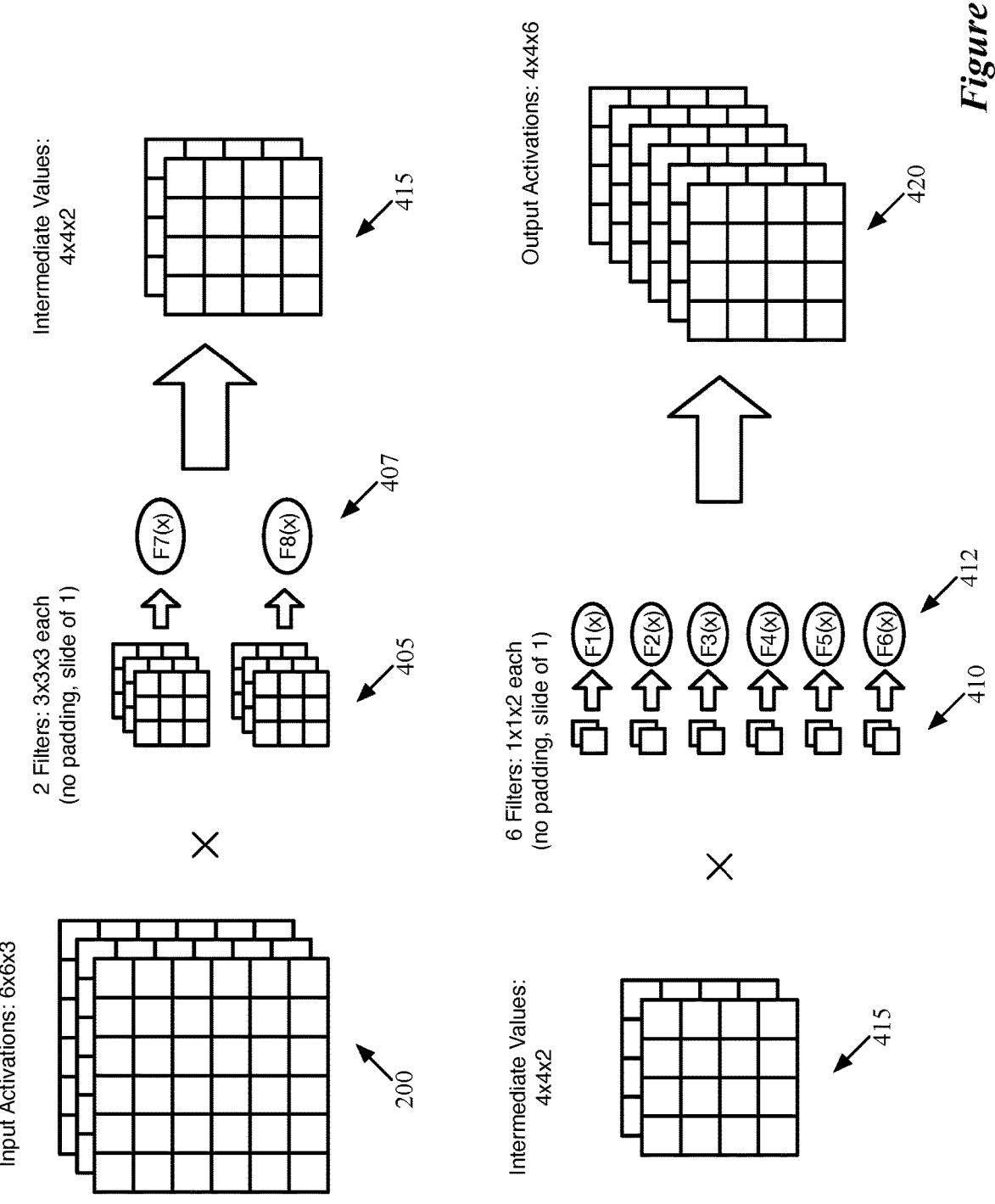
FIG. 4 conceptually illustrates a channel-wise decomposition of a simple convolutional layer.

FIG. 4 conceptually illustrates a channel-wise decomposition of the layer shown in FIG. 2. This layer takes as input the input activations 200 (i.e., three 6×6 feature maps), and uses six 3×3 filters 205 with no padding and a slide of 1. Here, the layer is decomposed into two layers with two different sets of filters 405 and 410.

The first set of filters 405 includes only two filters (rather than six), which have the same dimensions (3×3×3) as the filters 205 of the original layer. Each of these filters has an associated activation function 407, which are the new activation functions inserted into the decomposition (described below by reference to operation 345). In some embodiments, all of the activation functions are the same (e.g., the same ReLU function) and these inserted activation functions are the same as the activation functions 207 shown in FIG. 2. In other embodiments, different activation functions are used for the first layer of the decomposition. These filters followed by their activation functions, as shown, produce intermediate values 415 as two output feature maps, which have the same dimensions as the output activations 210 from the original layer (i.e., 4×4 output feature maps).

These intermediate values 415 are provided as input to the filters 410 of the second replacement layer. As shown, these are six 1×1 filters that have a depth (2) equal to the number of intermediate feature maps (i.e., the number of filters in the first set of filters 405). The six 1×1 filters 410 expand the two intermediate feature maps into six output feature maps 420, which have the same dimensions and number of activations as the original output feature maps 210. These filters 410 also have their own associated activation functions 412. In some embodiments, the activation functions 412 used for the second layer of the decomposition are the same as the original activation functions 207. In other embodiments, different activation functions are used for this second layer of the decomposition. In this simple example, the total number of weights that need to be trained (and stored by an inference circuit) is reduced from 162 (3×3×3×6) in the original set of filters 205 to 66 (3×3×3×2+1×1×2×6) in the combined first and second sets of replacement filters 405 and 410.

If performing spatial-wise decomposition, the process 300 defines (at 335) filters of the low-rank first replacement layer based on characteristics as the filters of the original layer. As described above, if the original layer includes a first number of k×k filters with a defined horizontal padding and horizontal stride, then the first replacement layer includes a second number (that is smaller than the first number) of k×1 filters with the same defined horizontal padding and stride. The process 300 also defines (at 340) the same number of filters for the second replacement layer as there are filters in the original layer, also based on the characteristics of the filters of the original layer. That is, if the original layer includes a first number of k×k filters with a defined vertical padding and vertical stride, then the second layer includes that same first number of 1 x k filters with the same defined vertical padding and stride.

Figure 5:
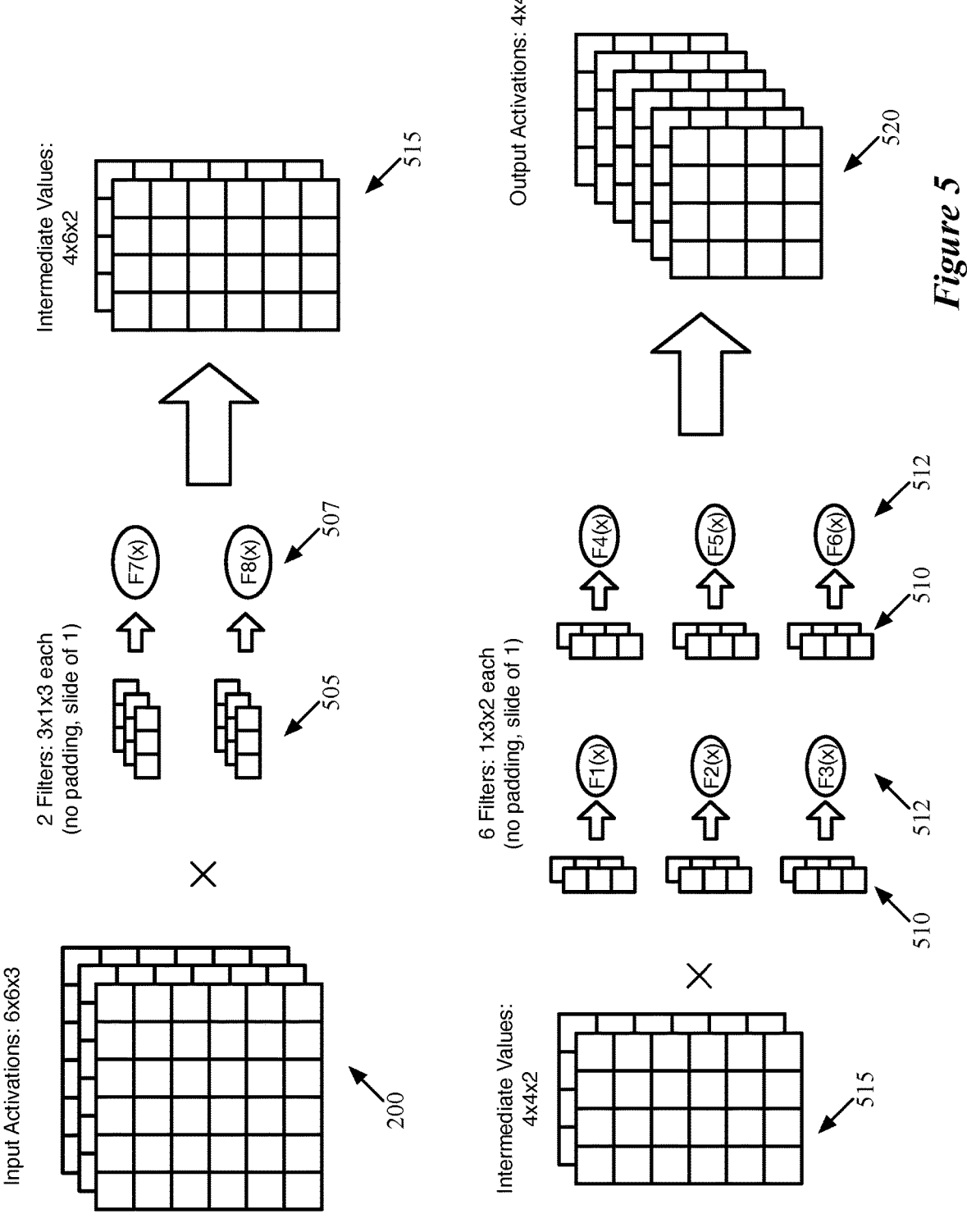
FIG. 5 conceptually illustrates a spatial-wise decomposition of a simple convolutional layer.

FIG. 5 conceptually illustrates such a spatial-wise decomposition of the layer shown in FIG. 2. This layer takes as input the input activations 200 (i.e., three 6×6 feature maps), and uses six 3×3 filters 205 with no padding and a slide of 1. Here, the layer is decomposed into two layers with two different sets of filters 505 and 510 and activation functions 507 and 512.

The first set of filters 505 includes only two filters (rather than six) that have dimensions of 3×1×3 (i.e., fewer weights per filter than the filters 205 of the original layer). Each of these filters has an associated activation function 507, which are the new activation functions inserted into the decomposition. These filters and associated activation functions, as shown, produce intermediate values 515 as two output feature maps, which are larger than the output activations 210 from the original layer (i.e., the smaller size of the filters results in larger 4×6 output feature maps). These intermediate values 515 are provided as input to the filters 510 of the second replacement layer.

As shown, these are six 1×3 filters that have a depth (2) equal to the number of intermediate feature maps (i.e., the number of filters in the first set of filters 505). The six 1×3 filters 510 expand the two intermediate feature maps into six output feature maps 520, which have the same dimensions and number of activations as the original output feature maps 210. These filters 510 also have their own associated activation functions 512. In some embodiments, the activation functions 512 used for the second layer of the decomposition are the same as the original activation functions 207. In other embodiments, different activation functions are used for this second layer of the decomposition. In this simple example, the total number of weights that need to be trained (and stored by an inference circuit) is reduced from 162 (3×3×3×6) in the original set of filters 205 to 54 (3×1×3×2+1×3×2×6) in the combined first and second sets of replacement filters 505 and 510, an even smaller number of weights than in the example of FIG. 4.

Different embodiments perform the decomposition differently. For example, the number of filters (i.e., the rank) of the low-rank first replacement layer may be determined manually (e.g., input by a user of the training system) or determined automatically based on the decomposition operation (e.g., a singular value decomposition). In some embodiments, the factor by which the layer is compressed depends on the size of the layer and/or other factors. For instance, if a smaller layer (e.g., a layer with 32 filters) is being compressed, then the compression may only be by a factor of two (i.e., down to 16 filters). Larger layers can allow for greater compression in some embodiments; for instance, a layer with 512 filters could be compressed by a factor of 8 or more in some cases (i.e., down to 64 filters). It should be noted that while these examples use a rank for the first replacement layer that is a divisor of the original number of filters, this is not a requirement in some embodiments. For instance, a layer could begin with 400 filters and be decomposed into two layers with the first layer having 60 filters. In addition, some embodiments treat the rank of the first replacement layer as a hyperparameter and use a hyperparameter optimization algorithm in order to determine the rank.

As noted, some embodiments use singular value decomposition (SVD) to define the decomposition of a layer. Using this process, each layer marked for decomposition is decomposed into the form of an SVD decomposition $W=U$ $\text{diag}(S)V^T$. The first replacement layer uses a weight tensor $\text{diag}(\sqrt{S})V^T$ and the second replacement layer uses a weight tensor $U \text{diag}(\sqrt{S})$. Referring to the first replacement layer as layer A and the second replacement layer as layer B:

$$y_A=\text{diag}(\sqrt{S})V^T x; \text{ and} \qquad (7)$$

$$y_B=U \text{diag}(\sqrt{S})y_A, \qquad (8)$$

where x is the input to the original layer, ya is the output of layer A, and ys is the output of layer B. Additional discussion of this SVD process can be found in "Learning Low-rank Deep Neural Networks via Singular Vector Orthogonality Regularization and Singular Value Sparsifiction", by H. Yang, et al., in 2020 IEEE/CVF Conference on Computer Vision and Pattern Recognition Workshops (CVPRW), 2020, pp. 2899-2908, and which is incorporated herein by reference.

Some embodiments, rather than the above formulation, move the singular values entirely into the first replacement layer, such that:

$$y_A=\text{diag}(S)V^T x; \text{ and} \qquad (9)$$

$$y_B=Uy_A. \qquad (10)$$

With this change, $V^T$ is now the weight tensor for layer A, Sis a vector of scales for layer A, and U is a weight tensor for layer B. That is, at this stage, $V^T$ represents the weight values of the first layer, but each filter in the layer is multiplied by a scale found at a corresponding entry of the vector S (or a diagonal entry of S, if treated as a matrix). This transformation makes training simpler, because the weight tensor for layer A is a learned tensor parameter rather than a function of learned parameters. In addition, the removal of the singular values from layer B simplifies training for that layer as well.

Irrespective of whether channel-wise or spatial-wise decomposition is used, the process 300 also inserts (at 345) activation functions into the first (low-rank) replacement layer. As noted above, in some embodiments each filter has an associated activation function; these functions may all be the same within a layer or may be trainable so that different activation functions can be associated with different filters of the layer. While some embodiments do not use activation functions after the first replacement layer, doing so increases the expressiveness of the network with minimal cost during execution. Some embodiments insert a simple ReLU function, while other embodiments use more complex activation functions (e.g., with trainable parameters).

After defining the filters for the decomposition layers replacing the selected original layer, the process 300 determines (at 350) whether there are any additional layers to be decomposed. If additional layers remain, the process 300 returns to 315 to select the next layer.

The process 300 then initializes (at 355) weight values for the filters of the replacement layers subject to an orthogonality constraint and initializes (at 360) the scales for the first replacement layer. In some embodiments, this involves initializing (i) the orthogonal weight tensor for the first replacement layer, (ii) the weight scales for the first replacement layer, and (iii) the orthogonal weight tensor for the second replacement layer. The training system of some embodiments randomly initializes the values, subject to the constraint that the weight tensors be orthogonal:

$$(W_A)_{ij}\sim N(0, 1/a\_(\text{num\_col}); \qquad (11)$$

$$(W_B)_{ij}\sim N(0, 1/b\_(\text{num\_row}). \qquad (12)$$

The process 300 then trains (at 365) the modified network. This training is described in greater detail below. In some embodiments, the training is performed over the course of two high-level stages in order to fully quantize the network. During a first training stage, the weights (and scales) are treated as floating-point values while structural sparsity is imposed on the decomposed layers by pushing some of the scale values to zero (which allows for all of the weight values in the corresponding filter to be set to zero or simply removed). In addition, some embodiments gradually introduce the quantization of intermediate activation values (i.e., the node output values) during this training. This value quantization especially affects the decomposed layers, because the outputs of the first replacement layer are quantized (e.g., to 4 bits, 8 bits, etc.) before being input to the second replacement layer.

The second training stage involves quantizing (e.g., ternarizing) the weight values by using the initially-trained floating-point values, including the scales, to determine the allowed values for each layer (or filter) and then train the weights while they are restricted to these sets of allowed values. After training, each weight value for a filter will have an assigned weight value that is one of the allowed values for the layer (or for that filter). In some such embodiments, the set of allowed values has three allowed values of $\{0, \alpha, -\alpha\}$. The value a can vary between layers or even filters (ax may be used to indicate the allowed scale value for the layer k, or between filters within a layer). During this weight quantization training, the scales from each first replacement layer are incorporated into the weight tensor for that replacement layer (i.e., there is not a separate scale vector that is trained), so a decomposed layer is simply treated as two separate layers. The weight quantization training of some embodiments is described in more detail in U.S. patent application Ser. Nos. 16/923,001 and 16/923,003, which are incorporated herein by reference.

Figure 6:
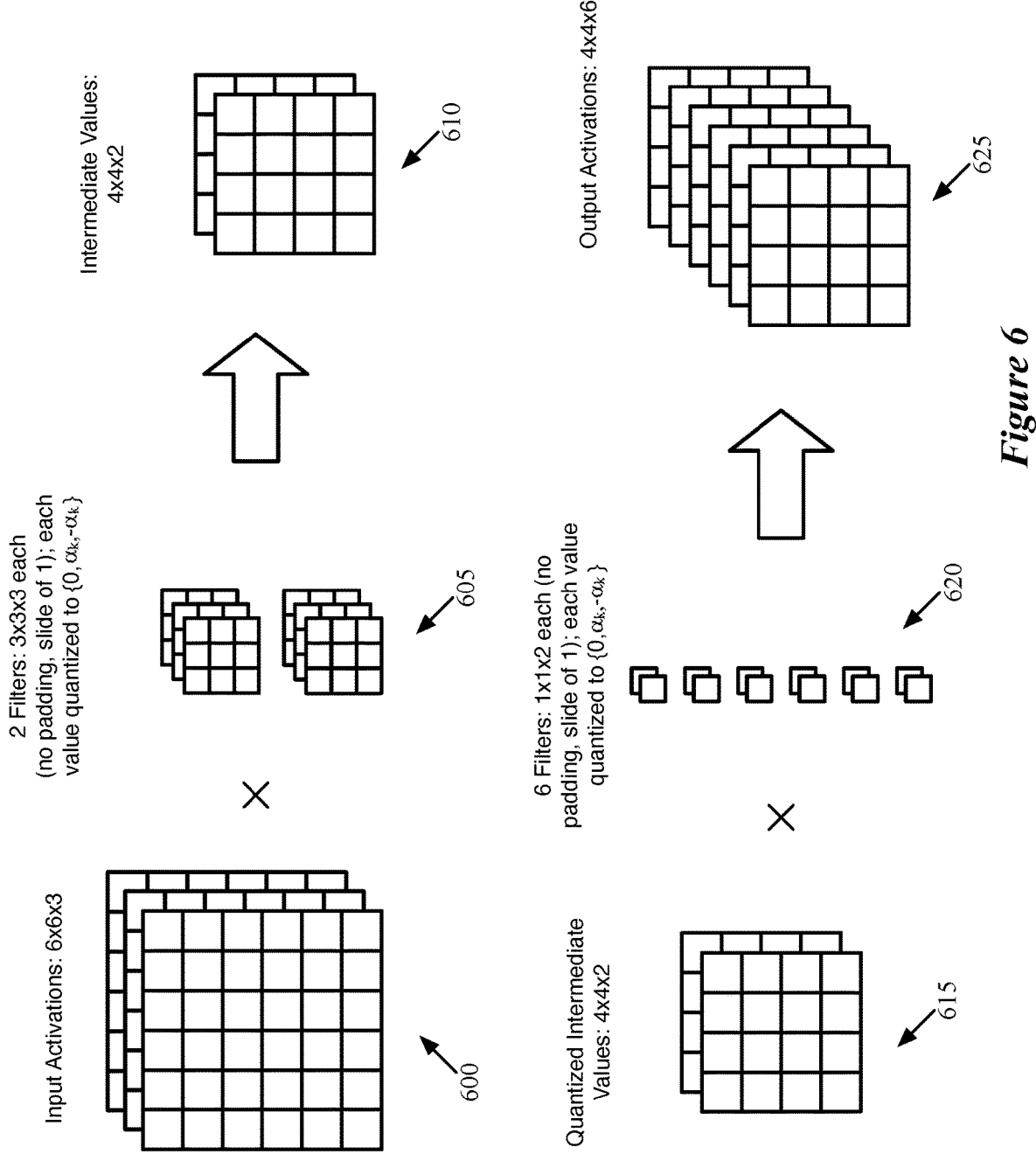
FIG. 6 illustrates a similar decomposition as shown in FIG. 4, but with weight and value quantization.

Before discussing the training operations in more detail, the effect of quantization on the decomposed layers will be described. As noted, the examples shown in FIGS. 4 and 5 illustrate decomposition of a convolutional layer in which all of the weights and activations are floating-point values. However, some embodiments need to account for quantization of the weights (e.g., ternarization) as well as quantization of output values (e.g., to four-bit or eight-bit values). FIG. 6 illustrates a similar decomposition as shown in FIG. 4, but with weight and value quantization.

In this case, the first replacement layer again includes two 3×3×3 filters 605 and receives three 6×6 input feature maps 600. In this example, the weights in the filters are ternarized, such that each weight has one of the values $\{0, \alpha_k, -\alpha_k\}$ (where ax may be a scale value for the entire layer or may be separate scale values for each of the filters). The dot products of the weight values with different blocks of the input values 600 produce intermediate values 610, which are arranged as two intermediate feature maps. However, for input to the second replacement layer, these intermediate values 610 are quantized to produce quantized intermediate values 615 (e.g., a set of 4-bit or 8-bit values). These quantized values 615 may be generated from the values 610 by any sort of quantization process (e.g., truncating, taking the most significant bits, etc.). In some embodiments, the application of the inserted activation function (not shown in this figure) also quantizes the intermediate values.

The second replacement layer again includes six 1×1×2 filters 620 and receives the quantized intermediate values 615 as inputs. The weights in the filters 620 are again ternarized, such that each weight has one of the values {0, $\alpha_k, -\alpha_k$} (where ax may again be a scale value for the entire layer or may be separate scale values for each of the filters). The dot products of the weight values with each pair of input values, along with application of the activation function (i.e., the activation function for the original layer), produces six output activation feature maps 625 having the same dimensions as the output feature maps 210 of the original layer. The activation values in these output feature maps 625 are also quantized in some embodiments.

Training the decomposed layers can be complex in some embodiments because of the inter-relationships between the filters in the two layers as well as the quantization. In a standard layer, each output activation value is based on (i) a block of the input values for the layer and (ii) the weight values of one of the filters. However, for a decomposed layer with value quantization, each output activation is based on (i) a block of the input values for the layer, (ii) the weight values of all of the filters of the first low-rank replacement layer, (iii) the number of bits used for quantizing the intermediate value, and (iv) the weight values of one of the 1×1 filters of the second replacement layer.

Figure 7:
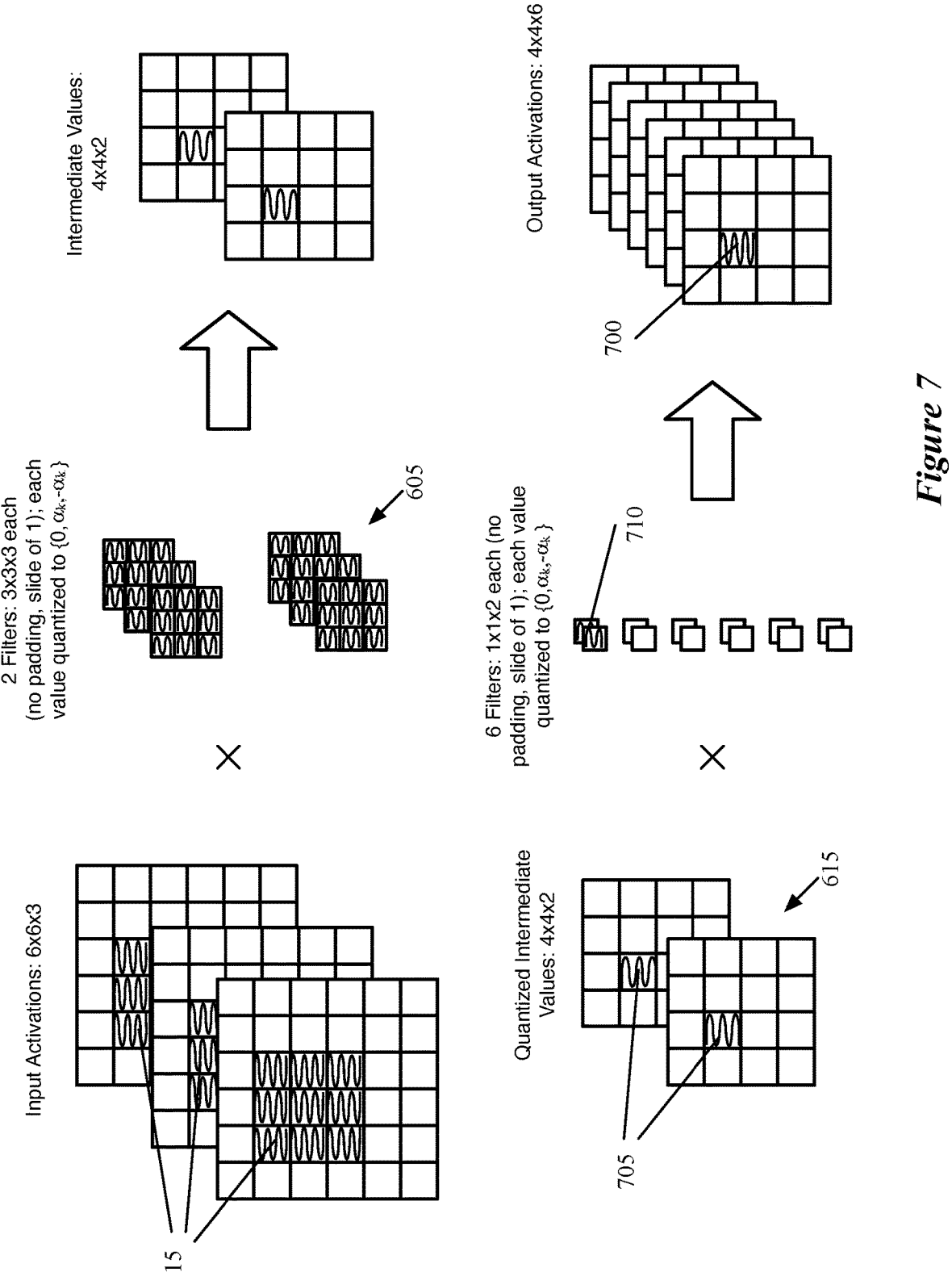
FIG. 7 illustrates all of the values that are used to generate a specific output value using the example of FIG. 6.

FIG. 7 illustrates all of the values that are used to generate a specific output value 700 using the example of FIG. 6. In the second layer, the output activation value 700 is a dot product of one input value 705 in each of the quantized intermediate feature maps 615 (these are values having the same coordinates in the quantized intermediate feature maps) and the values of the filter 710. As shown in the first layer, each of these quantized input values 705 is generated based on a dot product of the same block of input values 715 (a 3×3 grid in each of the input feature maps 600) and a different one of the filters 605. Thus, the output value 700 is generated based on the input values 715, all of the weight values of the filters 605, and the weight values of the filter 710.

Figure 8:
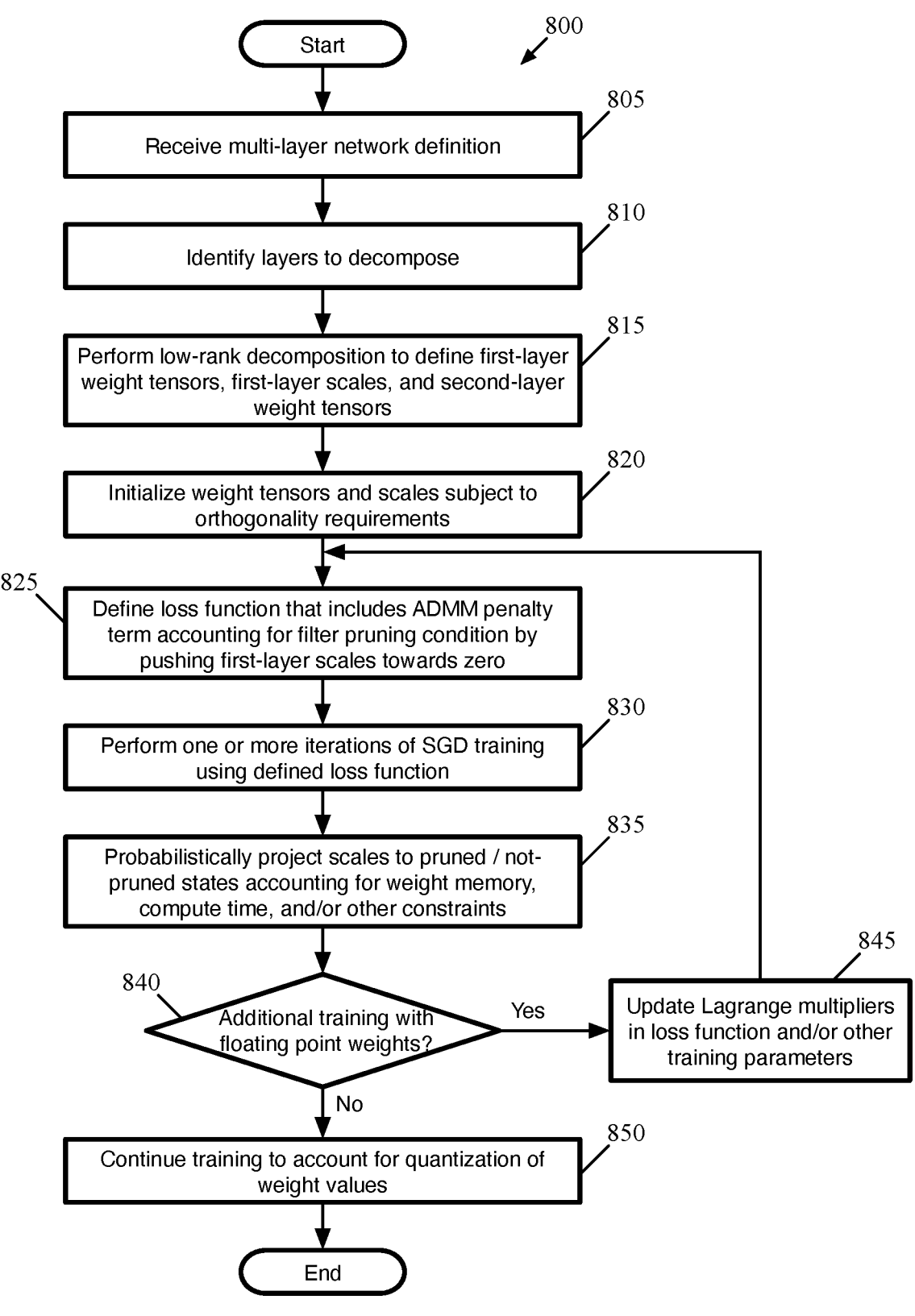
FIG. 8 conceptually illustrates a process of some embodiments for training a decomposed network using floating-point weight values while accounting for the decomposition of at least a subset of the network layers.

As noted above, in some embodiments, the decomposed network (i.e., the network with decomposed layers) is trained in two separate stages. FIG. 8 conceptually illustrates a process 800 of some embodiments for training a decomposed network using floating-point weight values while accounting for the decomposition of at least a subset of the network layers. The process 800, in some embodiments, is performed by a network training (network optimization) application, which may be a program executing on a single device (e.g., a single laptop or desktop, a mobile device, a physical or virtual server, etc.) or a distributed application that operates on multiple machines (e.g., on multiple physical computers, multiple virtual machines or containers within a datacenter or multiple datacenters, etc.). In some embodiments, the process 800 is an amalgamation of several processes that can be performed by multiple different machines or groups of machines (e.g., a SGD training process, a projection process, etc.).

As shown, the process 800 begins by receiving (at 805) a definition of a multi-layer network (e.g., a neural network) for training with initialized floating-point weights. The network of some embodiments is made up of numerous computation nodes, organized in layers, that produce output values based on one or more input values. This network structure includes the type of each layer (e.g., convolutional, element-wise addition or multiplication, pooling, fully-connected, etc.), as well as the structure of the input and output of the layer. For convolutional layers, the input structure is typically defined by the output of the previous layer, while the output structure (for a given input structure) is defined based on the number of filters, the kernel size of those filter, and how that filter is applied (padding, x/y stride).

Next, the process 800 identifies (at 810) original layers (i.e., layers of the received network definition) to decompose. As described above, the original layers to decompose are manually identified (i.e., by a user of the network training system) in some embodiments, or are identified according to manually-specified characteristics (e.g., layers of at least a particular size) in other embodiments. For instance, very large layers (e.g., layers with hundreds of filters producing hundreds of output feature maps) might have a lot or redundancy that can be eliminated via layer decomposition (and subsequent filter pruning, described below). In this case, reducing the number of filters via decomposition could actually help standard training techniques (e.g., stochastic gradient descent) better explore the parameter space, leading to more accurate networks. Other embodiments decompose all of the layers of the network.

The process 800 then performs (at 815) a low-rank decomposition to define the first-layer weight tensors, first-layer scales, and second-layer weight tensors. As described above by reference to FIG. 3, for each layer either channel-wise decomposition (low-rank layer with characteristics of the original layer followed by a 1×1 layer) or spatial-wise decomposition ($k_x$×1 layer followed by 1>$k_x$ layer) may be used. In addition, as described, the rank of the decomposition may be determined manually or based on an automated process in different embodiments. Irrespective of which type of decomposition is used for a particular layer, a weight tensor and a scale vector (i.e., diagonal scale matrix) is defined for the first replacement layer and a weight tensor is defined for the second replacement layer. In addition, as described above, activation functions are inserted into the first replacement layer (with the second replacement layer retaining the activation functions of the original layer).

Finally, to prepare for training the network, the process 800 initializes (at 820) these weight tensors and scale vectors subject to the orthogonality requirements. As described above, some embodiments use random values to initialize (i) the orthogonal weight tensors for each first replacement layer, (ii) the weight scales for each first replacement layers, and (iii) the orthogonal weight tensors for each second replacement layer.

At this point, the training operations can begin. As shown, the process 800 defines (at 825) a loss function that includes an ADMM penalty term accounting for a filter pruning condition by pushing the first-layer scales towards zero. This penalty term is in addition to the standard quality loss that measures the difference between expected and actual outputs for each training input. It should be noted that some embodiments, rather than using ADMM during this stage of floating-point weight training, use a different loss function. For instance, some embodiments use a Hoyer regularization term in the loss function to push scales to zero. In addition to the Hoyer term, some embodiments also include a regularization term in the loss function that penalizes departures from orthogonality. This orthogonality loss is given by $$L_o = \frac{1}{r^2}\left(\left\|U^T U - I\right\|_F^2 + \left\|V^T V - I\right\|_F^2\right), \tag{13}$$

where $\|*\|_F$ is the Frobenius norm of the matrix*and r is the rank of the decomposition. These regularization terms are described in greater detail in "Learning Low-rank Deep Neural Networks via Singular Vector Orthogonality Regularization and Singular Value Sparsification", which is incorporated by reference above.

When using ADMM techniques, the Hoyer regularization term is not used in the loss function, as the ADMM penalty term instead pushes (at least some of) the scales towards zero. This ADMM process uses a principled approach to satisfying structural sparsity constraints (i.e., by pruning filters), and turns off the constraint gradient for remaining filters (i.e., filters that are not pruned) once constraints were satisfied. The derivation of the loss function terms for non-probabilistic and probabilistic ADMM are described in greater detail below. In general, a pruning condition is defined such that a filter is considered pruned when the scale associated with that filter is below a pruning threshold value, which can be set very close to zero (e.g., $10^{-6}$ or a similarly small value). ADMM introduces a projection variable and enforces a constraint on the projection variable, so as to define an augmented Lagrangian used in the loss function as well as a Lagrange multiplier update rule.

However, while the non-probabilistic ADMM formulation of some embodiments identifies a sufficient number of scales to prune, after updating the Lagrange multipliers the unpruned filters would have multipliers equal to zero, and thus the corresponding scales would not be pushed towards zero during the next iterations of SGD training. To avoid these issues, some embodiments use a probabilistic distribution for the ADMM projection and average the multiplier update and augmented Lagrangian over that distribution. Essentially, this method identifies the probability that a filter is assigned to a pruned or unpruned state (each filter is assigned to one of these two states). Based on this, the augmented Lagrangian is multiplied by these probabilities.

The probability distribution for each filter is the fraction of the time that the ADMM projection step assigns the filter to the pruned state. In general, a filter is more likely to be pruned if its corresponding scale is smaller. In addition, other factors accounted for in the projection step described below (e.g., if pruning the filter has a large effect on compute time, or if the filter has a larger number of weights). Some embodiments determine the probability distribution by assuming that it is a maximum-entropy distribution subject to constraints on a total pruned "energy", the number of pruned weights, and the pruned rank for each layer. The details of both the non-probabilistic and probabilistic ADMM formulations are described in further detail below.

With the loss function defined, the process 800 performs (at 830) one or more iterations of SGD training using this loss function. During one training iteration, an input data set is first forward-propagated through the network nodes to compute the actual network output for each input in the data set. Then, the loss function is back-propagated through the network to adjust the weight values in order to minimize the error (e.g., using first-order partial derivatives of the loss function with respect to the weights and scales, referred to as the gradients of the loss function). This optimization method for minimizing the output loss function, iteratively repeated, is referred to as stochastic gradient descent (SGD). It should be noted that, where typical training operates to modify the weight values, here both the values in the weight tensors and the scale vectors are modified (subject to an orthogonality constraint for the weight tensors and/or an ADMM penalty term for the scale values, in some embodiments).

Next, the process projects (at 835) the scales to pruned or non-pruned states (e.g., probabilistically, in the case of probabilistic ADMM) while accounting for weight memory, compute time, and/or other additional constraints. Whereas SGD training modifies all of the weight and scale values, the projection stage of this ADMM training relates only to the scale values in some embodiments. In some embodiments, this projection enforces non-convex structural sparsity constraints that limit the number of weights, network compute time for a particular neural network inference circuit (neural network accelerator), and/or other constraints.

The weight count constraint (which is effectively a weight memory constraint) of some embodiments favors the pruning of filters with larger numbers of weights, as zeroing out the scale for such a filter will reduce the overall weight count by a larger amount than a filter with fewer weights. For instance, a 3×3 filter in the first layer of the network (assuming 3 input channels) will only have 27 weights, whereas a 3×3 filter in a layer with 256 input channels will have 2304 weights. This overall weight count constraint can be entered into the training system by a user or determined based on the training system's understanding of the memory available on the neural network inference circuit that will implement the network. The constraint can be stated as $N_{pruned} \geq N_{min\_pruned}$, i.e., that the number of weights pruned has to be greater than some minimum number of pruned weights. This minimum number of pruned weights is given as:

$$N_{min\_pruned} = N_{decomposed} - (1-X)N_{orig}, \qquad (14)$$

where $N_{orig}$ is the original number of weights in the network prior to decomposition, $N_{decomposed}$ is the number of weights in the network after decomposition, and X is a required sparsity. The pruned weight count for a projection is given by:

$$N_{pruned} = \sum_{l,k} \text{is\_pruned}(l, k) \times N_{per\_filter}(l). \qquad (15)$$

Here, is_pruned (l, k) equals 1 when a filter k in layer/is pruned and equals 0 when that filter is not pruned, while $N_{per\_filter}$ (l) is the number of weights per filter for layer/. To satisfy a constraint on the overall sparsity X, a set of filters must be pruned such that $N_{pruned} \geq N_{min\_pruned}$.

The compute time constraint, as noted, is dependent on the parameters of the neural network inference circuit on which the network will be implemented. An example of such a circuit is described in detail below. For the circuit of some embodiments, there is a large reduction in compute time by reducing the number of filters in a layer under a particular constant number ('F (e.g., 64) because the circuit can execute that constant number of filters in parallel. Increasing the number of filters in a layer above a multiple of this constant $C_F$ requires another pass of the layer, including sequential loading of all of the input activation values and convolving another set of filters over the activation values. The time per such a pass also varies from layer to layer and is dependent on the size of the output channels (i.e., the number of individual output activations computed using each filter), the filter size (in x and y) and stride, as well as the input activation bitwidth.

Specifically, for a particular neural network inference circuit, the following equations are used to determine the compute time constraint. First, a variable kernel reuse is calculated:

$$\text{kernel\_reuse}=\text{dilation}_x>1?0: (\text{kernel}_x-\text{stride}_x). \qquad (16)$$

This means that if the kernel is dilated, kernel_reuse is equal to 0, and otherwise the variable is the size of the filter in the x direction minus the stride in that direction. This variable is evaluated for each layer, and is used to compute a coefficient $C_l$ for each layer $l$:

$$C_l = \text{out}_y * ((\text{out}_y - 1) * (\text{kernel}_x - \text{kernel}_{reuse}) + \text{kernel}_x) * \tag{17}$$

$$(\text{kernel}_y + (\text{input}_{bits} == 8?1:0))$$

This layer coefficient is not affected by the structural sparsity projection, but rather is a constant during training based on the properties of the layer. Here, out, and $\text{out}_y$ are the output channel size, kernel, and $\text{kernel}_y$ are the filter size, and inputpits is the size of the input activations (which, in some embodiments, can either be 4 or 8 bits). Layers with larger numbers of computations will generally take longer to compute and will also increase with the kernel size, especially when those values are not reused. Based on these layer coefficients, the compute time for a layer can be estimated as $$T(l)=C_l \times \text{ceil}(F(l)/C_F). \tag{18}$$

where F(l) is the number of filters in layer l. The total compute time T(n) for a network is the sum of the compute times for all of the layers. It should be noted that non-convolutional layers that are not trained by this process (e.g., element-wise operation layers, pooling layers, etc.) are factored into the overall compute time as constants in some embodiments. To satisfy the network compute time constraint, some embodiments set an upper bound on the number of filters, that is a multiple of CF, for each prunable layer. Some such embodiments allow the user to specify this upper bound for each layer in the training system. Other embodiments simply have the user specify a maximum compute time and enforce this constraint. For example, if a network is evaluating 30 frames per second (fps) streaming video and is expected to evaluate each frame, then 1/30 of a second (or typically a slightly smaller time) might be set as the maximum allowable compute time for the network.

As noted above, some embodiments use a probabilistic projection when enforcing these constraints, rather than an absolute projection (so that filters do not oscillate between pruned and not-pruned states). In this case, the projection stage identifies the probability that a filter is assigned to a pruned or unpruned state. The probability distribution for each filter is the fraction of the time that the projection would assign the filter to the pruned state. In general, a filter is more likely to be pruned if its corresponding scale is smaller. In addition, filters with larger numbers of weights are more likely to be pruned (to reduce the weight count) as are filters for which pruning would reduce the number of filters in a layer below the number C and therefore reduce compute time. As mentioned, some embodiments determine the probability distribution by assuming that it is a maximum-entropy distribution subject to constraints on a total pruned "energy", the number of pruned weights, and the pruned rank for each layer. The details of this probabilistic projection are described in further detail below.

Returning to FIG. 8, the process then determines (at 845) whether more training is required with floating point weights. Some embodiments use a minimization process (e.g., a stochastic gradient descent minimizer) to determine when to stop training the network. Other embodiments employ a set number of iterations during this stage of training.

If the process 800 determines that further training is required, then in some embodiments the process updates (at 845) the Lagrange multipliers in the loss function as well as other parameters. The Lagrange multiplier update of some embodiments is described further below in the discussion of non-probabilistic and probabilistic ADMM. In addition, some embodiments change the learning rate or other SGD hyperparameters at this point. Furthermore, some embodiments gradually introduce the quantization of activation values during the course of multiple training iterations, as this quantization affects the optimal weight values.

Once the floating-point weight value training is complete (i.e., no more training with floating point weight values is required and adequate structural sparsity is achieved), then the process 800 continues (at 850) training to account for the quantization of weight values. As described below, in some embodiments this training is a separate stage that treats the decomposed layers as separate layers and does not train a separate scale vector for these layers.

Figure 9:
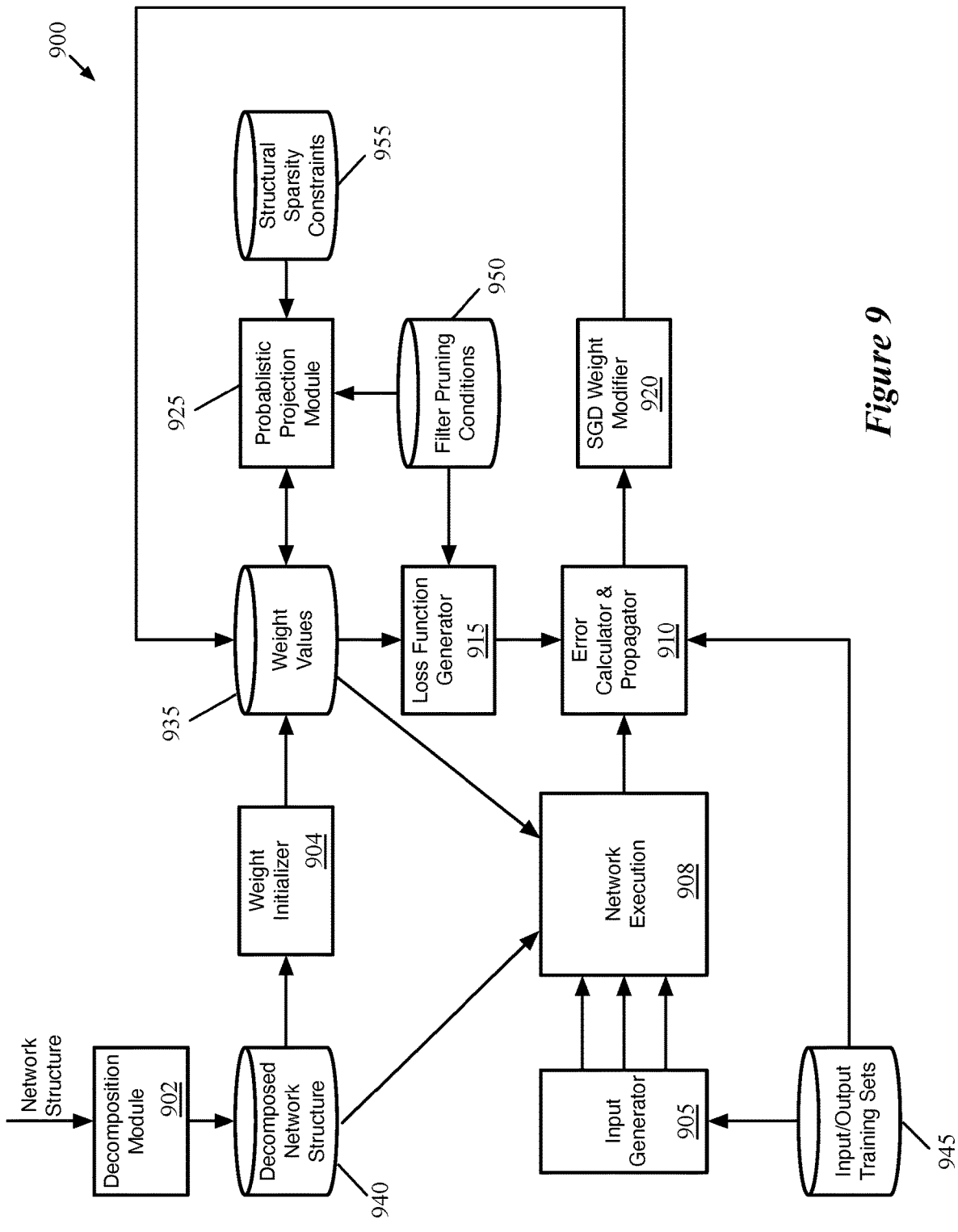
FIG. 9 conceptually illustrates a training system of some embodiments that trains the weight values (and other parameters) of a neural network using floating-point weight values while decomposing the weights of at least some of the network layers in order to meet structural sparsity requirements FIG. 10 conceptually illustrates a training system of some embodiments that trains the weight values (and other parameters) of a neural network while imposing ternarization and sparsity on the weight values.

FIG. 9 conceptually illustrates a training system 900 of some embodiments that trains the weight values (and other parameters) of a neural network. Specifically, the system 900 trains a network using floating-point weight values while decomposing the weights of at least some of the network layers in order to meet structural sparsity requirements (i.e., that enough filters are removed to satisfy weight memory, compute time, and/or other constraints. The system 900 uses floating-point weight values but operates under the presumption that those weights will be quantized (e.g., ternarized) in a later stage of training (which is described by reference to FIG. 10).

As shown, the training system 900 has a number of modules, including a decomposition module 902, a weight initializer 904, an input generator 905, a network execution module 908, an error calculator and propagator 910, a loss function generator 915, an SGD weight modifier 920, and a probabilistic projection module 925, all of which will be described in further detail below. In some embodiments, all of these modules execute on a single device, such as a server, a desktop or laptop computer, a mobile device (e.g., a smartphone, tablet, etc.), a virtual machine, etc. In other embodiments, these modules may execute across multiple interconnected devices (or virtual machines), or separate instances may execute on multiple devices (or virtual machines) for additional computing power. In some embodiments, the modules performing the projection and multiplier update stages of ADMM operate on one set of devices (or machines) while the modules performing the proximal stage (e.g., SGD training) operate on a different set of devices (or machines).

The decomposition module 902 of some embodiments receives a pre-defined network structure and generates a decomposed network structure 940. The network structure received by the decomposition module 902 may specify a set of layers, as well as the type of these layers and the structure of the input and output of the layers. For convolutional layers, the input structure is typically defined by the output of the previous layer, while the output structure (for a given input structure) is defined based on the number of filters, the kernel size of those filter, and how that filter is applied (padding, x/y stride). The decomposition module 902 identifies which layers to decompose and performs this decomposition (e.g., according to a specified decomposition type). That is, the decomposition module 902 performs portions of the process 300 described above, in some embodiments. The decomposed network structure 940 is stored for use in subsequent operations of the training system 900 (e.g., so that the network execution module 908 can apply the network to training inputs).

The weight initializer 904 takes as input the decomposed network structure 940 and generates initial (typically random) floating-point weight values. In some embodiments, these floating-point weight values are restricted to values ranging from −1 to 1, while other embodiments do not restrict the weight values at all. As described above, in some embodiments, these initial weight values are subject to an orthogonality constraint, at least for the weight tensors of the decomposed layers. The initial weight values (and scale values for decomposed layers) are stored in a weight value storage 935. In some embodiments, the weight value storage 935 stores the most recent set of trained weight values (which change throughout training). Other embodiments store a history of the sets of weight values, which allows review of how weights may have changed throughout the training.

The network execution module 908 of some embodiments handles the actual execution of the network (forward propagation of an input) during SGD training (i.e., the proximal stage of ADMM). The network execution module 908 applies the decomposed network structure 940 using the weight values 935 to a set of inputs in order to propagate these inputs through the network and generate corresponding outputs.

During SGD training, the input generator 905 prepares inputs from the input/output sets 945, which are forward propagated through the network to generate output values. In some embodiments, the input generator 905 selects groups of inputs to make up a set of inputs that are propagated together for a single training iteration (referred to as a minibatch). The error calculator and propagator 910 compares the generated output values to expected (ground truth) output values using a loss function, which also incorporates the orthogonality regularization and/or augmented Lagrangian terms. The error calculator and propagator 910 also back-propagates the computed error for a minibatch to determine the rate of change of the loss function with respect to a change in the weight at the current value of the loss function. The SGD weight modifier 920 uses these gradients to modify the weight values (including the scale values for decomposed layers) for the next training iteration. This process is repeated for multiple minibatches of inputs 940 during a single SGD training stage (e.g., until the weight values 935 have converged to optimized floating-point values).

The input/output sets 940 include various inputs to the network as well as the corresponding expected (ground truth) outputs for each of the inputs. Some embodiments perform training with a large number of different inputs, as this can help train the weight values for an average input. Each input in an input set may be an image, a voice snippet, etc. that is to be propagated through the network, depending on the specific purpose for which the network is being trained. For example, if a network is being trained to identify faces, the set of inputs will include numerous images of several different people's faces, probably including various types of edge cases (e.g., images where the face is distorted, where objects partially appear in front of the face, etc.). Each input also has a corresponding expected (ground truth) output that is what the network should generate as its output when presented with that input.

The loss function generator 915 generates the orthogonality and/or Lagrangian loss function terms (in addition to the quality loss that measures the difference in the ground truth outputs and generated outputs) that are used by the error calculator and propagator 910 to analyze the outputs and adjust the weight values. The description of the orthogonality regularization term is provided above by reference to equation (13). The Lagrangian terms are at least based on the current weight values 935 and the filter pruning conditions 950.

The following discussion relates to the derivation of the Lagrangian loss function terms (for probabilistic ADMM relating to pruning filters). To establish the pruning condition 950, the training system 900 assumes that the scale for a filter is non-negative (i.e., zero or positive). Some embodiments achieve this by the SGD weight modifier 920 using a modified gradient step that ensures that all scales remain greater than some very small positive value (e.g., $10^{-10}$). A filter is considered pruned when the scale associated with the filter is sufficiently small (i.e., SI S $S_{prune}$), where $s_{ik}$ is the scale associated with a filter k within a layer/and $S_{prune}$ is a pruning threshold value. This pruning threshold value can be set very close to zero (e.g., $10^{-6}$), so that the impact on network quality metrics due to pruning is negligible. Based on this, if a filter (I, k) is required to be pruned, this can be expressed as $S_{ik} - S_{prune} \leq 0$. Thus, the constraints can be written as follows:

$$s_{lk} \leq \begin{cases} s_{prune}, \text{ filter is pruned} \\ \infty, \text{ filter is not pruned} \end{cases}. \tag{19}$$

The ADMM formulation introduces a projection variable, $y_{lk}$, for each prunable filter, and enforces the constraint $S_{lk} \leq y_{lk}$, where the ADMM projection satisfies:

$$y_{lk} \leq \begin{cases} s_{prune}, \text{ filter is pruned} \\ \infty, \text{ filter is not pruned} \end{cases}. \tag{20}$$

The constraint on the projection variable can be expressed as an equality constraint by introducing a slack variable $t_{lk}^2$, defined by:

$$s_{lk} + t_{lk}^2 = y_{lk}. \tag{21}$$

These constraints are enforced using an augmented Lagrangian, as is typical in ADMM. This Lagrangian is given by:

$$L = \sum_{l,k} \mu_{lk} [s_{lk} - y_{lk} + t_{lk}^2] + \frac{\rho}{2} \sum_{l,k} [s_{lk} - y_{lk} + t_{lk}^2]^2. \tag{22}$$

Minimizing analytically over the slack variables and discarding the constant terms, the Lagrangian reduces to:

$$L = \frac{\rho}{2} \sum_{l,k} [\max\{0, s_{lk} + \lambda_{lk} - y_{lk}\}^2 - \lambda_{lk}^2], \tag{23}$$

where $$\lambda_{lk} \equiv \frac{\mu_{lk}}{\rho}$$

is the "scaled" Lagrange multiplier. The multiplier update rule used, in some embodiments, is:

$$\lambda_{lk}^{(n+1)} = \max\{0, \lambda_{lk}^{(n)} + s_{lk}^{(n)} - y_{lk}^{(n+1)}\}. \tag{24}$$

This update rule allows the Lagrange multiplier to decrease when the current constraint, $s_{lk} < y_{lk}$, is satisfied. This enables the constraint force to decrease to zero for a filter when the training system determines that the filter will not be pruned.

However, while performing the projection stage of ADMM based on this formulation would identify a sufficient number of filters to prune (i.e., filters for which $y_{lk}=s_{prune}$), the remaining filters would not be pruned and have $y_{lk}=\infty$. After the subsequent Lagrange multiplier update, the unpruned filters would have Lagrange multipliers equal to 0 and would thus not be pushed at all towards zero (by the ADMM penalty term) during the next iterations of SGD training (i.e., until the next projection stage).

Because this would make the optimization process noisy (and possibly unable to converge), some embodiments use a probabilistic model instead. This model assumes that each filter (l, k) can be assigned to states (l, k, j), in which an unpruned filter has j=1 and a pruned filter has j=0. The probability that filter (l, k) is assigned to state (l, k, j) is $p_{lkj}$. Taking into account the fact that each filter is assigned to multiple states with different probabilities, the augmented Lagrangian becomes:

$$L = \sum_{l,k,j} P_{lkj}\left\{\mu_{lk}\left[s_{lk} - y_{lkj} + t_{lkj}^2\right] + \frac{\rho}{2}\sum_{l,k}\left[s_{lk} - y_{lkj} + t_{lkj}^2\right]^2\right\}. \tag{25}$$

The upper bounds here are given by:

$$y_{lkj} = \begin{cases} s_{prune}, & j = 0 \\ \infty, & j = 1 \end{cases}. \tag{26}$$

Minimizing over the slack variables $t_{lkj}$, the Lagrangian terms for the probabilistic formulation become:

$$L = \frac{\rho}{2}\sum_{l,k,j} p_{lkj}\left[\max\left\{0, s_{lk} - y_{lkj} + \frac{\mu_{lk}}{\rho}\right\}^2 - \frac{\mu_{lk}^2}{\rho}\right]. \tag{27}$$

By substituting the values of $y_{lkj}$ for j=0 and j=1, this simplifies to:

$$L = \frac{\rho}{2}\sum_{l,k}\left[p_{lk0}\max\left\{0, s_{lk} - s_{prune} + \frac{\mu_{lk}}{\rho}\right\}^2 - \left(\frac{\mu_{lk}}{\rho}\right)^2\right]. \tag{28}$$

For a filter that will definitely not be pruned (i.e., $p_{lk0}=0$), the augmented Lagrangian is a constant and the SGD weight modifier 920 picks the scale that minimizes the quality loss.

The multiplier update rule in this case is:

$$\mu_{lk}^{(n+1)} = p_{lk0}\max\{0, \mu_{lk}^{(n)} + \rho(s_{lk} - s_{prune})\}. \tag{29}$$

Often, it is convenient to work with scaled Lagrangian multipliers defined by:

$$\lambda_{lk} = \frac{\mu_{lk}}{\rho}. \tag{30}$$

In terms of these scaled multipliers, the Lagrangian becomes:

$$L = \frac{\rho}{2}\sum_{l,k}\left[p_{lk0}\max\{0, s_{lk} - s_{prune} + \lambda_{lk}\}^2 - \lambda_{lk}^2\right]. \tag{31}$$

The update rule for the scaled multipliers is given by:

$$\lambda_{lk}^{(n+1)} = p_{lk0}\max\{0, \lambda_{lk}^{(n)} + s_{lk} - s_{prune}\}. \tag{32}$$

Because the scaled multipliers are defined in terms of p, if this is updated to p', then the scaled multipliers should be simultaneously updated as:

$$\lambda_{lk} \to \lambda_{lk}' \equiv \frac{\mu_{lk}}{\rho'} = \frac{\rho}{\rho'}\lambda_{lk}. \tag{33}$$

The probabilistic projection module 925 executes the projection stage of ADMM. As described, the projection incorporates structural sparsity constraints 955 as well as the filter pruning conditions 950 and the current state of the weight values 935 after SGD training to probabilistically project the filters of decomposed layers (via their corresponding scale values) to pruned/non-pruned states.

The probability distribution pikj is determined by the probabilistic projection module 925 in some embodiments, based on the notion of fixing the scales suk and performing the discrete projection and multiplier update a large number of times, with the probability pik being the percentage of the time that the filter (l, k) would be assigned to the pruned state by a non-probabilistic projection module. The Lagrange multiplier would increase by Stk-Spruned when the filter is pruned and become 0 otherwise. The overall sequence of multiplier values and fraction of time the filter is pruned is thus determined by Suk, with a filter more likely to be pruned if (i) the corresponding scale is smaller, (ii) the filter has a larger number of weights, or (iii) removing the filter would have an effect on compute time by bringing the layer to which the filter belongs below a multiple of the number of filters that can be simultaneously implemented by a circuit executing the network.

The probabilistic projection module 925 of some embodiments determines the probability distribution based on the assumption that the distribution is a maximum-entropy distribution subject to constraints on a total pruned "energy", the number of pruned weights, and the pruned rank for each layer. This formulation assumes that each filter (l, k) can be assigned to states (l, k, j) where an unpruned filter has j=1 and a pruned filter has 0. The energy of these states is given by:

$$E_{lkj} \equiv \frac{1}{2}\delta_{j0}\max\{0, s_{lk} + \lambda_{lk} - s_{prune}\}^2 - \lambda_{lk}^2. \tag{34}$$

A filter (l, k) is assigned to state (l, k, j) with probability pikj. The total probability for each filter must sum to 1, so that:

$$\forall\, l, k: \sum_{j=0}^{1} P_{lkj} = 1. \tag{35}$$

The expected value of the number of pruned weights is required to satisfy the lower bound on structural sparsity, given by:

$$N_{min\_pruned} - \sum_{l,k,j} p_{lkj}\delta_{j0}n_l \leq 0. \tag{36}$$

The expected value of the pruned rank should also satisfy the lower bounds:

$$\forall\, l: \ min\_pruned\_rank(l) - \sum_{kj} p_{lk0} \leq 0; \ and \tag{37}$$

$$\forall\, l: \ \sum_{kj} P_{lk0} - max\_pruned\_rank(l) \leq 0, \tag{38}$$

where:

min_pruned_rank(l)=rank(l)−max_rank (l); and $\tag{39}$ max_pruned_rank(l)=rank(l)−min_rank (l). $\tag{40}$ Finally, the total pruned energy should be below the upper bound Emax:

$$\sum_{l,k,j} p_{lkj}E_{lkj} - E_{max} \leq 0. \tag{41}$$

To determine the probabilities pukj that maximize the entropy subject to the above constraints, a Lagrangian is formed for the projection:

$$L_{max-entropy} = \sum_{l,k,j} p_{lkj}\ln(p_{lkj}) + \sum_{l,k} v_{lk}\left(\sum_j p_{lkj} - 1\right) + \beta\left(\sum_{l,k,j} p_{lkj}E_{lkj} - E_{max}\right)$$

$$+ \eta\left(N_{min\_pruned} - \sum_{l,k,j} p_{lkj}\delta_{j0}n_1\right)$$

$$+ \sum_l \xi_l^{min}\left(min\_pruned\_rank(l) - \sum_{k,j} p_{lkj}\delta_{j0}\right)$$

$$+ \sum_l \xi_l^{min}\left(\sum_{k,j} p_{lkj}\delta_{j0} - max\_pruned\_rank(l)\right). \tag{42}$$

In this equation, $v_{lk}$ are multipliers for the normalization condition for each filter, which can be either positive or negative as these are equality constraints. All of the remaining Lagrange multipliers for the projection β, η, ζ, are restricted to be nonnegative because they apply to inequality constraints.

The primal problem is convex and thus the duality gap is zero. As such, the optimal max-entropy solution can be found by maximizing the Lagrange dual, given by:

$$g_{max-entropy}(v, \beta, \eta) \equiv \inf_p L_{proj}(p; v, \beta, \eta, \xi). \tag{43}$$

Minimizing $L_{proj}$ over $p_{lkj}$ and using the normalization of the probability to eliminate v, the Lagrange dual is:

$$g_{max-entropy}(\beta, \eta, \xi) = -\ln(\mathcal{Z}) - \beta E_{max} + \eta \times N_{min\_pruned} + \tag{44}$$

$$\sum_l \xi_l^{min} \times min\_pruned\_rank(l) - \sum_l \xi_l^{max} \times max\_pruned\_rank(l)$$

Here, Z is the grand partition function that ensures that the probability distribution, $p_{lkj}$, is normalized. Because the primal objective and constraint functions are sums of the independent filter contributions, the partition function factorizes into the product of per-filter partition functions:

$$\mathcal{Z} = \prod_{l,k} \mathcal{Z}_{lk}. \tag{45}$$

The partition function for filter (l, k) is given by:

$$\mathcal{Z}_{lk} = \sum_j \exp(-J_{lkj}), \tag{46}$$

where $$J_{lkj} \equiv \beta E_{lkj} + \delta_{j0}\left(-\eta n_l - \xi_l^{min} + \xi_l^{max}\right). \tag{47}$$

The optimal projection Lagrange multipliers β, η and ζ can be determined by maximizing the Lagrange dual function, g(β,η,ζ) which is a function of the number of layers.

Having found the optimal multipliers, the partition functions $\mathcal{Z}_{lk}$ and then the probabilities $p_{lkj}$ can be computed using:

$$p_{lkj} \frac{\exp(-J_{lkj})}{\mathcal{Z}_{lk}}. \tag{48}$$

The probability that a filter (I, k) is pruned is:

$$P_{lk0} = \sigma\left(-\beta \Delta E_{lk} + \eta n_1 + \xi_l^{min} - \xi_l^{max}\right), \tag{49}$$

where is the logistic function and $\Delta E_{lk}$ is the energy cost of pruning a filter, $\Delta E_{lk} = E_{lk0} - E_{lk1}$.

Assuming that the inverse temperature is nonzero and finite, $\beta \in (0, \infty)$, the chemical potentials can be defined in terms of $\beta$ and the other projection Lagrange multipliers n and $\zeta$:

| Symbol | Formula | Meaning | Result |
|---|---|---|---|
| $\phi^{global}$ | $\phi^{global} \equiv \eta / \beta$ | Chemical potential for number of pruned weights | Filters with $\Delta E_{lk}/n_1 < \phi^{global}$ will tend to be pruned |
| $\phi_l^{layer}$ | $\phi_l^{layer} \equiv (\xi_l^{min} - \xi_l^{max})/\beta$ | Chemical potentials for layer rank | Channels with $\Delta E_{lk} < \phi_l^{layer}$ layer will tend to be pruned |

In terms of these chemical potentials, the probability of pruning a channel is:

$$P_{lk0} = \sigma\left[-\beta\left(\Delta E_{lk} - \phi^{global} n_l - \phi_l^{module}\right)\right]. \tag{50}$$

The grand partition function is related to the Landau free energy (or grand potential) as:

$$\mathcal{Z} = \exp(-\beta\Omega); \text{ and} \tag{51}$$

$$\Omega = -\frac{1}{\beta}\ln \mathcal{Z} \tag{52}$$

The Landau free energy is equal to:

$$\Omega = U - TS - N_{prune}\phi^{global}, \tag{53}$$

where U is the expected value of the total energy:

$$U \equiv \sum_{l,k} p_{lkj}E_{lkj} \tag{54}$$

and $N_{prune}$ is the expected number of pruned weights:

$$N_{prune} = \sum_{l,k} p_{lk0}n_1. \tag{55}$$

The exact differential of $\Omega$ is:

$$d\Omega = -SdT - \tag{56}$$

$$\mathbb{E}[\text{pruned\_weight\_count}]d\phi^{global} - \sum_l \mathbb{E}[\text{pruned\_rank}(l)]d\phi_l^{layer}.$$

The Landau free energy is the useful work available in a system at constant temperature, volume (or s), and chemical potentials.

The update rule for the scaled multiplier (Equation (32)), can be re-expressed as:

$$\Delta \lambda_{lk} = \lambda_{lk}^{(n+1)} - \lambda_{lk}^{(n)} = p_{lk0}\max\left(0, \lambda_{lk}^{(n)} + s_{lk} - s_{prune}\right) - \lambda_{lk}^{(n)} = \tag{57}$$

$$\sum_{j=0}^{1} p_{lkj}\left[\max\left(0, \lambda_{lk}^{(n)} + s_{lk} - s_{prune}\right) - \lambda_{lk}^{(n)}\right] = \sum_{j=0}^{1} p_{lkj}\frac{\partial E_{lkj}}{\partial \lambda_{lk}^{(n)}} = \mathbb{E}\left[\frac{\partial E_{lk}}{\partial \lambda_{lk}^{(n)}}\right].$$

From this, it can be determined that:

$$\Delta \lambda_{lk} = -\frac{1}{\beta}\frac{\partial \ln \mathcal{Z}_{lk}}{\partial x}\bigg|_{\phi^{global}} = \frac{\partial \Omega}{\partial \lambda_{lk}^{(n)}}\bigg|_{\phi^{global}}. \tag{58}$$

That is, the dual update is equivalent to a gradient step for/maximizing the Landau potential, $\Omega$, with step size equal to 1.

If $\beta = \infty$ (zero temperature), then the filters with the smallest energy per pruned weight can be greedily pruned, $E_{lk}/n_1$. Filters with $E_{lk}/n_1 < \phi^{global}$ are pruned, while filters with $E_{lk}/n_1 > \phi^{global}$ are not pruned. The chemical potential, $\phi^{global}$, is the threshold value such that the number of weights in channels with $E_{lk}/n_1 < \phi^{global}$ is equal to min\_pruned\_weight\_count. If $\beta = 0$ (infinite temperature), then random channels can be pruned.

Some embodiments specify the total entropy rather than the total energy, Emax, and find the probability distribution that minimizes the total energy subject to a lower-bound, S, on the entropy. The primal is:

$$L_{min-energy} = \sum_{l,k,j} p_{lkj}E_{lkj} + T\left(S - \sum_{l,k,j} p_{lkj}\ln\left(\frac{1}{p_{lkj}}\right)\right) + \tag{59}$$

$$\sum_{l,k} v_{lk}\left(\sum_j p_{lkj} - 1\right) + \phi^{global}\left(N_{min\_pruned} - \sum_{l,k,j} p_{lkj}\delta_{j0}n_l\right) +$$

$$\sum_l \phi_l^{min}\left(\text{min\_pruned\_rank}(l) - \sum_{k,j} p_{lkj}\delta_{j0}\right) +$$

$$\sum_l \phi_l^{max}\left(\sum_{k,j} p_{lkj}\delta_{j0} - \text{max\_pruned\_rank}(l)\right)$$

The dual is:

$$g_{min-energy}\left(T, \phi^{global}, \phi^{min}, \phi^{max}\right) = \tag{60}$$

$$T(S - \ln(\mathcal{Z})) + \phi^{global} \times \min_{pruned_{weight_{count}}} +$$

$$\sum_l \phi_l^{min} \times \text{min\_pruned\_rank}(l) - \sum_l \phi_l^{max} \times \text{max\_pruned\_rank}(l).$$

Identifying $\beta = 1/T$, $\eta = \phi^{global}/T$, $\xi_l^{min} = \phi^{min}/T$, and $\xi_l^{max} = \phi^{max}/T$, $\quad$ (61)

then:

$$g_{min-energy}(\beta, \eta, \xi) =$$

$$\left\{\frac{1}{\beta}(S - \ln(\mathcal{Z})) + \eta \times \text{min\_pruned\_weight\_rank}(l) + \right.$$

33

-continued $$\sum_{l} \xi_l^{min} \times \text{min\_pruned\_rank}(l) - \sum_{l} \xi_l^{max} \times \text{max\_pruned\_rank}(l)\Bigg\}.$$

The minimum-energy, constraint-satisfying projection has T=0 and S=0. Thus, it should be expected that S=0 when the constraints are exactly satisfied. Before the constraints are satisfied, S should be greater than zero so as to avoid greedily pruning only those filters with minimum energy or minimum energy per weight. It should also be noted that, unlike the energy or temperature, the entropy does not change when the scales, Stk, are updated during SGD or when the Lagrange multipliers $\lambda_{lk}$ are updated. These observations suggest that a schedule for the entropy can be used to control the projection. For the initial projection, at time (epoch) t=0, the entropy can be set to some multiple $\gamma \in [0,1]$, of the maximum entropy, $S_{max}$. As the training proceeds, the entropy can be decreased to zero by the specified time, $t_{max}$, at which the structural-sparsity constraints should be satisfied. That is, the training system 900 can use this entropy to determine how quickly the training should be completed:

$$S(t)=\max\{0,\gamma(1-t/t_{max})S_{max}\}. \tag{62}$$

$\gamma$ is then a hyperparameter that controls exploration vs. exploitation trade-off during the optimization.

The maximum entropy, $S_{max}$ (achieved at T=∞), can be found by minimizing $g_{max-entropy}$ ($\beta$, $\eta$, $\zeta$) without the energy constraint (i.e., with $\beta$ fixed at 0). It should be noted that the maximum entropy depends only on the structural-sparsity constraints and is unaffected by the change in scales $s_{lk}$ or multipliers $\lambda_{lk}$. Then, at each time t, the required entropy S(t) is computed and the probability distribution corresponding to that entropy is determined by maximizing $g_{min-energy}$($\beta$, $\eta$, $\xi$).

Using the above formulation, the ADMM stages correspond to different thermodynamic changes. The projection step performed by the probabilistic projection module 925 decreases the entropy at fixed $s_{lk}$ and $\lambda_{lk}$. The change in the internal energy is dU=TdS, where dS≤0. The multiplier update, computed by the loss function generator 915, increases the multiplier "pressure" at fixed S and $s_{lk}$. The change (increase) in the internal energy is $$\sum_{l,k}\left(\frac{\partial U}{\partial \lambda_{lk}}\right)^2.$$

Finally, the SGD gradient (proximal) step performed by the SGD weight modifier 920 decreases the constraint violation ("volume" at fixed S and $\lambda_{lk}$ energy is $$-\sum_{lk}\left(\frac{\partial U}{\partial s_{lk}}\right)^2$$

The probabilistic projection can also be extended to compute the probability that a given layer will have a multiple of CF (the circuit-specific constant used in evaluating the compute time for a layer). Because the filters need to make a coordinated decision between layers, these probabilities can be complex to compute. Some embodiments first compute the distribution for the sparsity (i.e., total weight count) constraint while ignoring the compute-time constraint to determine $\beta$ and $\phi^{global}$ These embodiments then sort the filters in each layer in order of increasing $E_{l,k}$ and, traversing this sorted order, group filters in each layer into sets of filters needed to decrease the rank to mC$_F$ for m=ceil(rank/64)-1, . . . , 3, 2, 1. Group chemical potentials for all layers are computed in order to satisfy the compute-time constraint. This process then divides the group chemical potential for each layer by CF, divides again by $n_l$, and assigns that as the per-layer chemical potentials. The computation of filter probabilities is then repeated with the fixed per-layer chemical potentials included.

The initialization and update of p will now be described. The initial value of the augmented Lagrangian is given by:

$$L_0 = \frac{\rho_0}{2}\sum_{l,k}p_{lk0}\max\{0, s_{lk} - s_{prune}\}^2. \tag{63}$$

$L_0$ has the upper bound:

$$L_0 < \frac{\rho_0}{2}\sum_{l,k}s_{lk}^2, \tag{64}$$

which can be written as $$\frac{\rho_0}{2}$$

multiplied by the number of layers. Assuming that the quality loss function is of order 1, the initial value of ρ can be set as:

$$\rho_0 = \frac{2_\epsilon}{\text{module\_count}}, \tag{65}$$

where ∈ <<1 is a value on the order of 10-2. The value of e is a training system parameter, set by a hyperparameter, in some embodiments.

The distance to convergence can be measured as the expected reduction in the total approximation that is required in order to satisfy all the constraints:

$$D = \frac{1}{C_{norm}}\sum_{l,k}p_{lk0}\max\{0, s_{lk} - s_{prune}\}, \tag{66}$$

where $C_{norm}$ is a normalizing factor:

$$C_{norm} = \sum_{l}\max_{rank(l)}. \tag{67}$$

This normalizing factor prevents D from varying with network size. Because D is the sparsity multiplied by a typical scale and typical pruned scales are smaller than 1, it should be expected that D is slightly smaller than 1.

For small scales that are to be pruned, the ADMM penalty exerts a greater force than the quality loss or any regularization terms as convergence is approached. Thus, the expected rate of change for a scale $s_{lk}$ due to an SGD step is:

$$s_{lk} \approx -\eta \frac{\partial L_{ADMM}}{\partial s_{lk}} = -\frac{\rho\eta}{C_{norm}} \max\left\{0, s_{lk} - s_{prune} + \frac{\mu_{lk}}{\rho}\right\}. \quad (68)$$

Ignoring the Lagrange multiplier term, underestimating the rate of change:

$$\frac{\partial}{\partial t}\ln(D) = \frac{D}{D} \approx -\eta\rho. \quad (69)$$

Thus, the constraint violation D decays exponentially, with a decay rate proportional to p. Based on this, measuring the rate of change of ln (D) and increasing p until ln (D) gives the expected rate of decay.

The logarithm ln (D) has the undesirable property that it approaches-∞ as convergence approaches. This makes ln (D) itself is not a useful measure of distance from convergence. Instead, some embodiments use a modified function that is linear for D smaller than some tiny threshold δ (e.g., δ=10⁻⁴):

$$\omega = \begin{cases} \ln(D/\delta) + 1, & D \geq \delta \\ D/\delta, & 0 \leq D \leq \delta \end{cases}. \quad (70)$$

The function ω(D) has continuous value and derivative at D=δ and ω(0)=0, so that ω(D) can be used as a measure of distance from convergence.

To update p, some embodiments perform a linear regression on w as a function of time and compare this to the expected rate of change $$\omega_{exp} = -\frac{\omega}{T_{rem}},$$

where:

$$T_{rem} = \max(T_{min}, T_{max}-t). \quad (71)$$

Here, t is the current epoch, $T_{max}$ is set by a hyperparameter that specifies a maximum number of epochs (i.e., iterations of ADMM involving a proximal step and multiplier update). In some embodiments, $T_{min}$ is of order 20 epochs. The desired rate of change here is negative. ρ can then be increased in proportion to the ratio $\omega_{exp}/\omega_{obs}$ (with appropriate handling of corner cases).

Returning to FIG. 9, the probabilistic projection module 925 projects the scales of each training epoch using the probabilistic formulation above. The loss function generator 915 then updates the Lagrange multipliers, in order for the error calculator and propagator 910 and SGD weight modifier 920 to continue modifying the weight values for the next epoch's worth of minibatches. This is continued until convergence, in some embodiments. As noted, some embodiments begin introducing quantized activations during this process, which is handled by the network execution module 908 and affects the quality loss computed by the error calculator and propagator 910.

Once the decomposed network is trained with floating-point weight values and enough filters are pruned to satisfy the structural sparsity constraints (e.g., compute time and weight memory), the scales can be absorbed into the floating point weight values of those layers and the two layers of a decomposition treated separately for the remainder of training. The subsequent training enables an optimized network with ternarized weight values (i.e., where each weight value is one of zero, a positive scale value for its filter, or a negation of that scale value for the filter). For this training, ADMM is again used in some embodiments, but rather than the projection stage projecting scale values to pruned/not pruned, the weight values are projected to their ternarized values. In addition, whereas the training described above imposes structural sparsity constraints (to eliminate filters), the projection in this weight quantization stage imposes a global sparsity constraint that requires that a particular percentage of the overall weights are given the value zero (more local sparsity constraints may also be set for individual layers or filters as well, in some embodiments).

Figure 10:
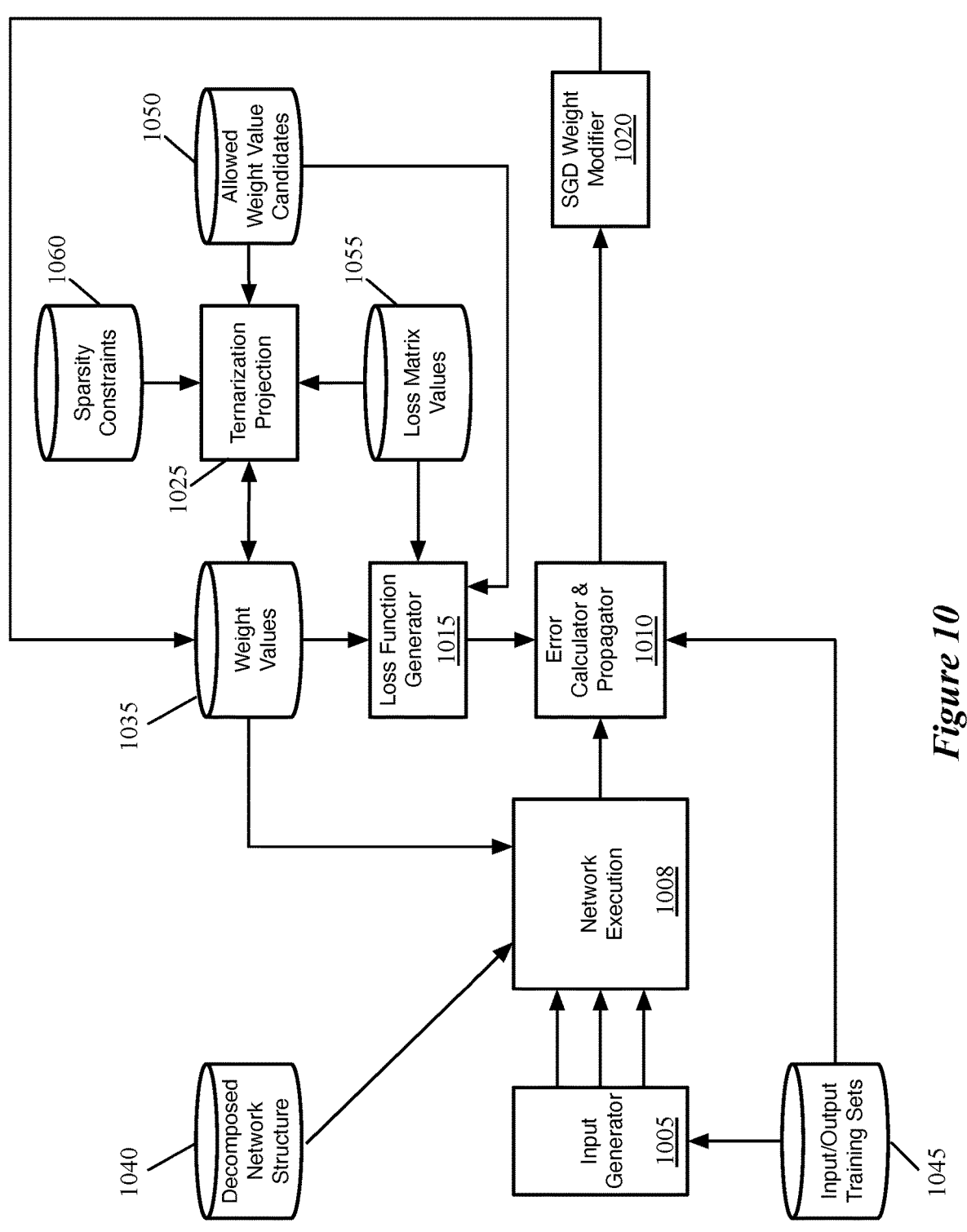

FIG. 10 conceptually illustrates a training system 1000 of some embodiments that trains the weight values (and other parameters) of a neural network while imposing ternarization and sparsity on the weight values. In some embodiments, this system 1000 can train a network with decomposed layers, but this is not a requirement for the system (that is, the system 1000 can train and ternarize any network that initially has floating point weight values, at least for certain types of network structures).

Similar to the training system 900 described above, the training system 1000 has a number of modules, including an input generator 1005, a network execution module 1008, an error calculator and propagator 1010, a loss function generator 1015, an SGD weight modifier 1020, and a ternarization projection module 1025, all of which will be described in further detail below. In some embodiments, all of these modules execute on a single device, such as a server, a desktop or laptop computer, a mobile device (e.g., a smartphone, tablet, etc.), a virtual machine, etc. In other embodiments, these modules may execute across multiple interconnected devices (or virtual machines), or separate instances may execute on multiple devices (or virtual machines) for additional computing power. In some embodiments, the modules performing the projection and multiplier update stages of ADMM operate on one set of devices (or machines) while the modules performing the proximal stage (e.g., SGD training) operate on a different set of devices (or machines).

In this case, the system 1000 starts with a network structure 1040 that has decomposed layers, but here these simply are treated as their own independent layers, with the decomposition and rank-reduction handled in the previous floating-point training stage. The system 1000 is equally capable of training and ternarizing a network that has not been decomposed, but instead was trained with floating-point weight values without decomposition. The network structure 1040 still specifies a set of layers, as well as the type of these layers and the structure of the input and output of the layers. For convolutional layers, the input structure is typically defined by the output of the previous layer, while the output structure (for a given input structure) is defined based on the number of filters, the kernel size of those filter, and how that filter is applied (padding, x/y stride).

The input generator 1105, network execution module 1008, error calculator and propagator 1010, and SGD weight modifier 1020 operate in a similar manner to the corresponding modules described above by reference to FIG. 9, using training inputs 1045 (with corresponding ground truth outputs). In some embodiments, the same modules (e.g., operating on the same devices or set of devices, or having the same or similar code) are reused for ternarization training. The SGD training in some embodiments again operates as the proximal step of ADMM, and even while the projection step projects the weight values to ternary values the SGD training allows the weights to deviate from these ternary values.

The loss function generator 1015 generates the loss function used for SGD training, which includes both (i) a first quality loss term that measures the difference between the actual output of the network and the expected output of the network and (ii) a second ADMM penalty term (Lagrangian) that constrains the weights to the sets of allowed values by penalizing the weight values for deviation from their respective ternary values. In some embodiments, the constraint term also accounts for the increase in loss when quantizing any individual weight (i.e., due to constraining the weights to the sets of allowed values). This constraint term can be referred to as a loss-aware penalty term, and is computed based on the weight values 1035, the allowed weight value candidates 1050 (i.e., the scales and therefore ternary values for each filter), and a set of loss matrix values 1055.

The ternarization projection module 1025 performs the projection step of ADMM, projecting each of the weight values 1035 to one of their allowed values. That is, after each iteration through the projection step, each weight value for each node in the layer will have an assigned weight value that is one of the possible weight values for the layer. In some such embodiments, the set of allowed weight values 1050 has three possible values of $\{-\alpha_k, 0, +\alpha_k\}$ for each weight value. The $\alpha_k$ (effectively a scale) can vary between layers or between filters within a layer in some embodiments.

The projection performed by the ternarization projection module 1025 is subject to sparsity constraints 1060, which require that at least a threshold portion of the weight values be projected to zero (rather than their respective positive or negative values). The loss matrix values 1055 are used to inform this projection, as the loss matrix provides a measure of relative importance for each weight value, indicating which values can be pushed to zero with the least penalty to the quality loss.

In some embodiments, the loss matrix is the Hessian matrix of the loss function, where the diagonal values of the Hessian matrix are second-order partial derivatives of the loss function with respect to each weight in the network. The dependence of the loss increase of the network for a particular weight (i.e., the extent to which changing the weight increases the inaccuracy of the network) is proportional to a corresponding diagonal term of the Hessian matrix. In some embodiments, all of the off-diagonal terms of this loss matrix are zero.

To minimize the computational burden of calculating the Hessian terms, some embodiments of the invention approximate the terms of the Hessian matrix using an empirical Fisher approximation method that estimates the Hessian using the first-order partial derivatives (e.g., the gradient) of the loss function that were used during the prior floating-point training iterations of the network.

Other embodiments estimate the loss matrix terms separately from weight training data, by propagating a set of training inputs through the network and sampling from a predicted output probability distribution. These sample probability distributions are used in place of ground truth outputs to compare to the actual output distribution (i.e., to compute the loss function), and back-propagation (e.g., the same back-propagation algorithm as used for actual network training) is performed in order to determine the gradients of all of the weights. These gradients are not used to modify the weights, but instead to compute the loss matrix values. For instance, in some embodiments, the diagonal terms (each corresponding to a single weight) are computed as the outer product of each weight's gradient with itself.

As mentioned, the ADMM penalty term (that pushes the weights towards ternary values during SGD training) incorporates this loss matrix as well, so that the effect of pushing different weights towards ternary values on the quality loss is accounted for. The derivation of such a loss-aware penalty term will now be described. Starting with a floating-point network that converges to a (local) minimum in error, for any change $\delta$ ($w$) in the weights, the corresponding change in loss is approximated in some embodiments using a 2nd order approximation around the weight values as follows:

$$\mathcal{L}(w + \delta w) - \mathcal{L}(w) \cong g^T \delta w + \frac{1}{2}\delta w^T H \delta w, \tag{72}$$

where g=∇C(w) is the gradient of the loss function, and H=∇² C(w) is the Hessian matrix of the loss function (i.e., the loss matrix). In other embodiments, a different loss matrix can be used instead of the Hessian to estimate the corresponding change in loss. The loss matrix is assumed to be the Hessian for the purposes of discussion below, but not limited to the Hessian of the loss function in other embodiments.

Using this equation, the impact of quantizing a single floating-point weight $w_i$ to a quantized value $q_i$ can be considered. The change in a weight can be written as $\delta(w)=(q_i-w_i)e_i$, where $e_i$ is the unit vector with value of zero everywhere except the i-th position where the value is 1. With this in mind, considering that the gradient averages to 0 over the training samples (since the floating-point network started from a local minimum), the change in loss from quantizing the i-th weight $w_i$ to a quantized value $q_i$ can be represented as follows:

$$\mathcal{L}(w + (q_i - w_i)e_i) - \mathcal{L}(w) \cong \frac{1}{2}(q_i - w_i)^2 H_{ii}, \tag{73}$$

where $H_{ii}$ are the diagonal elements of the Hessian matrix H, corresponding to second-order partial derivatives of the loss function with respect to each weight in the network.

Referring to FIG. 10, the loss matrix values 1055 are computed (e.g., by a loss matrix estimator, which is not shown in the figure) based on either prior training data or separately-generated gradient data, as described above. In some embodiments, irrespective of which method is used to calculate the loss matrix, the term for each weight is based on the averaged sum squared of the gradient terms for the weight. As an example using the empirical Fisher method, $g_{ni}$ is the gradient of the loss function with respect to the n-th prior floating-point training iteration, for the i-th weight. The averaged sum squared Bi of the N gradient terms for the selected (i-th) weight is given by:

$$\beta_i = \frac{1}{2N}\sum_{n=1}^{N} g_{ni}^2, \tag{74}$$

These terms are independent of the quantized value chosen for the weight in some embodiments.

As mentioned, in some embodiments the loss function generator 1015 uses the loss matrix terms to generate the loss-aware penalty term for use by the error calculator and propagator 1010. The standard ADMM penalty term (without the additional loss-aware term) for the loss function is given by:

$$\mathcal{L}_{ADMM} = \frac{\rho}{2}\sum_k \|\hat{W}_k + \lambda_k - Q_k\|^2, \qquad (75)$$

where $\hat{W}_k = W_k/\alpha_k$ and $\lambda_x$ is the Lagrange multiplier for the k-th layer. The penalty assumes that quantization-constraint violations are of equal importance for all weights in a layer, while violations in a layer with a small weight scale ($\alpha_k$) are more expensive than violations in a layer with large weight scale.

Given knowledge of the Hessian (assumed diagonal), it can be used in some embodiments to measure the cost of the constraint violation for any weight. The Hessian (or in this case, the Fisher approximation H) functions as a metric on the space of network weights. The loss-aware ADMM penalty term becomes:

$$\mathcal{L}_{ADMM} = \frac{\rho}{2}(W + \lambda - \alpha Q)^T H (W + \lambda - \alpha Q), \qquad (76)$$

where W is the vector of all the (floating-point) weights $w_i$ and Q is the vector of all the quantized values $q_i \in \{-1, 0, +1\}$. The parameter p controls the regularization forces, dictating how fast the quantization will take place. If p is too large, the penalty loss will be given a too big importance, the weights will be strongly pulled towards their projected counterparts, and the network will be quickly quantized, but with a large loss in precision. If p is too small, the penalty loss will not matter, and the weights will never get pulled closer to a quantized version. In some embodiments, the algorithm uses individual values pk per layer. In other embodiments, a global value of p is used for all layers.

This equation can also be written as:

$$\mathcal{L}_{ADMM} = \mu^T(W - \alpha Q) + \frac{\rho}{2}(W - \alpha Q)^T H(w - \alpha Q). \qquad (77)$$

Here, μ is a vector of Lagrange multipliers (for the sparse quantization constraints) and α is a diagonal matrix that operates on the weight space that provides the per-layer weight scale. It should be noted that A is usually used to denote the Lagrange multipliers divided by ρ and for a modified constraint, expressed in terms of the normalized weights: $W_k/\alpha_k - Q_k = 0$. During loss-aware ADMM, the loss matrix sets the scale for the curvature, not $\alpha^2$, so working with normalized weights is no longer helpful. As such, some embodiments work with the unscaled Lagrange multipliers for a constraint on the unnormalized weights (the vector of these multipliers can be referred to as μ rather than λ). Because u is unscaled and constrains the unnormalized weights, it does not need to be updated when the value of p or $\alpha_k$ is changed, unlike A.

As noted, the training system 1000 for ternarizing the weight values of a network operates similarly to the training system 900, in that the proximal step of ADMM (forward propagation of inputs by the network execution module 1008, loss calculation and back-propagation by the error calculator and propagator 1010, and weight modification by the SGD weight modifier 1020) is performed for one or more iterations, followed by the projection step by the projection module 1025 and update of the Lagrange multipliers by the loss function generator 1015 (in addition to any other training parameters, such as the learning rate). Some embodiments also update the loss matrix values 1055 at this point. This weight quantization training of some embodiments is described in more detail in U.S. patent application Ser. Nos. 16/923,001 and 16/923,003, which are incorporated by reference above.

It should also be noted that some embodiments use a probabilistic projection, similar to that described above for imposing structural sparsity, for the projection of the weight values to ternary values. In this case, the projection assigns probabilities for each weight to each of its three possible projections (i.e., 0, $\alpha_k$, $-\alpha_k$). The value of the weight used in the subsequent proximal step (SGD training) is the expectation value based on these probabilities. This projection still maintains the global sparsity constraints (i.e., that a particular percentage of the weights will need to be projected to 0). Like the projection of the scales for structural sparsity, this probabilistic projection can result in more stable projection and Lagrange multiplier calculation over multiple iterations as well as better optimization in some embodiments.

The above discussion focuses primarily on training of the various layers of weights, while ensuring that the weight values are quantized (to ternary weight values) and sparsified (enough weight values set to zero, enough reduction of the number of filters to satisfy weight memory and compute time requirements). This enables execution of the network by a neural network inference circuit of some embodiments with ternarization and sparsity requirements.

Such a neural network inference circuit is part of an integrated circuit in some embodiments. The ICs of some embodiments are configurable to implement different networks trained to perform a particular function, and such networks may include replicated layers (trained with quantization). For instance, the ICs may implement networks for object or facial recognition in images, voice recognition in audio samples, etc. The IC of some embodiments includes a set of input processing circuits, a neural network computation fabric that can be configured to apply a neural network to an input, and a microprocessor (e.g., for controlling the input processing circuits and configuring the neural network computation fabric).

Figure 11:
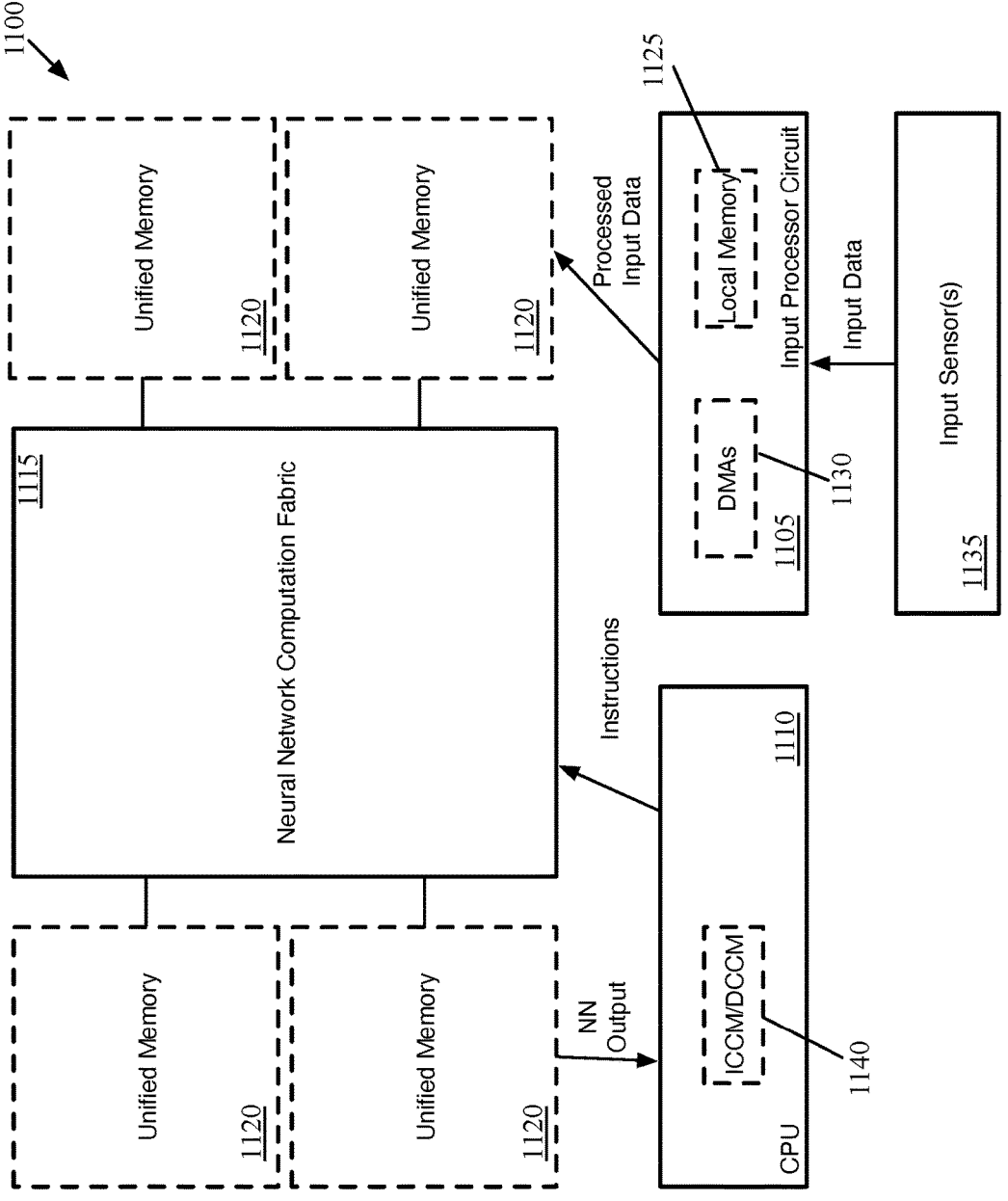
FIG. 11 conceptually illustrates an integrated circuit of some embodiments.

FIG. 11 conceptually illustrates such an IC 1100 of some embodiments. As shown, the IC includes an input processor circuit 1105, a microprocessor (CPU) 1110, a neural network computation fabric 1115, and a set of unified memory 1120. In addition, the input processor circuit 1105 includes local memories 1125 (e.g., a small amount of memory for input processing instructions) and direct memory accesses 1130 (which enable the input processing circuit 1105 to access the unified memory 1120 without CPU involvement). The CPU 1110 includes closely coupled memory 1140 for instruction (ICCM) and data (DCCM) which can be used for booting up the IC (e.g., boot loaders and/or firmware are loaded out of ROM (not shown) into the ICCM and/or DCCM), as well as typical components for accessing the unified memory.

The unified memory 1120, as mentioned, is shared by the CPU 1110, the input processor circuit 1105, and the neural network computation fabric 1115. This unified memory 1120 is shown in four blocks in this figure; as described below, in some embodiments the neural network computation fabric includes multiple cores that each access their own respective portions of the unified memory. In some embodiments, the unified memory 1120 is made up of banks of SRAMs. In addition, the unified memory includes multiple interfaces for the different circuits 1105-1115 to access the memory for read/write operations. In some embodiments, the unified memory includes direct access ports for the cores of the computation fabric 1115 to access their associated memory banks, as well as a separate interface for enabling the CPU 1110 and input processor circuit 1105 to access all of the memory banks.

In some embodiments, the IC is integrated into a device (such as an Internet of Things (IoT) device) with one or more input sensors 1135. These input sensors can include cameras (e.g., for capturing video images on which the neural network computation fabric 1115 performs face or object recognition, etc.), microphones (e.g., for capturing audio on which the neural network computation fabric 1115 performs voice recognition, speech processing, etc.), or other types of input sensors. In other embodiments, the input sensors 1135 are located on a separate device that is linked with the IC 1100.

In some embodiments, at bootup of the IC 1100, the firmware loads a neural network program object. This causes the CPU 1110 to load neural network configuration data (e.g., weight values, scale and bias parameters, lookup table masks for each layer, memory locations for the weight and input values to use for computing each layer of the network, etc.) from off-chip storage and to store weight values and instruction arguments to the unified memory 1120. In different embodiments, the weight values and/or instruction arguments may be stored in the unified memory 1120 by the CPU 1110 directly or by the CPU 1110 generating instructions for the neural network computation fabric 1115 to write this data (the weight values and/or instruction arguments) to the unified memory 1120. Some embodiments, rather than storing instruction arguments in the unified memory 1120, instead use a specific memory local to the computation fabric 1115 to store instruction arguments. However, the benefit of using the unified memory 1120 for this purpose is that doing so allows for larger networks (e.g., with more layers that would require more instruction arguments).

In addition, the CPU 1110 loads the neural network program instructions for the computation fabric to its own memory 1125. These instructions are applied by the computation fabric 1115 to input data in order to execute the neural network. These runtime instructions include, e.g., indications as to which pre-loaded sets of instruction arguments 1145 to use for each set of calculations, etc.

The input processor circuit 1105 receives input data (e.g., still images or video frames, sounds, etc.) from the input sensor(s) 1135, and processes these according to processing instructions received from the CPU 1110 or stored in local memory 1125. These instructions identify, in some embodiments, any sort of initial processing to apply to the raw data (e.g., decompression of compressed data, etc.), if any, as well as how to store the input data in the unified memory 1120 to be read by the computation fabric 1115. Because the input processor circuit 1105 and the computation fabric 1115 share the unified memory 1120, the input data does not need to be copied from one circuit's local memory to another. Instead, the input processor circuit 1105 stores an input once into the unified memory 1120 and the computation fabric 1115 reads the input from the same location in the unified memory 1120. For an image, e.g., the storage instructions might specify the specific location that pixel values (e.g., RGB values) should be arranged and stored in the unified memory 1120. The input processor circuit 1105 also sends signals to the CPU 1110 to indicate when it has fully buffered an input (e.g., a frame of video) so that the input can be read by the computation fabric 1115.

In addition to instructing the input processor circuit 1105 how and when to store input data for use by the computation fabric 1115, the CPU 1110 provides the neural network program instructions to the computation fabric. In some embodiments the CPU 1110 provides these instructions in stages (e.g., one layer or portion of a layer at a time). Once the final output of the neural network is computed, the fabric 1115 stores this output in the unified memory 1120, so that the CPU (or other circuitry on the device) can perform post-processing operations on the output (e.g., evaluate the output and perform any actions based on the output).

The computation fabric of some embodiments provides a set of circuits for performing the various computations required for neural networks (e.g., dot product computations, scaler and bias operations, activation functions, etc.), with the network parameters (weight values, bias values, node arrangement, filter size, etc.) configurable. In some embodiments, the computation fabric imposes certain requirements on the networks, such as a maximum size of the network (i.e., a maximum size of the dot product computations), that the weight values be ternary (e.g., 0, $\alpha$, and $-\alpha$ for each layer of the network), and/or that at least a particular percentage of the weight values be equal to zero.

Figure 12:
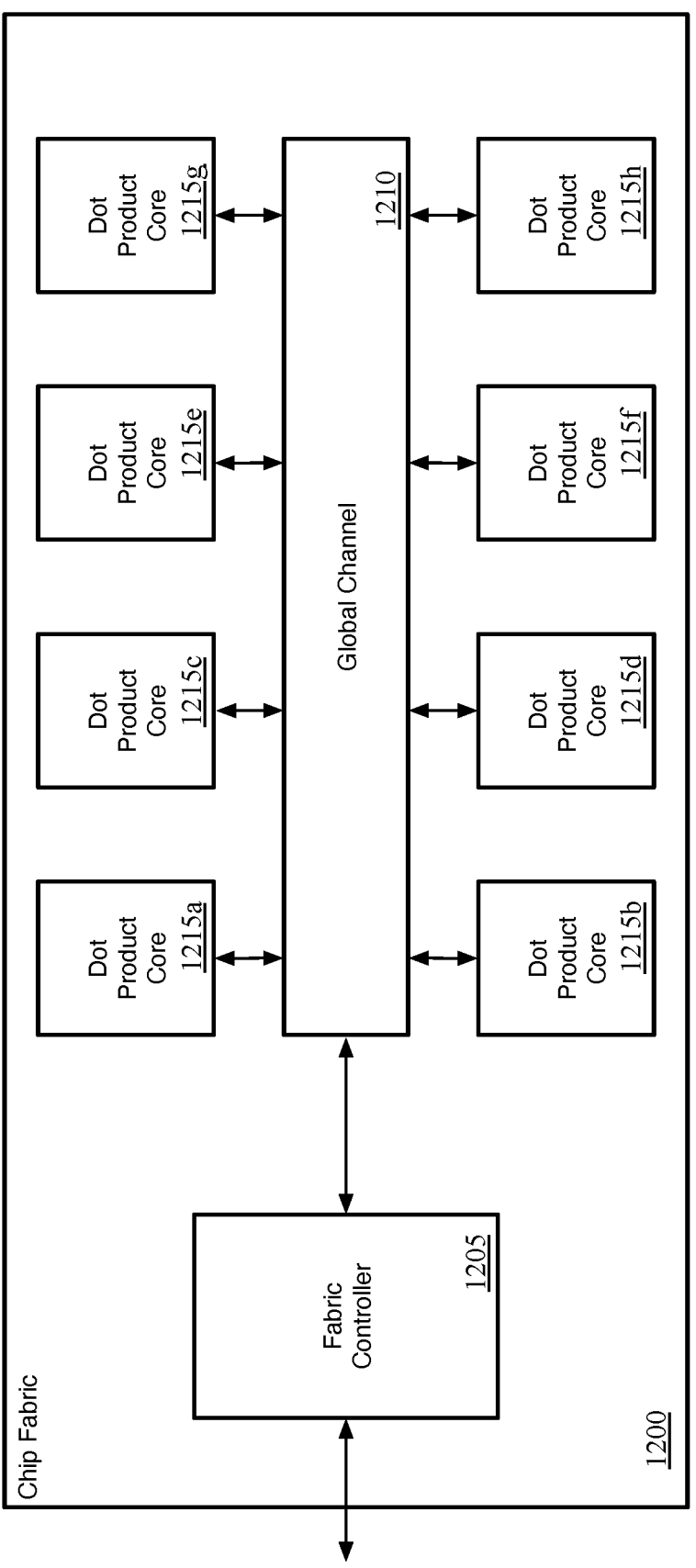
FIG. 12 conceptually illustrates the neural network computation fabric of some embodiments.

FIG. 12 conceptually illustrates the neural network computation fabric 1200 (also referred to as the neural network inference circuit, chip fabric, or neural network accelerator) of some embodiments. The chip fabric 1200 of some embodiments includes a fabric controller 1205, a global channel 1210, and a set of dot product cores 1215*a-h*. The connections between the various components 1205-1215 represent the flow of both control data (e.g., configuration data for a particular neural network layer) and computation data at runtime in some embodiments.

The fabric controller 1205 is responsible for managing the operation of the rest of the chip fabric 1200 (e.g., the dot product cores 1215) in some embodiments. The fabric controller 1205 loads instruction arguments (e.g., weight and activation value locations, which cores to use for a particular computation, etc.) from the unified memory (or a local memory on the chip) based on instructions received from the CPU, maps instructions into a sequence of memory-mapped register writes, synchronizes the downstream controllers (e.g., controllers for the various cores 1215), etc. The instructions managed by the fabric controller 1205 are configured at compile time, in some embodiments, based on the parameters of the network being implemented by the chip fabric 1200. In some embodiments, the fabric controller 1205 interacts with the microprocessor of the IC as well (i.e., the fabric controller 1205 handles the communication with the CPU 1110 shown in FIG. 11). During execution of the neural network in some embodiments, the fabric controller 1205 receives instructions as opcodes along with pointers to the location in the unified memory (or local memory) of the arguments for that opcode. The fabric controller retrieves these arguments in order to determine the full instruction. Because some instructions can have dozens of arguments and the same instructions are sent each time the network is executed for a new input (e.g., many times per second), storing the arguments locally (rather than the CPU sending the arguments with each instruction) saves processing power and system bus bandwidth.

The chip fabric also includes numerous dot product cores 1215 as well as a global channel 1210 that connects the cores, with these data processing circuits configured by the fabric controller (and a set of hierarchical control circuits, in some embodiments). These data processing circuits 1210 and 1215 operate to compute neural network operations in an efficient, low-power manner, according to the configuration data provided by the control circuits.

The dot product cores 1215a-h include circuitry for computing partial dot products in some embodiments, which is described in further details below. In some embodiments, this circuitry includes memory and/or buffers for storing weights and activations, controllers for reading these values out of memory, and adder trees for computing the partial dot products based on the weight and activation inputs. The core memory, controllers, adder trees, and other core circuitry of some embodiments are described below in greater detail.

The global channel 1210 is responsible for providing a communications bus for control and computation data between the fabric controller 1205 and the cores 1215, as well as from one core to another. The global channel 1210, among other operations, accumulates partial dot products from multiple cores when computing dot products that require more computations than can be performed in a single core, and performs post-processing on these dot products. In addition, the global channel 1210 carries activations (i.e., computation node outputs) after post-processing for storage (and for use as inputs to subsequent computation nodes) in other cores 1215. In some embodiments, the global channel 1210 includes an accumulating bus for accumulating the dot products and a non-computation bus for providing activations, weights, and other configuration data to the cores and other computation circuits. In some embodiments, the linear function post-processing and non-linear function for each neural network node are also performed by circuits in the global channel 1210, as described further below.

The chip fabric 1200 of some embodiments computes numerous neural network computation nodes simultaneously, with the computation for one node often spread across multiple cores (and subsequently the global channel). In some cases, if a neural network layer is small enough, then computation for that layer may be confined to a single core 1215. However, if multiple cores are used for a given layer (any number of cores may be used in some embodiments), then each dot product computed for that layer is spread across all of the cores 1215 in use.

That is, for a dot product computed across more than one core 1215, each of these cores computes a partial dot product from a subset of the input values and weight values for the node, then provides these partial dot products to the global channel 1210. In some embodiments, a set of input values are used as the input to multiple nodes in a layer, so a core simultaneously computes the dot products of these input values with multiple sets of weight values. Similarly, a set of weight values (referred to as a filter, or filter slice when that filter is divided across multiple cores) are used as the weights for numerous nodes with different sets of input values, so in some embodiments the cores load sets of weight values once and then compute dot products of these weight values with numerous different sets of input values.

In the simplest case, all of the partial dot products are computed in the same clock cycle and provided at the same time to the global channel 1210. In some cases, however (e.g., for dot products with a very large number of terms or using larger than standard activation values, or when filters have too many nonzero weight values), each core 1215 computes more than one partial dot product for a single computation node, requiring multiple clock cycles (also referred to as time-multiplexing of the dot products). Based on configuration data specifying which outputs from the cores are to be added together (and whether multiple partial dot products are required from the same core), the global channel 1210 aggregates these partial dot products to compute the complete dot product for each node, then applies various post-processing functions (e.g., the bias, scale, and non-linear activation functions) to compute the output of each node.

In some embodiments, the dot product cores are grouped into clusters, and the global channel includes separate segments for each such cluster. Each of these channel segments includes the same circuitry in some embodiments, with the exception that buses in the first and last channel segments only connect to corresponding buses in one other channel segment while the buses in the intermediate channel segments connect to corresponding buses in two neighboring channel segments.

The data processing circuitry of each of the channel segments includes a dot product bus, a set of post-processing circuits, and an output bus in some embodiments. The dot product bus receives partial dot products from the cores, aggregates these dot products together, and provides the aggregated dot products to the post-processing circuits. The post-processing circuits perform the non-dot product computations of the neural network computation nodes, which may include a bias (addition) factor, a scaling (multiplication) factor, and a non-linear activation function (e.g., for a node in a convolutional or fully-connected layer). The output of the post-processing circuits is the computation node outputs (activations). The output bus, or activation write bus, carries the outputs of the post-processing circuits to the cores to be stored as inputs for the next computation layer.

Figure 13:
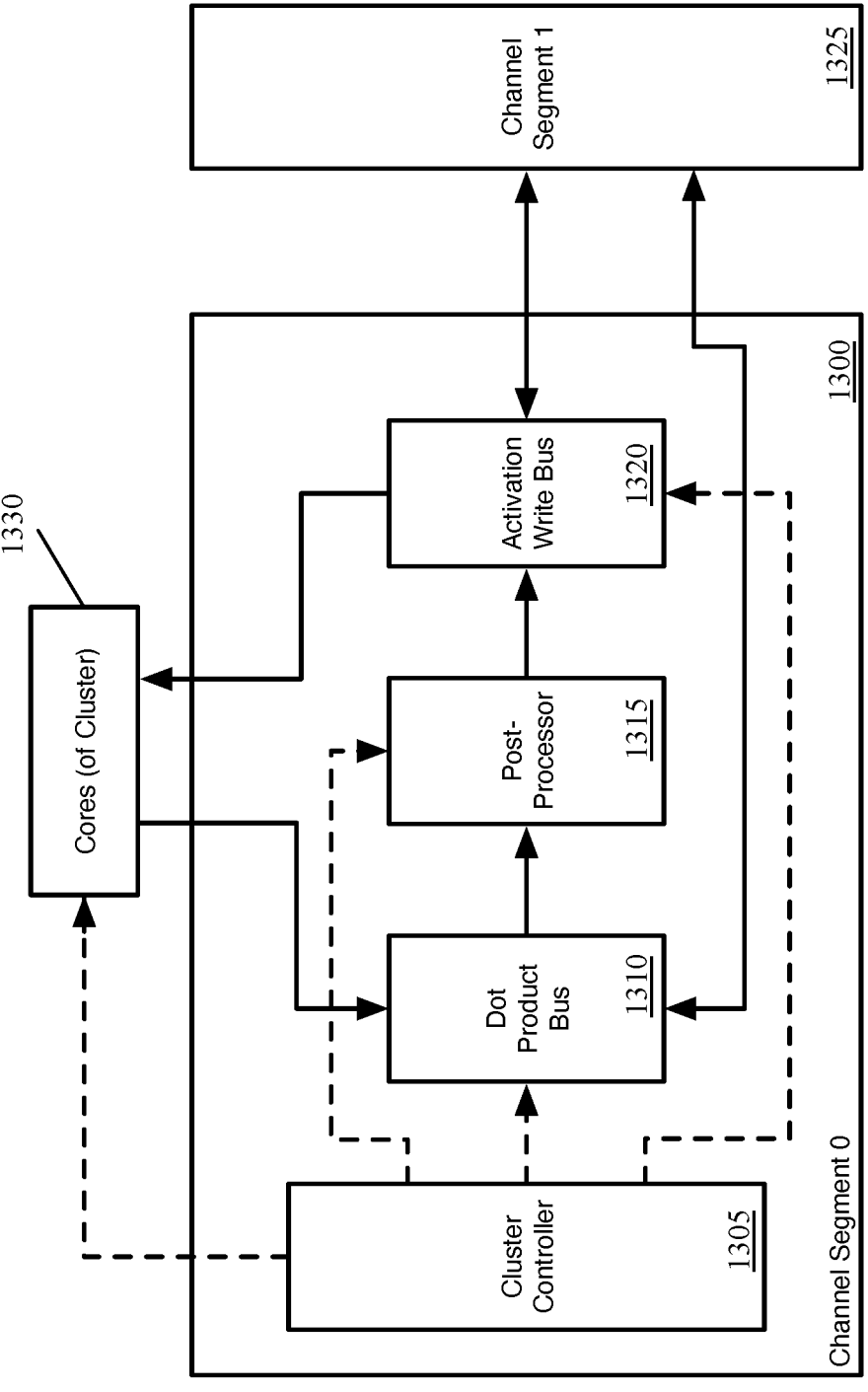
FIG. 13 conceptually illustrates the circuit blocks of a channel segment of some embodiments.

FIG. 13 conceptually illustrates the circuit blocks of a channel segment 1300 of some embodiments. The channel segment 1300 includes a cluster controller 1305, a dot product bus 1310, a post-processor 1315, and an activation write bus 1320 (also referred to as an output bus). In addition to the channel segment 1300, the figure also illustrates an additional channel segment 1325 and the cores 1330 of the local cluster for the channel segment 1300, as the circuit blocks of the channel segment 1300 exchange dot product and configuration data with these other circuits. In this diagram, the dashed lines represent the flow of configuration data while the solid lines represent the flow of neural network computation node data for convolution or fully-connected layer nodes (i.e., nodes that use a dot product based linear function). Additional neural network computation data, such as that flowing directly from the cores 1330 to the post-processor 1315 for pooling nodes or element-wise operators, is not shown.

The cluster controller 1305 configures the dot product bus 1310, post-processor 1315, and activation write bus 1320 as per the configuration instructions received from the fabric controller in some embodiments. For the dot product bus 1310, this configuration data specifies, in some embodiments, (i) which partial dot products are to be added together as part of the same neural network computation node and (ii) to which post-processing unit each aggregated dot product is sent (the post-processor 1315 of some embodiments includes numerous post-processing units with the same circuitry). In other embodiments, the post-processing unit that receives each aggregated dot product is not specified as configuration data because there are an equal number of dot product bus lanes and post-processing units, so that the data from each lane is provided as the primary input to a different post-processing unit.

For the post-processor 1315, the configuration data of some embodiments indicates (for each of the post-processing units) whether a dot product computation node or other computation node (e.g., pooling, element-wise operator) is being executed, the scaler and bias factors for a linear computation, the activation function to use (which may be specified, e.g., as a lookup table or a piecewise linear function), as well as other data. For the activation write bus 1320, the configuration data indicates to which cores each output value is to be delivered, in some embodiments.

As mentioned, the solid lines indicate the flow of neural network computation data, for a node in a convolutional or fully-connected layer. The cores 1330 (as well as, in some cases, cores of other clusters) compute partial dot products. For a given computation node, these partial dot products may be computed across multiple cores. In some embodiments, if more than one core is used to compute the dot products for a neural network layer, then the partial dot products for each node are computed across all of these active cores.

These partial dot products are output to the dot product bus 1310, which aggregates the partial dot products from the cores 1330 of the local cluster. The dot product bus 1310, in some embodiments, includes a number of independent dot product bus lanes that each receives partial dot products from the cores, aggregates these together, and provides the aggregated dot products to the post-processing circuits. In some embodiments, each lane of the dot product bus corresponds to (i) one of the adder trees in each of the cores (i.e., dot product bus lane N receives the partial dot products from each of the adder trees of index N in the cores), (ii) one of the post-processing units in each of the clusters (i.e., dot product bus lane N provides its aggregated output to the post-processing unit N in one of the clusters, as specified by the configuration data), and (iii) one lane of the activation write bus.

Each lane of the dot product bus 1310 spans all of the channel segments, and the dot product bus lanes in each channel segment aggregate the partial dot products from the cores of its local cluster. The dot product bus 1310 in the channel segment 1300 also exchanges locally-aggregated dot products with its neighboring segments for further aggregation if needed (i.e., if the source cores for the dot product computation span multiple clusters). In this case, the channel segment 1300 only has one neighboring segment, but internal channel segments will have two such neighboring segments. The configuration data from the cluster controller 1305 specifies whether to send these dot products in one direction or the other along the global channel for each dot product bus lane, or to aggregate the dot products from the neighboring channels locally, depending on where post-processing will occur for each dot product.

The post-processor 1315 includes numerous post-processing units that receive the dot products from their corresponding dot product bus lane and perform the non-dot product functions of the neural network computation nodes. For a typical computation node of a convolutional (or fully-connected) layer, these functions include an addition operation to account for the bias factor, a multiplication operation to account for the scaling factor, and a non-linear activation function. In some embodiments, the outputs of the linear function are quantized or truncated to a particular number of bits (e.g., 4 bits, 5 bits, 8 bits). Using a small, fixed number of bits for the outputs of each computation node allows for (i) power and resource savings by enabling smaller computations and (ii) certainty in the scheduling of computations (i.e., by knowing that all input values will be within a particular range) that enables further power and resource savings in design. The non-linear activation function, in some embodiments, is implemented as a lookup table or a configurable piecewise linear function rather than a hardwired function. This enables the IC to execute different neural networks that use different activation functions and, in some embodiments, allows for different activation functions to be used in different layers of the neural network or for different filters within a layer.

The activation write bus 1320 receives the computation node activation outputs from the post-processing units and carries these outputs back to the cores 1330, to be stored in the memory of the core and used as inputs for the computation nodes of the next layer of the neural network. The activation write bus connects to the cores 1330 in the local cluster as well as the activation write bus in the neighboring channel segment 1325. As with the dot product bus 1310, the activation write bus 1320 of some embodiments includes lanes, with each post-processing unit of the post-processor 1315 sending its output to a different one of these lanes.

In some embodiments, the output values may be computed by the post-processor 1315 in one cluster but carried by the activation write bus 1320 to a core in another cluster to be stored. For efficiency, the compiler of some embodiments (a software program that generates the configuration data for enabling the IC to execute a particular neural network) attempts to optimize the location of the post-processing unit for each computation node output relative to the cores used to compute the constituent partial dot products for that computation node and the destination core for the output value. The activation write bus 1320 also includes a right shift circuit for each core that is used to align the output values for the core, in order for the values to be stored in contiguous blocks within the core RAM.

Figure 14:
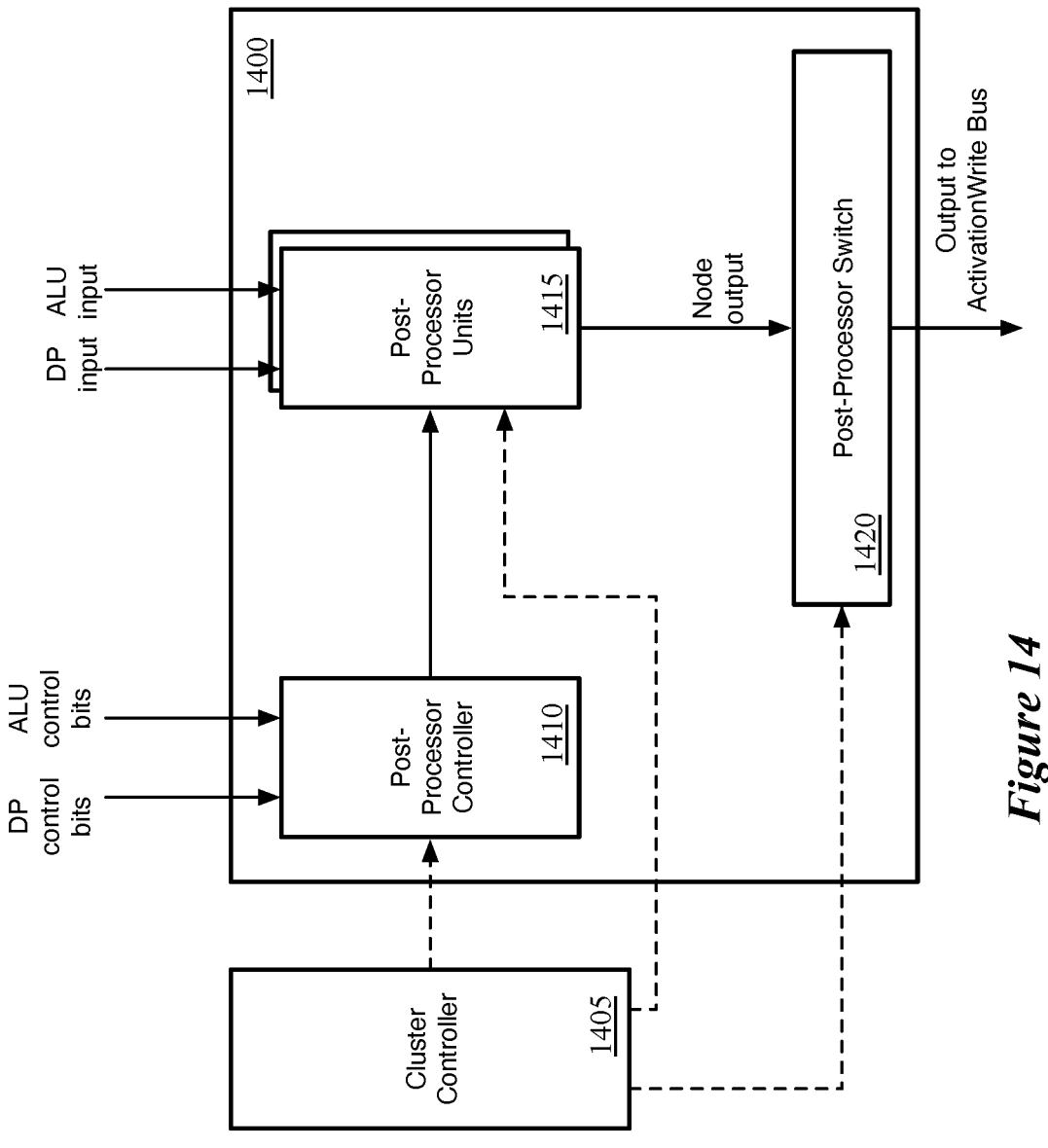
FIG. 14 conceptually illustrates the post-processing circuit block for a channel segment of some embodiments, along with the local cluster controller that provides configuration data to this post-processor.

Now that the primary circuit blocks of the global channel have been introduced, some of these circuits of some embodiments will be explained in greater detail. FIG. 14 conceptually illustrates the post-processing circuit block 1400 for a channel segment of some embodiments, along with the local cluster controller 1405 that provides configuration data to this post-processor 1400. As shown, the post-processing circuit block 1400 includes as sub-blocks a post-processor controller 1410, a set of post-processing units 1415, and a post-processor switch 1420. The cluster controller 1405 provides configuration data to each of these sub-blocks in order to synchronize operations, and to configure the post-processing units 1415 with the correct bias and scale factors as well as the activation function.

The post-processor controller block 1410 aggregates control signals from the dot product bus (for convolution and fully-connected operations) as well as the ALU bus from the cores (for pooling, copy, and element-wise operations). These control bits include accumulate and valid signals for the dot product bus (which indicate to the post-processor whether the incoming data is a final dot product, as dot products are not sent every clock cycle) as well as accumulate, valid, and end of row signals for the ALU bus. The ALU bus carries activation values directly from the cores without having dot products performed, to be used for pooling and element-wise operation layers. The accumulate and valid signals indicate to the post-processor whether the incoming ALU data is to be used, while the end of row signals indicate that different configuration data should be used for certain post-processing operations when the end of a row of input values is reached (e.g., on account of padding, etc.). The post-processor controller block 1410 aggregates these signals, as mentioned, and outputs signals to the post-processing units 1415 to indicate when the post-processing units are receiving valid dot product or ALU data.

The post-processor 1400 includes numerous post-processing units 1415 that handle the non-dot product computation of the neural network nodes. In some embodiments, the post-processor block within a segment includes the same number of post-processing units 1415 as there are dot product bus lanes and activation write bus lanes (which is also the number of adder trees in each core for computing partial dot products). Each post-processing unit 1415 receives two types of data inputs: (1) dot products from the dot product bus for convolution and fully-connected neural network nodes and (2) activation inputs (ALU inputs) from the core RAM for pooling nodes and element-wise operator nodes. In some embodiments, both types of inputs are used to execute a replicated layer (e.g., by first executing multiple convolutional layers and subsequently by combining the layers as an element-wise layer).

In some embodiments, each post-processing unit receives a single dot product input, from its corresponding segment in the dot product bus. However, to accommodate certain situations in which one or more filter slices assigned to a core is not sparse enough (i.e., too many of the weight values of a portion of the filter used to compute a partial dot product are nonzero), the post-processing units of some embodiments each receive two dot product inputs. Specifically, some of the dot product bus lane outputs are sent to two or more of the post-processing units (in some such embodiments, different dot product bus lane outputs are sent to different numbers of post-processing units, with each post-processing unit receiving two such outputs). Some of the details of the post-processing units are described further below by reference to FIG. 15.

The post-processing switch 1420 of some embodiments compresses the post-processing unit outputs (i.e., the activation outputs) to be sent to the activation write bus. In some embodiments, the chip fabric can be configured for different size activation outputs (e.g., 4-bit, 8-bit, or 16-bit), but the activation write bus requires the outputs to be in contiguous blocks. As such, for output sizes smaller than the maximum, the post-processing switch compresses these together to eliminate the meaningless bits (e.g., compressing two 4-bit activation outputs onto the wires for one 8-bit activation output).

Figure 15:
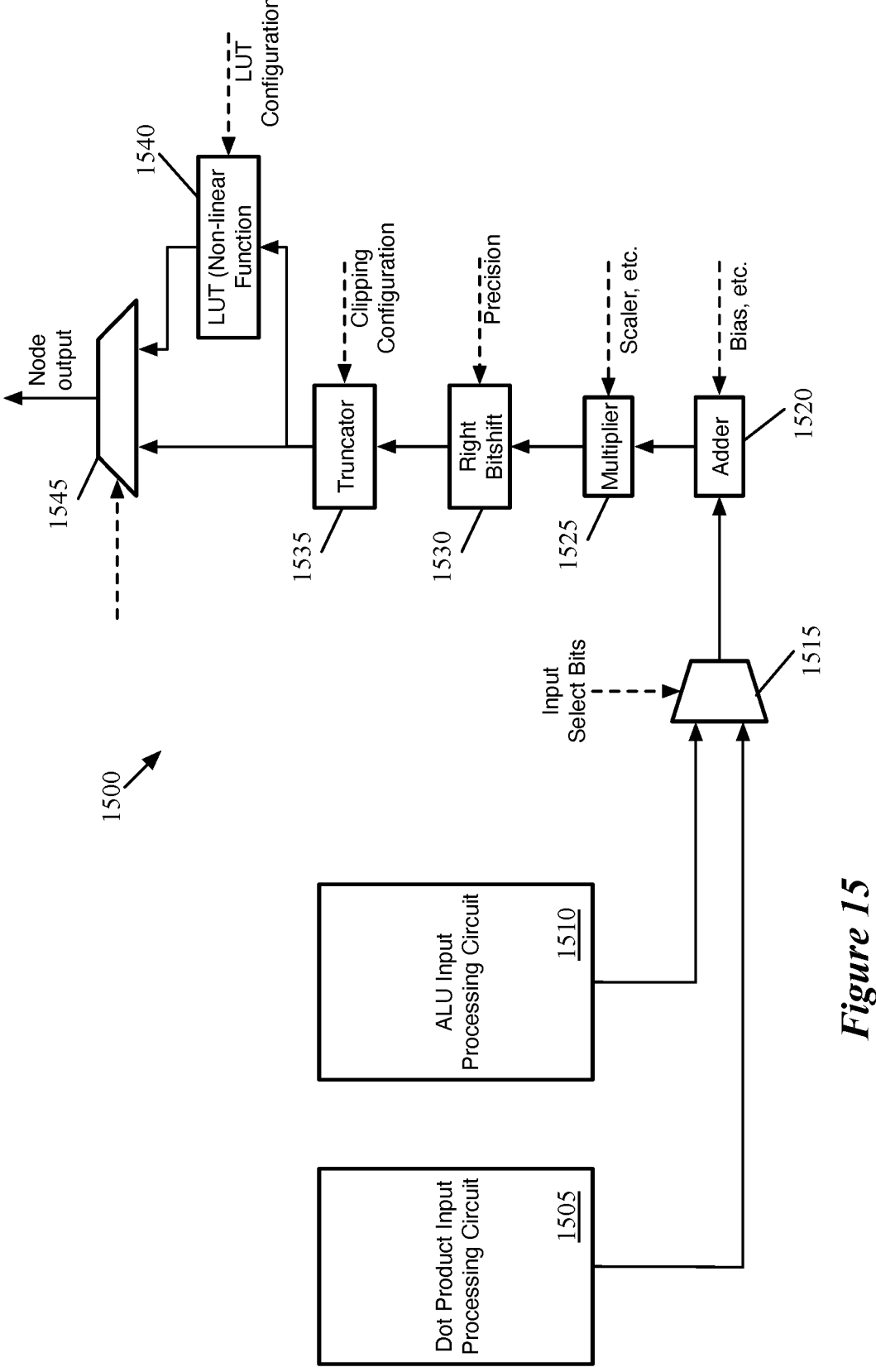
FIG. 15 conceptually illustrates the structure of a post-processing unit of some embodiments.

FIG. 15 conceptually illustrates the structure of a post-processing unit 1500 of some embodiments. As shown, the post-processing unit 1500 includes a dot product input processing circuit 1505, an ALU input processing circuit 1510, a multiplexer 1515 that selects between the outputs of these two circuits, and a set of post-processing operation circuits.

The dot product input processing circuit 1505 is used to combine dot products from two separate cycles if a dot product is too large to be computed in a single cycle across the cores of the computation fabric. In addition, if a particular filter slice needs to be split across multiple cores (because of too many non-zero weight values), the dot product input processing circuit is configured to account for that by using inputs from multiple dot product buses. Furthermore, some embodiments enable dot products to be double the size of the standard quantized output (e.g., 8-bit rather than 4-bit) by using dot products from multiple cycles and bitshifting the first set of input data.

The ALU input processing circuit 1510 is used to perform operations for neural network nodes that do not use dot products (i.e., that are not part of convolutional or fully-connected layers). Neural network computation nodes that do not use dot products include, for example, pooling layers of convolutional networks (e.g., average pooling and max pooling layers) as well as nodes that perform element-wise operations (e.g., for the element-wise addition operation used to combine multiple replica layers). In some of these embodiments, the cores provide input values directly to the post-processing units without computing dot products, and the post-processing units are configured to perform the appropriate operations on these inputs.

The output of each of these circuits 1505 and 1510 is sent to a multiplexer 1515, and a set of configuration bits is used to select between these two possible inputs. This input value is sent to an adder 1520 and then to a multiplier 1525. For dot product outputs, the adder 1520 adds the bias of the linear function for the node and the multiplier 1525 multiplies this by the scaling factor for the linear function (these bias and scale factors may include batch normalization affine transform parameters, in some embodiments). The value sent to the multiplier 1525, in some embodiments, is a combination of (i) the scaler value computed during the training of the neural network (which is often 1) and (ii) the positive value of the ternary weight (which was removed in order to scale the weight values used in the dot product to 1 and −1). As described below, some embodiments use this scaling factor at the multiplier 1525 to handle complications arising from quantization of replica layers.

In some embodiments, a multiplexer is used to select between a bias value specific to the post-processing unit (i.e., allowing for different bias values for different computation nodes in a layer) and a bias value shared across all of the post-processing units in a layer. In general, convolution and fully-connected nodes will use a node-specific bias value (especially when accounting for the number of negative weights), but pooling and typical element-wise operator layers may use the same value for all of the nodes (often zero). However, the element-wise operation used to combine multiple replica layers may use individual node-specific bias values in some embodiments, as this layer applies post-processing operations as for a convolutional layer.

For the scaling factor, a set of multiplexers is used in some embodiments to select between a node-specific scaling value and two possible shared scaling values. In some embodiments, pooling layers will use the same shared scaling value for each node (e.g., to divide by the number of nodes over which average pooling is performed), but at the end of a row will need a different scaling value to account for padding.

The right bit shift operator 1530 ensures that, post-multiplication, the value has the desired precision (i.e., shifting the binary point). As an example, a number with three bits before the binary point and two bits after the binary point multiplied by a similar number would result in a number with six bits before the binary point and four bits after. However, if a number with only two bits after the binary point is desired, the right bit shift removes the last two bits. In some embodiments, the right bit shift receives a set of configuration bits that map to different allowed precisions. This bit shift circuit 1530 can be used to modify the precision of replica layers in some embodiments, as described below.

The truncator 1535 performs a clipping operation in some embodiments to truncate the output value of the linear operator down to the desired number of bits. In some embodiments, this can be a 4-bit value, a 5-bit value (a 4-bit signed value), an 8-bit value, or a 16-bit value. In such embodiments, the output has 16 wires, and values of less than 16-bits have Os for the appropriate number of most significant bits. In other embodiments, the maximum output is 8 bits, in which case 4-bit, 5-bit, and 8-bit values are possible outputs. Different clipping operations that may be used, in different embodiments, can include a modulo operation (that effectively zeroes out a particular number of the most significant bits), clipping values above a maximum down to that maximum (e.g., if outputting a 5-bit value, all values above 15 are clipped down to 15 (1111), etc. In some embodiments, the truncator 1535 receives (as output from the right bit shifter 1530) more bits than it outputs (e.g., receiving 32 bits but outputting a maximum of 16 bits).

Finally, the LUT 1540 implements the non-linear activation function. The full (e.g., 16-bit, 8-bit) output of the truncator 1535 is passed to the multiplexer 1545, while a subset of the output bits (e.g., 5 bits) are also split off to the LUT 1545. This LUT effectively implements a mapping table representing the activation function for the neural network computation node, and the multiplexer 1545 selects between the truncator output and the LUT output. The LUT configuration, in some embodiments, is the same for all nodes in a layer, which only requires one set of mapping table values to be sent as part of the neural network instructions. The multiplexer output is the neural network node output, which is gated by a valid signal (not shown) to indicate when the post-processing unit is outputting a completed activation value to be carried by the activation write bus to the appropriate core and stored in the activation memory of that core.

The use of a LUT rather than a hardwired non-linear function enables the use of different non-linear activation functions for different layers of a neural network as well as for different networks. For instance, in addition to common activation functions (e.g., the Rectified Linear Unit (RELU), etc.), periodic activation functions and other options are possible. In some embodiments, the lookup table circuit receives a truth-table (e.g., a 4-bit to 4-bit or 5-bit to 4-bit mapping) as configuration data in order to implement the non-linear activation function. In some embodiments, periodic functions with can be implemented using the modulus function of the truncator 1535. In this case, the period of the period function is the full truth table provided to the lookup table 1540, with the modulus function meaning that only the 5 least significant bits of the output from the right bit shifter 1530 will affect the value output by the lookup table 1540. As mentioned, rather than a LUT, some embodiments use a configurable piecewise linear function to implement the activation function. This circuit block takes as input, in some embodiments, various values that define the piecewise linear function.

Figure 16:
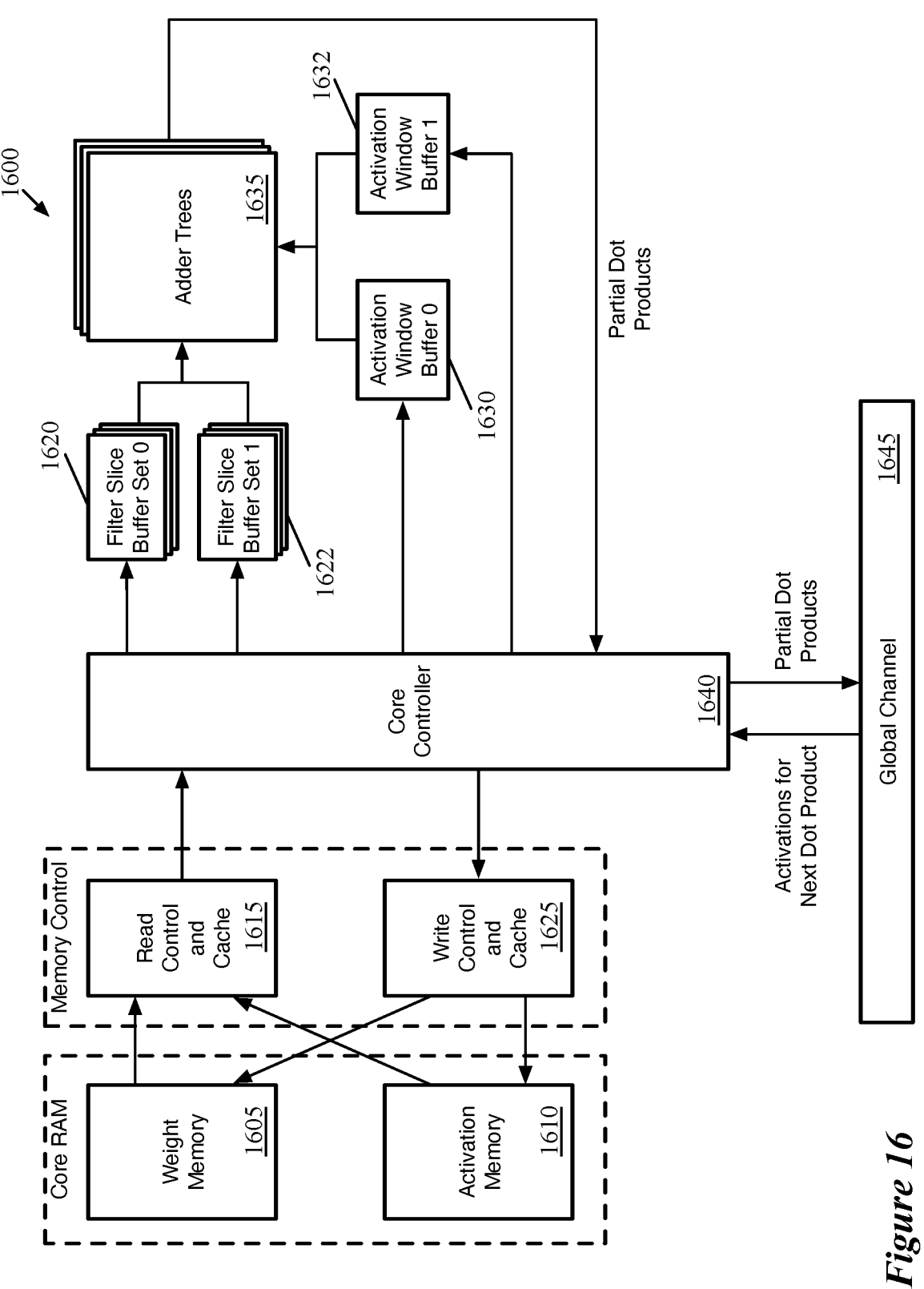
FIG. 16 conceptually illustrates the data flow within one of the cores of some embodiments for a dot product computation.

As mentioned, the dot product cores perform the majority of the dot product computation of the chip fabric of some embodiments. FIG. 16 conceptually illustrates the data flow 1600 within one of the cores of some embodiments for a dot product computation. This data flow will be described with certain specifics (e.g., weight and activation data sizes, number of separate adder trees simultaneously computing partial dot products, etc.) as examples, but it should be understood that different embodiments may use different sizes for weight data and/or activation values, different numbers of adder trees within a core, etc.

In some embodiments, the dot product cores store weight data values (e.g., weights for multiple nodes in multiple layers) in the weight memory 1605 and activation values in the activation memory 1610. In some embodiments, as shown, these memories 1605 and 1610 are part of a single block of memory for the core within the unified memory of the IC (e.g., banks of random-access memories such as SRAMs). In addition to storing weight and activation values, in some embodiments the microprocessor of the IC can use the memories in the cores as overflow memory (e.g., to store an image before the image is processed and provided as input to the neural network fabric).

The weight values are part of the network parameters and thus are determined by the training described above and encoded at compile time (and do not change at runtime), while the activation values (the input values to a particular node or set of nodes being computed) are the output values from a previous computation (or, for the first layer, are otherwise based on the network input) and thus are determined at runtime. Thus, the weight memory 1605 is typically larger than the activation memory 1610 (e.g., 512 KB to 64 KB), as the activation memory is at least party overwritten for each new layer of the neural network while the weight memory 1605 stores the weights for all of the dot product computations performed by the core. In some embodiments, the weights are stored as 1-bit or 2-bit values (e.g., all values stored as 2-bit values, or zeros stored as a single bit and negative/positive values stored as 2-bit 1/–1). In other embodiments, the weights are encoded in such a manner that less than 1 bit of the weight memory 1605 is allocated per weight value (e.g., by encoding the weight values in such a way that many of the zeros are removed, while storing additional data for each non-zero weight value).

The read controller and read cache 1615 reads data from the weight memory 1605 into sets of filter slice buffers 1620 and 1622 that store the weight data to be used in the dot products. In some embodiments, as mentioned, a filter is a set of weights that is used to compute a dot product with a set of inputs (e.g., in order to identify a specific feature type within a portion of an image). Depending on the number of channels of the activation inputs, filters may be divided into multiple slices. Each filter, in some embodiments, is used repeatedly to compute dot products with numerous activation windows (e.g., contiguous sets of activation inputs). Some embodiments load data for 36 (or 40) weight values into each filter slice buffer, which are actually used to compute 144 dot product components (with the requirement that at least 75% of the weight values be zero, the actual adder tree only receives 36-40 inputs for each buffer of 144 activation values, as described in detail below).

Some embodiments include both primary filter slice buffers 1620 and secondary filter slice buffers 1622, as shown in this figure. In a given clock cycle, at most one of these sets of filter slice buffers is used to compute dot products (e.g., using multiplexers to select only one of the sets of weight value data). For simpler dot product computations, only the primary filter slice buffer 1620 is needed, so there is no need to load weight values into the secondary filter slice buffers 1622. However, in other cases, both sets of filter slice buffers may be used (e.g., when dot products are too large to be computed in a single clock cycle using only the primary buffers).

The read control and cache 1615 also reads data (input values) from the activation memory 1610 into the activation window buffers 1630 and 1632. In addition, the read controller 1615 arranges the input values within the activation window buffers 1630 and 1632 in some embodiments to match up with the weight values in the filters. In some embodiments, the input values in an activation window read into the buffers 1630 (and 1632) include all of the values (as opposed to the 25% of the values needed for a particular filter), because the activation window is multiplied by numerous filters simultaneously (i.e., some or all of the filters stored in the filter slice buffers). The input values, in some embodiments, are quantized to have a fixed size (e.g., 4 bits), or set of fixed sizes (e.g., 4 bits or 8 bits) for ease and simplicity of computation.

As with the sets of filter slice buffers, some embodiments include both a primary activation window buffer 1630 and a secondary activation window buffer 1632. In a given clock cycle, at most one of these sets of activation window buffers is used to compute dot products (e.g., using multiplexers to select only one of the sets of activation input values). For simpler dot product computations, only the primary activation window buffer 1620 is needed, so there is no need to load activation inputs into the secondary activation window buffer 1622. However, in other cases, both activation window buffers may be used (e.g., when dot products are too large to be computed in a single clock cycle using only the primary buffers). In some embodiments, as shown, the same read controller and cache 1615 is used to read data from both the weight memory partition 1605 and the activation memory partition 1610. In such embodiments, the cache is used to store weight value data when reading the weights from the weight memory 1605. For each pass, this memory control circuit first reads the encoded weight data and provides this data to the core controller 1640 (which decodes weight data and loads the decoded weight data into the filter slice buffers), then reads input values and provides these values to the core controller 1640 (for the core controller to load the input values into the activation window buffer(s) interspersed with the computation of dot products by the adder tree circuits 1645).

The adder trees 1635 compute the dot products between the weight values represented in the filter slice buffers 1620 and the input values in the activation window buffer 1630. The details of these partial dot product computation circuits of some embodiments are described below by reference to FIG. 17. These adder trees 1635 output partial dot products (e.g., 10-bit values) that are provided to the dot product bus, which combines the partial dot products with other partial dot products as described above. In some embodiments, the number of filter slice buffers in each of the sets 1620 and 1622 is equal to the number of adder trees 1635 in the core, as well as the number of dot product bus lanes, post-processing units, and activation write bus lanes in each segment. Thus, for a typical neural network computation node, the partial dot products computed by the adder trees 1635 in multiple cores having a particular index are aggregated by the dot product bus lane with the same index, that aggregated dot product is provided for post-processing to one of the post-processing units with the same index (i.e., the post-processing unit with that index in one of the channel segments), and the output of the post-processing unit is transported by the activation write bus with the same index to its destination core.

The core controller 1640 configures and coordinates the operation of the read and write controllers 1615 and 1625 in addition to the filter slice buffers 1620, activation window buffer 1630, and adder trees 1635. Furthermore, the core controller 1640 receives the input activations and weights from the read controller 1615 and loads them into the correct slots in the sets of filter slice buffers 1620 and 1622 and the activation window buffers 1630 and 1632 (or directs them to the ALU bus for non-dot product computations). Lastly, when the adder trees 1635 output their partial dot product values, the core controller 1640 sends these values to the dot product bus in the global channel 1645. When the activations for the next layer are output, the activation write bus carries these values to the core controller 1640, which provides them to the write control and cache 1625 to be written to activation memory 1610.

To reduce the circuit area and power required for dot product computations (which use the majority of resources for neural network inference), the partial dot product computation circuits (e.g., the adder trees 1635) of some embodiments map each of a first number of input values to a second number (e.g., 25% of the first number) of dot product inputs, such that each dot product input only receives at most one input value with a non-zero corresponding weight value. Specifically, in some embodiments, the partial dot product computation circuit includes at least two sets of wires for each input (activation) value, with each of the sets of wires for a given input value connected to at least two different dot product inputs (so that each input value can be provided to at least two different inputs). With a guarantee of at least 75% weight sparsity (i.e., at least 75% of the weight values for any set of input values are zero), e.g., due to training using quantization and sparsification techniques described above, the number of dot product inputs is set at 25% (or slightly more than 25%, for redundancy) of the number of input values loaded in an activation window for the dot product computation circuit. In some embodiments, the weight sparsity is guaranteed by the training algorithm used to train the weights to perform a specific purpose, and the IC is adaptable for any set of weights that meets the guarantee.

Figure 17:
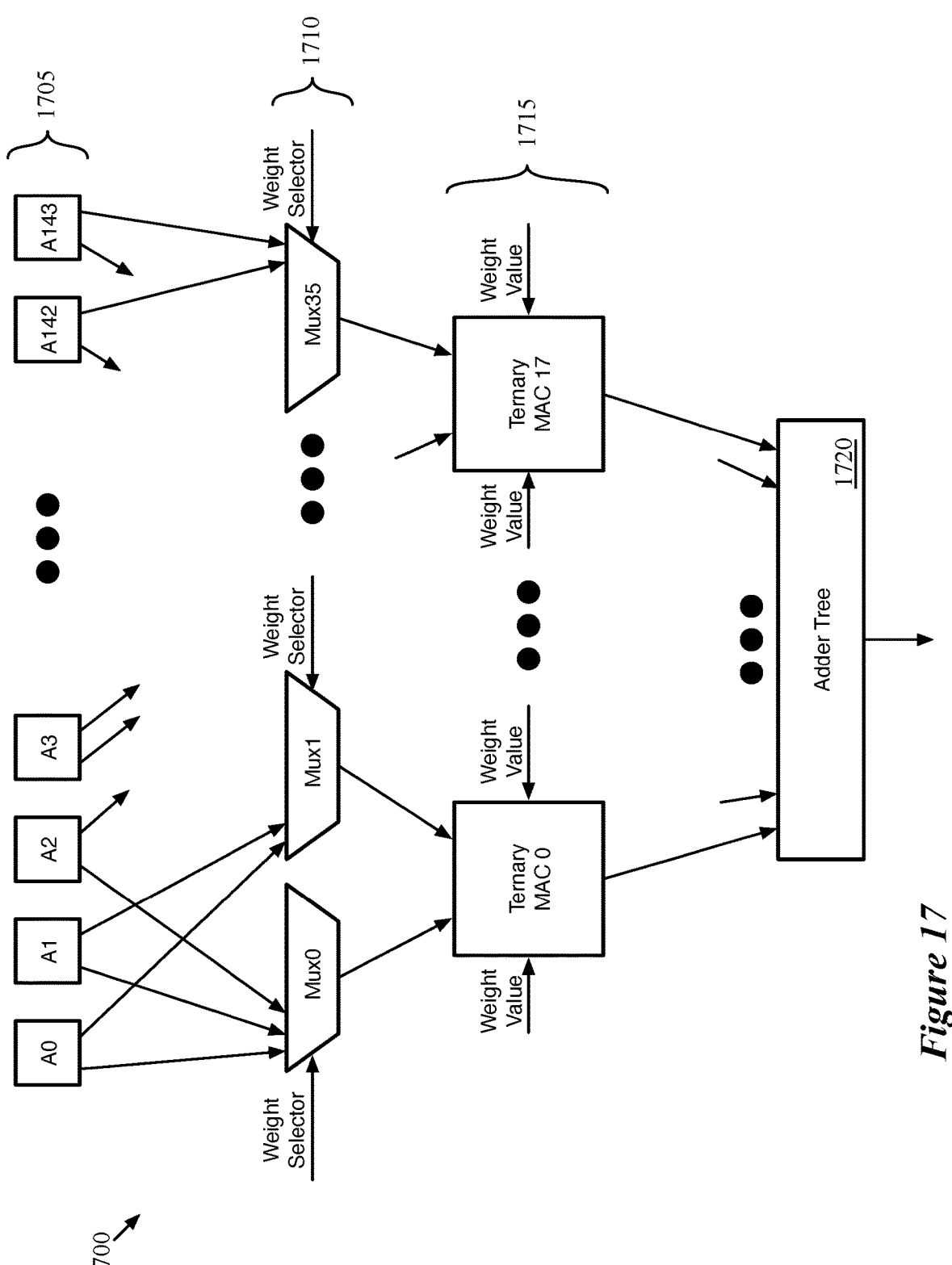
FIG. 17 conceptually illustrates an example of a partial dot product computation circuit for a guaranteed weight sparsity of at least 75%.

FIG. 17 conceptually illustrates an example of such a partial dot product computation circuit 1700 for a guaranteed weight sparsity of at least 75%. The wiring of the input values for this dot product computation circuit is designed to optimize the likelihood that, so long as the weights meet the sparsity requirement, the compiler can ensure that at runtime each input value with a nonzero corresponding weight value is provided to a different dot product input for nearly any arrangement of the nonzero weight values. As shown, the dot product computation circuit 1700 includes a set of activation inputs 1705, a set of multiplexers 1710, a set of ternary multiplier-accumulator (MAC) circuits 1715, and an adder tree 1720.

In this example, the dot product computation circuit 1700 includes 144 input values 1705. In different embodiments, the activation window buffer may have different sizes, which defines the size of the partial dot product computation. Each input value storage (e.g., each location in the activation window buffer) is connected to two of the thirty-six multiplexers 1710. In this example, at least 75% sparsity is assumed for each set of weight values, and thus the 144 activation inputs can be reduced to 36 inputs for the actual dot product computation. This significantly reduces the circuit area required for the dot product computation, as the number of adders is reduced by 75% (the adder tree effectively starts with 36 values rather than 144 values), in addition to reducing the amount of weight data that is stored in memory.

The multiplexers 1710 each have eight inputs and receive a set of select bits (the weight selector input) from the core controller that specifies which of these eight inputs to pass to the dot product computation. In some embodiments the weight selector input is a 3-bit value that is stored as part of the weight data for each non-zero weight. Having thirty-six 8-input multiplexers 1710 allows for 288 sets of wires from the activation inputs 1705 to the multiplexers 1710, which is two wires for each activation input. If the sparsity guarantee was only 50%, then seventy-two 4-input multiplexers could be used with two sets of wires for each activation input 1705 (or seventy-two 8-input multiplexers with four sets of wires for each activation input 1705), with similar proportions for different sparsity guarantees and numbers of wires per activation input.

The wire sets from the activation inputs to the multiplexers are arranged such that the compiler can verify that each input value with a nonzero corresponding weight is provided to a different one of the multiplexers 1710. The weight values are not known at the time of IC manufacture, and thus the wiring design is resilient to different arrangements of the nonzero weight values (that meet the sparsity requirement). Some embodiments use a cuckoo hashing algorithm (or other algorithm) to optimally map the wire sets from the activation inputs 1705 to the multiplexers 1710. In some embodiments, this algorithm computes two hashes (e.g., with two different hash functions) for each of the activation input locations 1705 that map to two different multiplexers 1710 (e.g., by computing the hash modulo 36). Each activation input location 1705 is wired to these two different multiplexers 1710 determined by the hashes. If one of the hash functions maps an activation input to a multiplexer that already has eight inputs, then some embodiments compute a third hash function for either that activation input or one of the activation inputs previously mapped to the multiplexer.

Other embodiments use other techniques to select the multiplexers to which each input value is wired, so long as each input is wired to two different multiplexers (and thus each multiplexer has input wires from eight different activation inputs). Additional constraints may be imposed as well, such as ensuring that no more than a specified maximum number of activation inputs are wired to the same pair of multiplexers. In addition, it should be understood that these techniques can be applied to dot product computation circuits with different numbers of inputs, different numbers of multiplexers, and different numbers of wires per input.

The weight values are known before the network is executed by the IC (i.e., at compile time), and thus the compiler can determine which of the two multiplexers that receive each input value with a non-zero corresponding weight at runtime will select that input value, such that each input value is selected by a different multiplexer (and only one multiplexer). In some embodiments, the compiler uses the same cuckoo hashing or other algorithm as was used for the wires. The select bits for the multiplexers 1710 are determined by which of the inputs to the multiplexer carries an input activation value with a nonzero corresponding weight value, and are received from the filter slice buffer. In some embodiments, these multiplexer select bits are stored for each non-zero weight value (for multiplexers that do not receive any inputs corresponding to non-zero weights, the multiplexer select bits do not matter, and thus do not need to be stored in the encoded weight data). These multiplexers 1710 provide their output to a set of ternary multiply-accumulator (MAC) circuits 1715. The ternary MAC circuits effectively form the leaves of the dot product computation, and the number of such circuits is half the number of multiplexers 1710 (18 ternary MAC circuits 1715 in this example).

In some embodiments, the weight values for a particular dot product computation are all either zero, a positive value, or the negation of the positive value in some embodiments. In this case, the dot product does not require any actual multiplication at the leaves of the computation, as the positive and negative weight values can be treated as 1 and-1, with a single multiplication by the positive value afterwards. Removing the multiplication at the leaves saves significant circuit area for a chip with numerous such computation circuits.

To combine the two input values while accounting for the ternary weight values, the ternary MAC circuits 1715 add the two input values from the multiplexers 1710 while also receiving as inputs the corresponding weight data for these input values. In some embodiments, the ternary MAC receives two bits of weight data for each of its inputs. If both of the weights are positive, then the ternary MAC outputs the sum of the two input values (and outputs the negative of this sum if both of the weights are negative). If only one of the weight values is negative, then its corresponding input value is subtracted from the other input value (with a positive corresponding weight value), and if both of the weight values are zero, then the ternary MAC output is zero. Lastly, if only one of the weight values is zero, then the ternary MAC outputs the input value (or the negative of the input value) with the corresponding nonzero weight value. The negative values are accounted for in the bias computation within the post-processing unit, as described above.

The outputs of the ternary MACs provide the inputs to the adder tree 1720 that computes the output for the partial dot product computation. In some embodiments, this adder tree is a standard adder tree circuit that adds pairs of values over several layers. For example, the adder tree 1720 receives 18 inputs for 9 adders, which in turn provide outputs to 4 adders (with an additional output to be added in later), etc. In some embodiments, the inputs to the ternary MACs 1715 are 4-bit inputs (the length of the quantized activation values), and the ternary MACs 1715 output 6-bit values. The adder tree 1720 receives these 6-bit values and outputs a 10-bit value after several stages of addition. It should be noted that this description refers to handling of signed 4-bit input values. Some embodiments can also handle unsigned input values by converting them to signed input values before performing the addition operations. For example, some embodiments output and store 4-bit outputs, which can be signed or unsigned. Before performing the addition operations, an additional bit is added that either sign-extends (to convert signed 4-bit inputs to signed 5-bit inputs) or 0-pads (to convert unsigned 4-bit inputs to signed 5-bit inputs).

While this diagram shows the wires (or some of the wires) connecting each of the input values 1705 to a single partial dot product computation circuit, in some embodiments each of these input values 1705 in the activation window buffer is actually connected to each of the partial dot product computation circuits in the core. That is, for the case with 64 such circuits, each value in the activation window buffer is carried by 128 total wires to 128 multiplexers (two for each of the partial dot product computation circuits). In some embodiments, the wiring arrangement is the same for each set of multiplexers (i.e., for each partial dot product computation circuit).

As mentioned, for redundancy, some embodiments use a number of dot product inputs (i.e., multiplexers) that is slightly more than required by the sparsity guarantee for the dot product computation. For instance, in the example above, rather than using 36 inputs (exactly 25% of the 144 input values), some embodiments use 38 or 40 inputs. In this case, some of the activations 1705 are mapped to three of the multiplexers 1710, rather than two. In addition, some embodiments use a different size activation window buffer (e.g., with 128 activations rather than 144).

Figure 18:
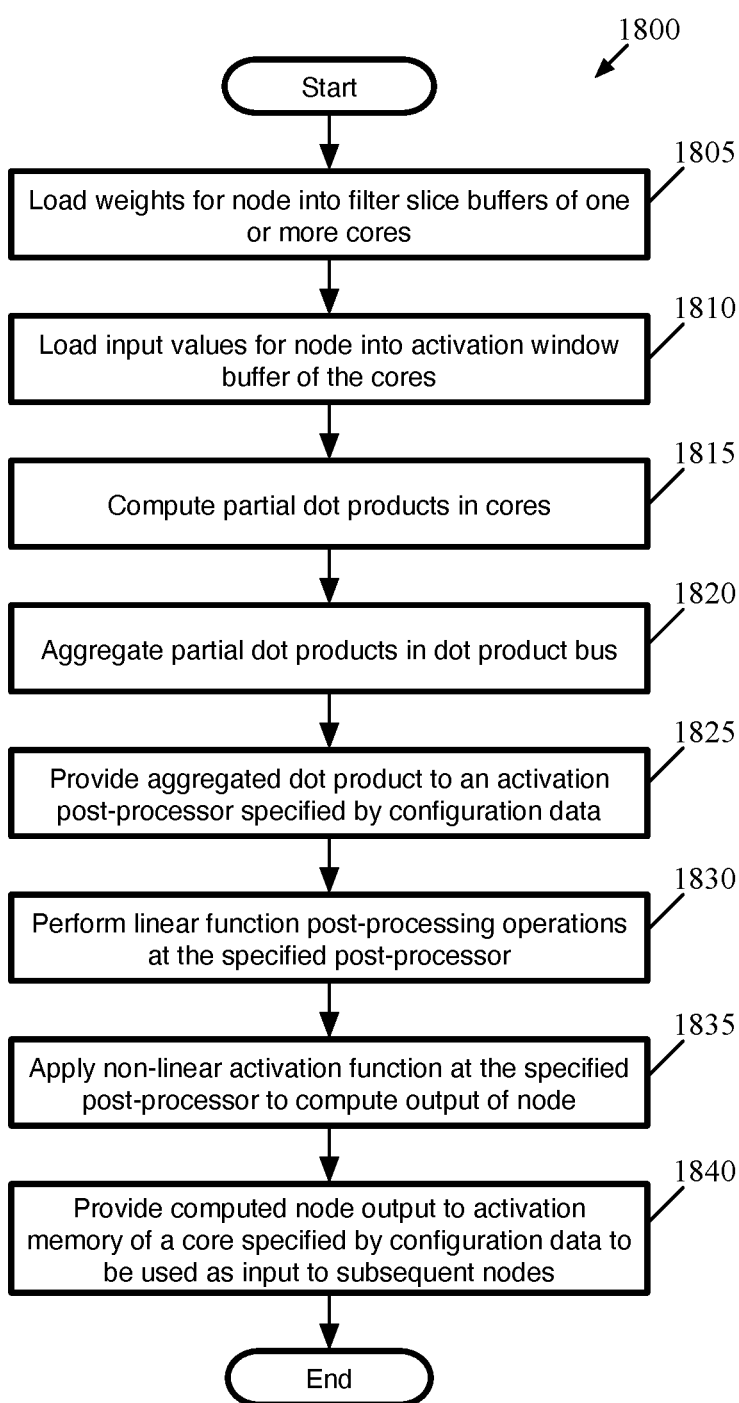
FIG. 18 conceptually illustrates a process of some embodiments for executing a set of instructions (or a portion of a set of instructions) to compute the output of a neural network node.

FIG. 18 conceptually illustrates a process 1800 of some embodiments for executing a set of instructions (or a portion of a set of instructions) to compute the output of a neural network node (specifically, a convolutional or fully-connected node). The process 1800 is executed by the chip fabric of a neural network IC, such as that described above. Typically, the process 1800 is executed simultaneously for multiple nodes, and operations 1810-1840 are performed repeatedly for multiple activation windows (i.e., multiple groups of input values loaded into the activation window buffer) in order to completely execute a layer (or portion of a layer) of the neural network. In the case of the process 1800, the dot product can be computed in a single cycle and does not involve any split filter slices (i.e., no time-multiplexing is required).

As shown, the process begins (at 1805) by loading the weights for a node into filter slice buffers of one or more cores. In addition, the process loads (at 1810) the input (activation) values for the node into the activation window buffer of these cores. In some embodiments, a set of input values are loaded into one activation window buffer in a core while the weight data for several nodes are loaded into several filter slice buffers of the core. Other embodiments load the weight data into the filter slice buffers first, then load the input values into the activation window buffer. Furthermore, some embodiments load the weight data once for a pass (that computes outputs for many activation nodes), then iteratively load sets of input values and compute dot products for numerous nodes without the need to re-load the weight data. In addition, the weights and activations for a node, in some embodiments, are divided among the filter slice and activation window buffers of all of the cores that are active for the current set of instructions. The storage of the weight and activation values and loading of these values into the filter slice buffer and activation window buffer, respectively, are also described in greater detail below.

The process 1800 then computes (at 1815) partial dot products in the cores. As described above, the activation values loaded into the activation window buffers in each of the active cores are multiplied by their corresponding weight values loaded into the filter slice buffers of these cores. In some embodiments, the size of the partial dot products is reduced using the wiring structure shown in FIG. 17, and with ternary weight values of $\{0, 1, -1\}$, the multiplication is handled by the ternary MAC circuits shown in this figure.

Next, the process aggregates (at 1820) these partial dot products in the dot product bus. In some embodiments, the partial dot products for a particular node are calculated by the adder tree with the same index (i.e., out of several adder trees) in each of the active cores, and thus these partial dot products are all passed to the same corresponding lane of the dot product bus (which has one lane for each of the adder trees in a core). In some embodiments, the final aggregation is performed by the dot product bus lane in the channel segment of the post-processor selected for the particular node.

The process 1800 then provides (at 1825) the aggregated dot product to an activation post-processor specified by configuration data. This configuration data, in some embodiments, is generated by a compiler and parsed by the hierarchical controller circuits of the neural network chip fabric, and indicates which channel segment will perform the post-processing. Each of the channel segments has an equal number of post-processing units, and the post-processing unit in the selected channel that corresponds to the dot product bus lane that aggregates the dot product is the post-processing unit that receives the aggregated dot product.

At the post-processing unit that receives the aggregated dot product, the process 1800 performs (at 1830) linear function post-processing operations. For all dot products, this includes the bias and scale operations described by reference to FIG. 15 above, with the values for these operations sent as configuration data from the cluster controller. In addition, certain dot products are aggregated over multiple cycles by the dot product input processing circuit (e.g., if time-multiplexing is required to handle dot products with a large number of components, or for dot products with double the standard number of bits).

Next, the process 1800 applies (at 1835) the non-linear activation function at the post-processing unit to complete the calculation of the node output value. In some embodiments, as shown in FIG. 15, a lookup table is used for this computation (e.g., a 5-bit to 4-bit mapping table). The mapping for each possible set of input bits is provided by configuration data from the cluster controller in some embodiments.

In some embodiments, the operations 1815-1835 are executed to compute the node output without storing the any intermediate values in memory. That is, none of the partial dot products are stored in any memories (e.g., RAM) during the computation within the core, and the same is true before and during the aggregation within the dot product bus. In some embodiments, a register is used to aggregate multiple dot product bus inputs over multiple cycles. However, in a standard case (e.g., for 4-bit dot products), this register passes the dot product input through and the entire set of operations 1815-1835 is executed in a single clock cycle.

Finally, the process 1800 provides the computed node output to the activation memory of one (or more) of the cores as specified by the configuration data, so that this output can be used as the input to a subsequent set of neural network nodes. In some embodiments, the node output value is carried to the specified core by the activation write bus, with the core index for the value specified by the cluster controller(s). In some embodiments, once at the specified core, the node output value may be temporarily stored in a write cache until the write cache is full and the data is written to the core memory.

As mentioned, the process 1800 illustrates the most simplistic case for computing a dot product. For this simplest type of dot product computation, the neural network computation circuit of some embodiments places the following restrictions on the computation: (i) all of the input values should be of the specified discrete size (e.g., 4 bits), (ii) the maximum number of input values is the size of the input buffer multiplied by the number of cores (e.g., 144 inputs×16 cores=2304 total input values), (iii) all of the weight values are either 0, $+\alpha$, or $-\alpha$ (and thus can be stored as 0, 1, and −1), and a large enough percentage of the weight values are 0 that the input values with non-zero weight values can each map to a different multiplexer input.

As mentioned above by reference to FIG. 16, each core includes a block of memory to store the weight data and activation values used by the core to compute dot products (i.e., the activation values that are loaded into the activation window buffer and the weight data that is loaded into the filter slice buffers). In some embodiments, each core is allocated the same amount of memory in total, which is divided between weight memory and activation memory for a particular network by the compiler that designs the program for the inference circuit to execute the network. Some embodiments require that each core be divided between weight memory and activation memory in the same manner (i.e., the allocation of weight/activation memory to each core is the same for all of the cores), while other embodiments allow for different allocations between the cores. For example, in some embodiments the allocation is the same for each core within a cluster but can vary between cores in different clusters (e.g., if a subset of cores are used for a majority of the layers of the network, then that subset of cores might need more of its memory allocated to weight data storage).

Within a core, the weight memory and activation memory partitions are themselves subdivided between layers of the network. As described above, all of the weight data used by a core is stored in the memory of that core at bootup time, because these values are the same for every input provided to the network. On the other hand, the activation values are determined at runtime (and occupy more memory per value than the weight data), so the cores do not store all of the activation values at a time. Depending on the type of network, only two layers of activations may need to be stored at once (the input activation values for the current layer being executed as well as the output activation values for that layer). In this case, once layer I is being executed (using the layer L activations as inputs and outputting the layer/ . . . /activations), the circuit can overwrite the layer L-I activations. On the other hand, if a network has residual connections (i.e., the output activations from layer I. are used as inputs for more than just layer/ . . . /), then more than two layers of activations may need to be stored at once.

Figure 19:
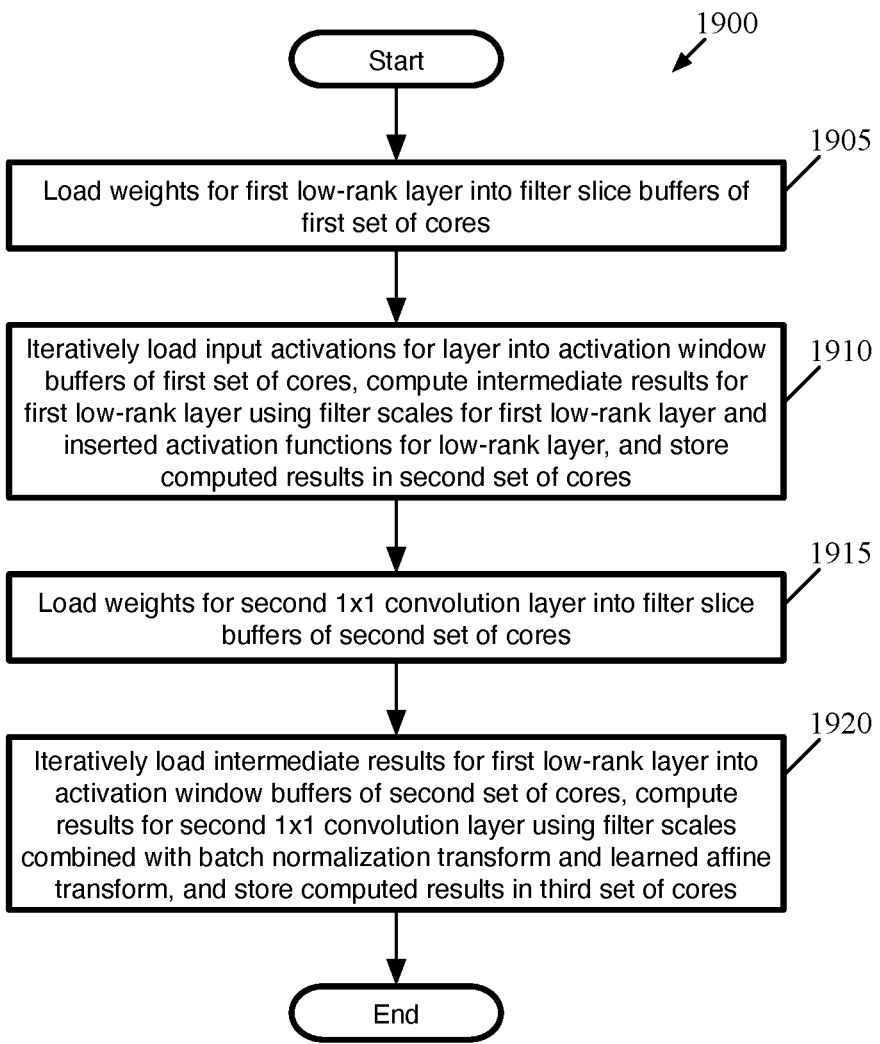
FIG. 19 conceptually illustrates a process 1900 of some embodiments for executing a decomposed layer on a neural network inference circuit.

Now that the circuits for executing convolutional and fully-connected layers on a neural network inference circuit of some embodiments have been described, the process for executing a decomposed layer with additional activation functions on such a circuit will be elaborated upon. FIG. 19 conceptually illustrates a process 1900 of some embodiments for executing a decomposed layer on a neural network inference circuit such as that described herein. In some embodiments, the decomposition is invisible to the neural network inference circuit, which simply executes two layers according to instructions for these layers. Similarly, the compiler that generates the instructions for the neural network inference circuit treats the layers as two convolutional layers with different properties (i.e., different filter sizes, stride, padding, affine transform, activation functions, etc.).

As shown, the process 1900 begins by loading (at 1905) the weights for the first low-rank layer into the filter slice buffers of a first set of cores. Ideally, because the decomposition reduces the number of filters in this layer, all of the filters can be handled at once (if there are more filters in the layer than filter slice buffers per core, then multiple passes are required for the layer). The compiler determines the first set of cores that store these weights.

Next, the process 1900 iteratively (at 1910) loads the input activations for the first low-rank layer into the activation window buffers of the first set of cores, computes the intermediate results for the first low-rank layer (using these input activations and the weights loaded into the filter slice buffers), and stores the computed results in a second set of cores. As described above, the read controllers in the first set of cores load a set of input activation values into the activation window buffers of their respective cores. Once these values are loaded, the adder trees in these cores compute partial dot products, which are combined in the dot product bus. These combined dot products are provided to the post-processing units, which perform any scaling and bias that is required.

In some embodiments, the inserted activation function associated with each of the low-rank filters is applied at this time, which also quantizes the output value. As shown in FIG. 15, the signals representing each intermediate value pass through the circuits implementing the activation function (e.g., the LUT 1540 and multiplexer 1545) irrespective of whether an activation function is applied. As such, the only cost imposed in order to add the activation functions to this layer is the need to provide configuration data to the LUT 1540 (or a piecewise linear function).

The outputs of the post-processing units are then stored in the second set of cores, which may be the same as the first set of cores, different than the first set of cores but with overlapping cores, or completely separate from the first set of cores, depending on the decisions made by the compiler. Additional input activations are then loaded into the activation window buffer, the partial dot products are again computed and scaling factors and activation functions applied, and the next set of results for the first low-rank layer are stored in the second set of cores. This set of operations is repeated until the first low-rank layer is complete.

After completing the low-rank first layer (i.e., one or more passes through the set of input activations, depending on the number of filters in the low-rank layer) and storing all of the intermediate values in the second set of cores, the process 1900 loads (at 1915) the weights for the second 1×1 convolution layer into the filter slice buffers of the second set of cores. The compiler determines the second set of cores that store these weights, which is the same as the cores in which the intermediate results are stored. In general, the filters are fairly small (because they are 1×1 filters, and so the rank of the first layer is equal to the number of weights in each filter of the second layer) such that they might only require the use of a single core (though this is also dependent on having enough storage in the single core for all of the intermediate values, enough of the weights of each filter being set to zero, etc.).

Finally, the process 1900 iteratively (at 1920) loads the intermediate results from the first low-rank layer into the activation window buffers of the second set of cores, computes the results for the second 1×1 convolutional layer (using these intermediate results and the weights loaded into the filter slice buffers), and stores the computed results in a third set of cores. As described above, the read controllers in the second set of cores load a set of input activation values into the activation window buffers of their respective cores. Once these values are loaded, the adder trees in these cores compute partial dot products, which are combined in the dot product bus. These combined dot products are provided to the post-processing units, which perform any scaling and bias that is required. In some embodiments, the scaling factors determined for each filter during training are combined with the batch normalization transform and the learned affine transform. In some embodiments, the activation function for the second layer of the decomposition is applied at this time, and the output value is quantized. In some embodiments, 4-bit or 8-bit activation values are used, depending on the network settings. The outputs of the post-processing units are then stored in the third set of cores, which may be the same as the first and/or second sets of cores, different than the first and/or second sets of cores but with overlapping cores, or completely separate from the first and/or second sets of cores, depending on the decisions made by the compiler. Additional input activations are then loaded into the activation window buffer, the partial dot products are again computed and scaling factors applied, and the next set of results for the 1×1 convolutional layer are stored in the third set of cores. This set of operations is repeated until the second 1×1 convolutional layer is complete.

Such a neural network inference circuit of some embodiments can be embedded into various different types of devices in order to perform different purposes (e.g., face recognition, object categorization, voice analysis, etc.). For each type of device, a network is trained, obeying the sparsity and/or ternary constraints, with the network parameters stored with the neural network inference circuit to be executed on the device. These devices can include mobile devices, desktop computers, Internet of Things (IoT) devices), etc.

Figure 20:
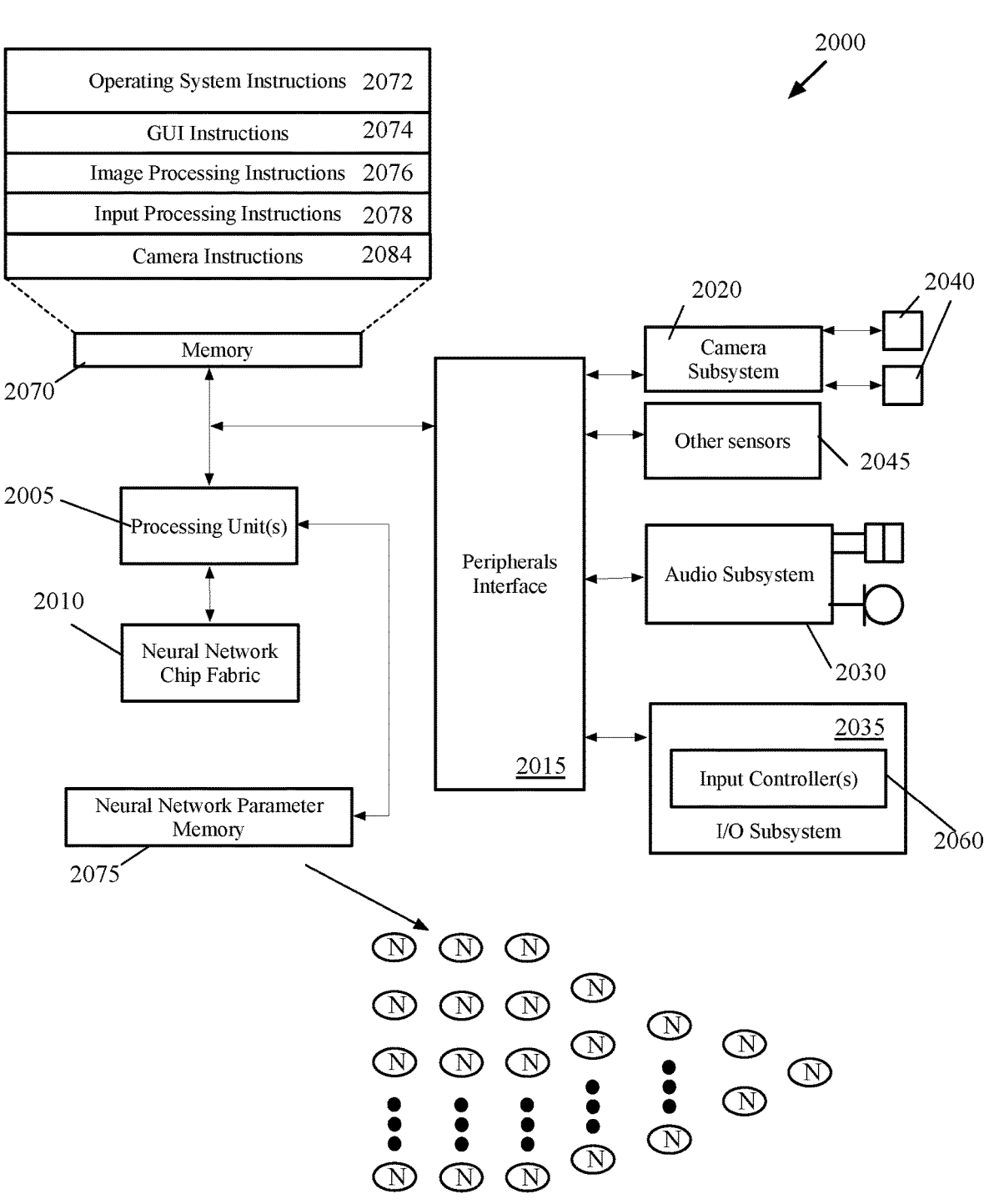
FIG. 20 illustrates an example of the architecture of a mobile computing device that stores neural network processing instructions.

FIG. 20 is an example of an architecture 2000 of an electronic device that includes a neural network integrated circuit of some embodiments. The electronic device may be a mobile computing device such as a smartphone, tablet, laptop, etc., or may be another type of device (e.g., an IoT device, a personal home assistant). As shown, the device 2000 includes one or more general-purpose processing units 2005, a neural network chip fabric 2010, and a peripherals interface 2015.

The peripherals interface 2015 is coupled to various sensors and subsystems, including a camera subsystem 2020, an audio subsystem 2030, an I/O subsystem 2035, and other sensors 2045 (e.g., motion/acceleration sensors), etc. The peripherals interface 2015 enables communication between the processing units 2005 and various peripherals. For example, an orientation sensor (e.g., a gyroscope) and an acceleration sensor (e.g., an accelerometer) can be coupled to the peripherals interface 2015 to facilitate orientation and acceleration functions. The camera subsystem 2020 is coupled to one or more optical sensors 2040 (e.g., charged coupled device (CCD) optical sensors, complementary metal-oxide-semiconductor (CMOS) optical sensors, etc.). The camera subsystem 2020 and the optical sensors 2040 facilitate camera functions, such as image and/or video data capturing.

The audio subsystem 2030 couples with a speaker to output audio (e.g., to output voice navigation instructions). Additionally, the audio subsystem 2030 is coupled to a microphone to facilitate voice-enabled functions, such as voice recognition, digital recording, etc. The I/O subsystem 2035 involves the transfer between input/output peripheral devices, such as a display, a touch screen, etc., and the data bus of the processing units 2005 through the peripherals interface 2015. The I/O subsystem 2035 includes various input controllers 2060 to facilitate the transfer between input/output peripheral devices and the data bus of the processing units 2005. These input controllers 2060 couple to various input/control devices, such as one or more buttons, a touch-screen, etc.

In some embodiments, the device includes a wireless communication subsystem (not shown in FIG. 20) to establish wireless communication functions. In some embodiments, the wireless communication subsystem includes radio frequency receivers and transmitters and/or optical receivers and transmitters. These receivers and transmitters of some embodiments are implemented to operate over one or more communication networks such as a GSM network, a Wi-Fi network, a Bluetooth network, etc.

As illustrated in FIG. 20, a memory 2070 (or set of various physical storages) stores an operating system (OS) 2072. The OS 2072 includes instructions for handling basic system services and for performing hardware dependent tasks. The memory 2070 also stores various sets of instructions, including (1) graphical user interface instructions 2074 to facilitate graphic user interface processing; (2) image processing instructions 2076 to facilitate image-related processing and functions; (3) input processing instructions 2078 to facilitate input-related (e.g., touch input) processes and functions; and (4) camera instructions 2084 to facilitate camera-related processes and functions. The processing units 2005 execute the instructions stored in the memory 2070 in some embodiments.

The memory 2070 may represent multiple different storages available on the device 2000. In some embodiments, the memory 2070 includes volatile memory (e.g., high-speed random access memory), non-volatile memory (e.g., flash memory), a combination of volatile and non-volatile memory, and/or any other type of memory.

The instructions described above are merely exemplary and the memory 2070 includes additional and/or other instructions in some embodiments. For instance, the memory for a smartphone may include phone instructions to facilitate phone-related processes and functions. An IoT device, for instance, might have fewer types of stored instructions (and fewer subsystems), to perform its specific purpose and have the ability to receive a single type of input that is evaluated with its neural network.

The above-identified instructions need not be implemented as separate software programs or modules. Various other functions of the device can be implemented in hardware and/or in software, including in one or more signal processing and/or application specific integrated circuits.

In addition, a neural network parameter memory 2075 stores the weight values, bias parameters, etc. for implementing one or more machine-trained networks by the neural network chip fabric 2010. In some embodiments, different clusters of the fabric 2010 can implement different machine-trained networks in parallel in some embodiments. In different embodiments, these neural network parameters are stored on-chip (i.e., in memory that is part of the neural network chip fabric 2010) or loaded onto the IC 2010 from the neural network parameter memory 2075 via the processing unit(s) 2005.

While the components illustrated in FIG. 20 are shown as separate components, one of ordinary skill in the art will recognize that two or more components may be integrated into one or more integrated circuits. In addition, two or more components may be coupled together by one or more communication buses or signal lines (e.g., a bus between the general-purpose processing units 2005 and the neural network IC 2010, which enables the processing units 2005 to provide inputs to the neural network IC 2010 and receive the outputs of the network from the IC 2010. Also, while many of the functions have been described as being performed by one component, one of ordinary skill in the art will realize that the functions described with respect to FIG. 20 may be split into two or more separate components.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 21:
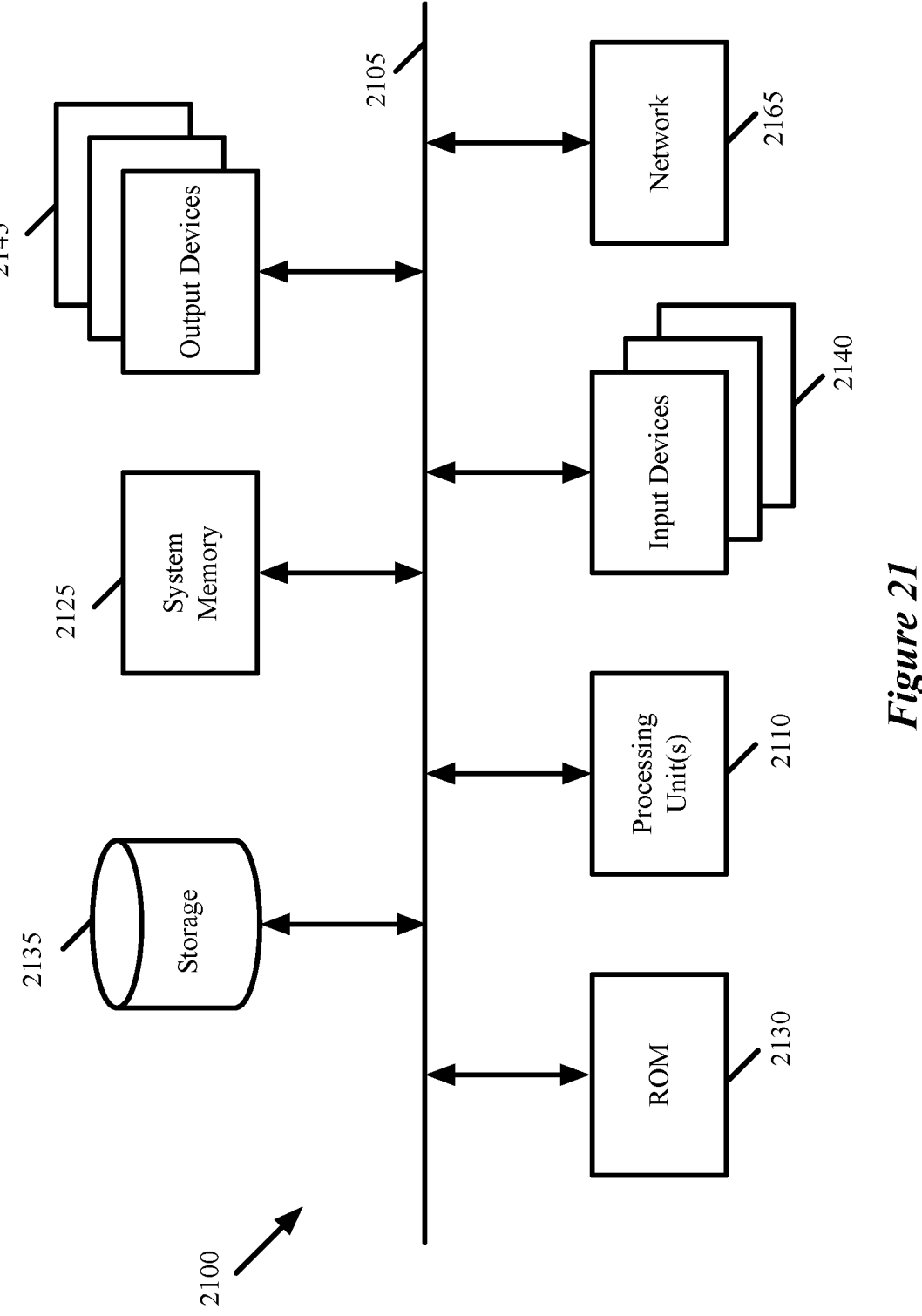
FIG. 21 conceptually illustrates an electronic system with which some embodiments of the invention are implemented.

FIG. 21 conceptually illustrates an electronic system 2100 with which some embodiments of the invention are implemented. The electronic system 2100 can be used to execute any of the applications (e.g., the training application) described above. The electronic system 2100 may be a computer (e.g., a desktop computer, personal computer, tablet computer, server computer, mainframe, a blade computer etc.), phone, PDA, or any other sort of electronic device. Such an electronic system includes various types of computer readable media and interfaces for various other types of computer readable media. Electronic system 2100 includes a bus 2105, processing unit(s) 2110, a system memory 2125, a read-only memory 2130, a permanent storage device 2135, input devices 2140, and output devices 2145.

The bus 2105 collectively represents all system, peripheral, and chipset buses that communicatively connect the numerous internal devices of the electronic system 2100. For instance, the bus 2105 communicatively connects the processing unit(s) 2110 with the read-only memory 2130, the system memory 2125, and the permanent storage device 2135.

From these various memory units, the processing unit(s) 2110 retrieves instructions to execute and data to process in order to execute the processes of the invention. The processing unit(s) may be a single processor or a multi-core processor in different embodiments, and may include generic CPUs as well as graphics processing units (GPUs).

The read-only-memory (ROM) 2130 stores static data and instructions that are needed by the processing unit(s) 2110 and other modules of the electronic system. The permanent storage device 2135, on the other hand, is a read-and-write memory device. This device is a non-volatile memory unit that stores instructions and data even when the electronic system 2100 is off. Some embodiments of the invention use a mass-storage device (such as a magnetic or optical disk and its corresponding disk drive) as the permanent storage device 2135.

Other embodiments use a removable storage device (such as a floppy disk, flash drive, etc.) as the permanent storage device. Like the permanent storage device 2135, the system memory 2125 is a read-and-write memory device. However, unlike storage device 2135, the system memory is a volatile read-and-write memory, such a random-access memory. The system memory stores some of the instructions and data that the processor needs at runtime. In some embodiments, the invention's processes are stored in the system memory 2125, the permanent storage device 2135, and/or the read-only memory 2130. From these various memory units, the processing unit(s) 2110 retrieves instructions to execute and data to process in order to execute the processes of some embodiments.

The bus 2105 also connects to the input and output devices 2140 and 2145. The input devices enable the user to communicate information and select commands to the electronic system. The input devices 2140 include alphanumeric keyboards and pointing devices (also called "cursor control devices"). The output devices 2145 display images generated by the electronic system. The output devices include printers and display devices, such as cathode ray tubes (CRT) or liquid crystal displays (LCD). Some embodiments include devices such as a touchscreen that function as both input and output devices.

Finally, as shown in FIG. 21, bus 2105 also couples electronic system 2100 to a network 2165 through a network adapter (not shown). In this manner, the computer can be a part of a network of computers (such as a local area network ("LAN"), a wide area network ("WAN"), or an Intranet, or a network of networks, such as the Internet. Any or all components of electronic system 2100 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra-density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself.

As used in this specification, the terms "computer", "server", "processor", and "memory" all refer to electronic or other technological devices. These terms exclude people or groups of people. For the purposes of the specification, the terms display or displaying means displaying on an electronic device. As used in this specification, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

While the invention has been described with reference to numerous specific details, one of ordinary skill in the art will recognize that the invention can be embodied in other specific forms without departing from the spirit of the invention. In addition, some of the figures (including FIGS. 3, 8, 18, and 19) conceptually illustrate processes. The specific operations of these processes may not be performed in the exact order shown and described. The specific operations may not be performed in one continuous series of operations, and different specific operations may be performed in different embodiments. Furthermore, the process could be implemented using several sub-processes, or as part of a larger macro process. Thus, one of ordinary skill in the art would understand that the invention is not to be limited by the foregoing illustrative details, but rather is to be defined by the appended claims.

We claim:

1. A method for training a machine-trained (MT) network, the method comprising:

receiving, for execution on a particular type of integrated circuit, a network comprising a plurality of layers, the plurality of layers comprising a set of prunable layers, wherein each layer of the set of prunable layers comprises a respective plurality of weight values; and training the network by iteratively:

propagating inputs through the network to generate outputs and adjusting the respective plurality of weight values for each layer of the plurality of layers based on differences between the outputs and expected outputs;

determining, using the respective plurality of weight values for each layer of the plurality of layers, an estimated compute time for the network;

identifying, in response to the estimated compute time exceeding a compute time constraint and based on a parallelism computation capability of the particular type of integrated circuit, sets of weight values of the respective plurality of weight values for each layer of the set of prunable layers for removal; and removing the sets of weight values from consideration during a subsequent training iteration of the network, wherein removing the sets of weight values reduces the estimated compute time.

2. The method of claim 1, wherein the respective plurality of weight values for reach of the set of prunable layers are arranged as filters with corresponding scales, wherein identifying the sets of weight values for removal comprises identifying filters for removal.

3. The method of claim 2, wherein identifying the sets of weight values for removal comprises:

projecting each corresponding scale of the corresponding scales to a respective set of states, wherein each corresponding scale is projected to one of (i) a first state in which the corresponding scale is set to zero and (ii) a second state in which the corresponding scale is not set to zero; and identifying for removal the filters corresponding to the corresponding scales projected to the first state.

4. The method of claim 3, wherein a first scale in a first layer is projected to the first state and a second scale in the first layer is projected to the second state when the first scale is smaller than the second scale.

5. The method of claim 3, wherein a first scale having a first value and corresponding to a first filter in a first layer is projected to the first state and a second scale having a second value smaller than the first value and corresponding to a second filter in a second layer is projected to the second state.

6. The method of claim 5, wherein the first filter has more weight values than the second filter.

7. The method of claim 5, wherein (i) the first layer has a first number of filters such that removing the first filter reduces an amount of time required to execute the network on the particular type of integrated circuit and (ii) the second layer has a second number of filters such that removing the first filter does not reduce the amount of time required to execute the network on the particular type of integrated circuit.

8. The method of claim 2, wherein adjusting the respective plurality of weight values comprises adjusting (i) weight values of the filters and (ii) the corresponding scales.

9. The method of claim 2, wherein:

the particular type of integrated circuit comprises circuits for computing output values for a particular number of filters simultaneously.

10. The method of claim 1, wherein the compute time constraint is a constraint in a set of constraints for executing the network using the particular type of integrated circuit, the set of constraints comprising a weight value constraint, and wherein the weight value constraint that accounts for the total a total number of weight values for a layer of the set of prunable layers is based on a maximum amount of memory available on the particular type of integrated circuit.

11. The method of claim 10, wherein the weight value constraint that accounts for a total number of weight values for a layer of the set of prunable layers specifies a maximum number of weight values for a layer of the set of prunable layers after removal of the sets of weight values.

12. The method of claim 10, wherein identifying the sets of weight values for removal is based on the weight value constraint.

13. A non-transitory machine-readable medium storing a program which when executed by a processor trains a machine-trained (MT) network, the program comprising sets of instructions for:

receiving, for execution on a particular type of integrated circuit, a network comprising a plurality of layers, the plurality of layers comprising a set of prunable layers, wherein each layer of the set of prunable layers comprises a respective plurality of weight values; and training the network by iteratively:

propagating inputs through the network to generate outputs and adjusting the respective plurality of weight values for each layer of the plurality of layers based on differences between the outputs and expected outputs;

determining, using the respective plurality of weight values for each layer of the plurality of layers, an estimated compute time for the network;

identifying, in response to the estimated compute time exceeding a compute time constraint and based on a parallelism computation capability of the particular type of integrated circuit, sets of weight values of the respective plurality of weight values for each layer of the set of prunable layers removal; and removing the sets of weight values from consideration during a subsequent training iteration of the network, wherein removing the sets of weight values reduces the estimated compute time.

14. The non-transitory machine-readable medium of claim 13, wherein the respective plurality of weight values for reach of the set of prunable layers are arranged as filters with corresponding scales, wherein identifying the sets of weight values for removal comprises identifying filters for removal.

15. The non-transitory machine-readable medium of claim 14, wherein the set of instructions for identifying the sets of weight values for removal comprises sets of instructions for:

projecting each corresponding scale of the corresponding scales to a respective set of states, wherein each corresponding scale is projected to one of (i) a first state in which the corresponding scale is set to zero and (ii) a second state in which the corresponding scale is not set to zero; and identifying for removal the filters corresponding to the corresponding scales projected to the first state.

16. The non-transitory machine-readable medium of claim 15, wherein:

a first scale having a first value and corresponding to a first filter in a first layer is projected to the first state and a second scale having a second value smaller than the first value and corresponding to a second filter in a second layer is projected to the second state; and the first filter has more weight values than the second filter.

17. The non-transitory machine-readable medium of claim 15, wherein:

a first scale having a first value and corresponding to a first filter in a first layer is projected to the first state and a second scale having a second value smaller than the first value and corresponding to a second filter in a second layer is projected to the second state;

the first layer has a first number of filters such that removing the first filter reduces an amount of time required to execute the network on the particular type of integrated circuit; and the second layer has a second number of filters such that removing the first filter does not reduce the amount of time required to execute the network on the particular type of integrated circuit.

18. The non-transitory machine-readable medium of claim 14, wherein:

the particular type of integrated circuit comprises circuits for computing output values for a particular number of filters simultaneously.

19. The non-transitory machine-readable medium of claim 13, wherein the compute time constraint is a constraint in a set of constraints for executing the network using the particular type of integrated circuit, the set of constraints comprising a weight value constraint, and wherein the weight value constraint that accounts for a total number of weight values for a layer of the set of prunable layers is based on a maximum amount of memory available on the particular type of integrated circuit.

20. The non-transitory machine-readable medium of claim 19, wherein the weight value constraint that accounts for a total number of weight values for a layer of the set of prunable layers specifies a maximum number of weight values for a layer of the set of prunable layers after removal of the sets of weight values.

\* \* \* \* \*